United States Patent
Bruce et al.

(10) Patent No.: US 10,984,489 B1
(45) Date of Patent: Apr. 20, 2021

(54) ESTIMATING THE VALUE OF A PROPERTY IN A MANNER SENSITIVE TO NEARBY VALUE-AFFECTING GEOGRAPHIC FEATURES

(71) Applicant: Zillow, Inc., Seattle, WA (US)

(72) Inventors: Andrew Bruce, Seattle, WA (US); Michael Andrew Babb, Seattle, WA (US); Chunyi Wang, Seattle, WA (US)

(73) Assignee: Zillow, Inc., Seattle, WA (US)

( * ) Notice: Subject to any disclaimer, the term of this patent is extended or adjusted under 35 U.S.C. 154(b) by 1016 days.

(21) Appl. No.: 14/325,094

(22) Filed: Jul. 7, 2014

Related U.S. Application Data

(60) Provisional application No. 61/939,268, filed on Feb. 13, 2014.

(51) Int. Cl.
*G06Q 50/16* (2012.01)
*G06N 20/00* (2019.01)

(52) U.S. Cl.
CPC ............. *G06Q 50/16* (2013.01); *G06N 20/00* (2019.01)

(58) Field of Classification Search
CPC .... G06Q 50/16; G06Q 50/163; G06Q 50/167; G06N 20/00; G06N 20/10; G06N 20/20
USPC ........................................ 705/313, 314, 316
See application file for complete search history.

(56) References Cited

U.S. PATENT DOCUMENTS

| | | | |
|---|---|---|---|
| 4,870,576 A | 9/1989 | Tornetta | |
| 5,361,201 A | 11/1994 | Jost et al. | |
| 5,414,621 A | 5/1995 | Hough | |
| 5,584,025 A | 12/1996 | Keithley et al. | |
| 5,680,305 A | 10/1997 | Apgar, IV | |
| 5,754,850 A | 5/1998 | Janssen | |
| 5,794,216 A | 8/1998 | Brown | |
| 5,855,011 A | 12/1998 | Tatsuoka | |
| 5,857,174 A | 1/1999 | Dugan | |
| 6,115,694 A | 9/2000 | Cheetham et al. | |
| 6,178,406 B1 | 1/2001 | Cheetham et al. | |
| 6,240,425 B1 | 5/2001 | Naughton | |
| 6,260,033 B1 | 7/2001 | Tatsuoka | |
| 6,301,571 B1 | 10/2001 | Tatsuoka | |
| 6,397,208 B1 | 5/2002 | Lee | |
| 6,401,070 B1 | 6/2002 | McManus et al. | |

(Continued)

FOREIGN PATENT DOCUMENTS

| EP | 1903491 | 3/2008 |
|---|---|---|
| WO | WO-199524687 | 9/1995 |

(Continued)

OTHER PUBLICATIONS

A. Khalafallah, "Neural network based model for predicting housing market performance," in Tsinghua Science and Technology, vol. 13, No. S1, pp. 325-328, Oct. 2008 (Year: 2008).*

(Continued)

*Primary Examiner* — Gerardo Araque, Jr.
(74) *Attorney, Agent, or Firm* — Perkins Coie LLP

(57) ABSTRACT

A facility for determining an estimated value of a home is described. The facility applies a first valuation model that is insensitive to value-affecting geographic features near the home to obtain a first valuation. The facility applies a second valuation model that is sensitive to value-affecting geographic features near the home to obtain a second valuation. The facility combines the first and second valuations to obtain an estimated value of the home.

66 Claims, 43 Drawing Sheets

(56) References Cited

U.S. PATENT DOCUMENTS

| | | |
|---|---|---|
| 6,446,261 B1 | 9/2002 | Rosser |
| 6,493,721 B1 | 12/2002 | Getchius et al. |
| 6,597,983 B2 | 7/2003 | Hancock |
| 6,609,118 B1 | 8/2003 | Khedkar et al. |
| 6,615,187 B1 | 9/2003 | Ashenmil |
| 6,684,196 B1 | 1/2004 | Mini et al. |
| 6,760,707 B2 | 7/2004 | Provost |
| 6,876,955 B1 | 4/2005 | Fleming et al. |
| 6,877,015 B1 | 4/2005 | Kilgore et al. |
| 6,915,206 B2 | 7/2005 | Sasajima |
| 7,016,866 B1 | 3/2006 | Chin et al. |
| 7,092,918 B1 | 8/2006 | Delurgio et al. |
| 7,120,599 B2 | 10/2006 | Keyes |
| 7,130,810 B2 | 10/2006 | Foster et al. |
| 7,219,078 B2 | 5/2007 | Lamont et al. |
| 7,249,146 B2 | 7/2007 | Brecher |
| 7,289,965 B1 | 10/2007 | Bradley et al. |
| 7,454,355 B2 | 11/2008 | Milman et al. |
| 7,461,265 B2 | 12/2008 | Ellmore |
| 7,487,114 B2 | 2/2009 | Florance et al. |
| 7,567,262 B1 | 7/2009 | Clemens et al. |
| 7,711,574 B1 | 5/2010 | Bradley et al. |
| 7,725,359 B1 | 5/2010 | Katzfey et al. |
| 7,783,562 B1 | 8/2010 | Ellis |
| 7,788,186 B1 | 8/2010 | An et al. |
| 7,827,128 B1 | 11/2010 | Yan et al. |
| 7,848,966 B2 | 12/2010 | Charuk et al. |
| 7,933,798 B1 | 4/2011 | Yan et al. |
| 7,970,674 B2 | 6/2011 | Cheng et al. |
| 8,001,024 B2 | 8/2011 | Graboske et al. |
| 8,015,091 B1 | 9/2011 | Ellis |
| 8,032,401 B2 | 10/2011 | Choubey |
| 8,051,089 B2 | 11/2011 | Gargi et al. |
| 8,095,434 B1 | 1/2012 | Puttick et al. |
| 8,140,421 B1 | 3/2012 | Humphries et al. |
| 8,180,697 B2 | 5/2012 | Frischer |
| 8,190,516 B2 | 5/2012 | Ghosh et al. |
| 8,370,267 B2 | 2/2013 | Carey et al. |
| 8,401,877 B2 | 3/2013 | Salvagio |
| 8,407,120 B1 | 3/2013 | Gordon et al. |
| 8,433,512 B1 * | 4/2013 | Lopatenko ............ G01C 21/20 701/426 |
| 8,473,347 B1 | 6/2013 | Koningstein |
| 8,515,839 B2 | 8/2013 | Ma et al. |
| 8,521,619 B2 | 8/2013 | Perry, III et al. |
| 8,583,562 B1 | 11/2013 | Robbins et al. |
| 8,628,151 B1 | 1/2014 | Allen et al. |
| 8,650,067 B1 | 2/2014 | Moss et al. |
| 8,660,919 B2 | 2/2014 | Kasower |
| 8,775,300 B2 | 7/2014 | Showalter |
| 9,536,011 B1 | 1/2017 | Kirillov |
| 2001/0039506 A1 | 11/2001 | Robbins |
| 2001/0044766 A1 | 11/2001 | Keyes |
| 2002/0035520 A1 | 3/2002 | Weiss |
| 2002/0052814 A1 | 5/2002 | Ketterer |
| 2002/0082903 A1 | 6/2002 | Yasuzawa |
| 2002/0087389 A1 | 7/2002 | Sklarz et al. |
| 2002/0188689 A1 | 12/2002 | Michael |
| 2003/0004781 A1 | 1/2003 | Mallon et al. |
| 2003/0046099 A1 | 3/2003 | Lamont et al. |
| 2003/0055747 A1 | 3/2003 | Carr et al. |
| 2003/0078878 A1 | 4/2003 | Opsahl-Ong |
| 2003/0078897 A1 | 4/2003 | Florance et al. |
| 2003/0101063 A1 | 5/2003 | Sexton et al. |
| 2003/0101074 A1 | 5/2003 | Suzuki et al. |
| 2003/0110122 A1 | 6/2003 | Nalebuff et al. |
| 2003/0149658 A1 | 8/2003 | Rossbach et al. |
| 2003/0191723 A1 | 10/2003 | Foretich et al. |
| 2003/0212565 A1 | 11/2003 | Badall et al. |
| 2004/0019517 A1 | 1/2004 | Sennott |
| 2004/0030616 A1 | 2/2004 | Florance et al. |
| 2004/0039629 A1 | 2/2004 | Hoffman et al. |
| 2004/0049440 A1 | 3/2004 | Shinoda et al. |
| 2004/0054605 A1 | 3/2004 | Whittet et al. |
| 2004/0073508 A1 | 4/2004 | Foster et al. |
| 2004/0093270 A1 | 5/2004 | Gilbert |
| 2004/0128215 A1 | 7/2004 | Florance et al. |
| 2004/0153330 A1 | 8/2004 | Miller et al. |
| 2004/0220872 A1 | 11/2004 | Pollock |
| 2004/0243470 A1 | 12/2004 | Ozer et al. |
| 2004/0254803 A1 | 12/2004 | Myr |
| 2004/0267657 A1 | 12/2004 | Hecht |
| 2005/0071376 A1 | 3/2005 | Modi |
| 2005/0080702 A1 | 4/2005 | Modi et al. |
| 2005/0108084 A1 | 5/2005 | Ramamoorti et al. |
| 2005/0154656 A1 | 7/2005 | Kim et al. |
| 2005/0154657 A1 | 7/2005 | Kim et al. |
| 2005/0187778 A1 | 8/2005 | Mitchell et al. |
| 2005/0192930 A1 | 9/2005 | Hightower et al. |
| 2005/0240429 A1 | 10/2005 | Dieden et al. |
| 2005/0254803 A1 | 11/2005 | Ono et al. |
| 2005/0288942 A1 | 12/2005 | Graboske et al. |
| 2005/0288957 A1 | 12/2005 | Eraker et al. |
| 2006/0015357 A1 | 1/2006 | Cagan |
| 2006/0020424 A1 | 1/2006 | Quindel |
| 2006/0080114 A1 | 4/2006 | Bakes et al. |
| 2006/0085210 A1 | 4/2006 | Owens |
| 2006/0089842 A1 | 4/2006 | Medawar |
| 2006/0105342 A1 | 5/2006 | Villena et al. |
| 2006/0122918 A1 | 6/2006 | Graboske et al. |
| 2006/0167710 A1 | 7/2006 | King et al. |
| 2006/0248555 A1 | 11/2006 | Eldering |
| 2006/0287810 A1 * | 12/2006 | Sadri ...................... G01C 21/20 701/438 |
| 2007/0005373 A1 | 1/2007 | Millena et al. |
| 2007/0043770 A1 | 2/2007 | Goodrich et al. |
| 2007/0050342 A1 | 3/2007 | Inkinen et al. |
| 2007/0067180 A1 | 3/2007 | James et al. |
| 2007/0106523 A1 | 5/2007 | Eaton et al. |
| 2007/0124235 A1 | 5/2007 | Chakraborty et al. |
| 2007/0132727 A1 | 6/2007 | Garbow et al. |
| 2007/0143132 A1 | 6/2007 | Linne et al. |
| 2007/0143312 A1 | 6/2007 | Wiseman et al. |
| 2007/0150353 A1 | 6/2007 | Krassner et al. |
| 2007/0185906 A1 | 8/2007 | Humphries et al. |
| 2007/0244780 A1 | 10/2007 | Liu |
| 2007/0255581 A1 | 11/2007 | Otto et al. |
| 2007/0265960 A1 | 11/2007 | Advani |
| 2008/0004893 A1 | 1/2008 | Graboske et al. |
| 2008/0015890 A1 | 1/2008 | Malyala et al. |
| 2008/0077458 A1 | 3/2008 | Andersen et al. |
| 2008/0086356 A1 | 4/2008 | Glassman et al. |
| 2008/0109409 A1 | 5/2008 | Hengel |
| 2008/0133319 A1 | 6/2008 | Adiga et al. |
| 2008/0183598 A1 | 7/2008 | Carr et al. |
| 2008/0255921 A1 | 10/2008 | Flake et al. |
| 2008/0288335 A1 | 11/2008 | Goldberg |
| 2008/0301064 A1 | 12/2008 | Burns |
| 2008/0312942 A1 | 12/2008 | Katta et al. |
| 2009/0006185 A1 | 1/2009 | Stinson et al. |
| 2009/0030707 A1 | 1/2009 | Green et al. |
| 2009/0030864 A1 | 1/2009 | Pednault et al. |
| 2009/0037328 A1 | 2/2009 | Abuaf |
| 2009/0043603 A1 * | 2/2009 | Rutherford ............ G06Q 50/16 705/313 |
| 2009/0043637 A1 | 2/2009 | Eder |
| 2009/0048938 A1 * | 2/2009 | Dupray .................. G06Q 30/02 705/27.1 |
| 2009/0076902 A1 | 3/2009 | Grinsted et al. |
| 2009/0132316 A1 | 5/2009 | Florance et al. |
| 2009/0144097 A1 | 6/2009 | Fassio et al. |
| 2009/0150216 A1 | 6/2009 | Milman et al. |
| 2009/0164464 A1 | 6/2009 | Carrico et al. |
| 2009/0210287 A1 | 8/2009 | Chickering et al. |
| 2009/0240586 A1 | 9/2009 | Ramer et al. |
| 2009/0265285 A1 | 10/2009 | Balaishis |
| 2009/0287596 A1 | 11/2009 | Torrenegra |
| 2010/0005019 A1 | 1/2010 | Yang et al. |
| 2010/0023379 A1 | 1/2010 | Rappaport |
| 2010/0076881 A1 | 3/2010 | O'Grady |
| 2010/0094548 A1 | 4/2010 | Tadman et al. |
| 2010/0114678 A1 | 5/2010 | Axe et al. |
| 2010/0161498 A1 | 6/2010 | Walker |
| 2010/0318451 A1 | 12/2010 | Niccolini |

(56) References Cited

U.S. PATENT DOCUMENTS

| | | | |
|---|---|---|---|
| 2011/0047083 A1 | 2/2011 | Lawler | |
| 2011/0066510 A1 | 3/2011 | Talegon | |
| 2011/0066561 A1 | 3/2011 | Lazarre et al. | |
| 2011/0071899 A1 | 3/2011 | Robertson et al. | |
| 2011/0196762 A1 | 8/2011 | DuPont | |
| 2011/0218934 A1 | 9/2011 | Elser et al. | |
| 2011/0218937 A1 | 9/2011 | Elser | |
| 2011/0251967 A1 | 10/2011 | Klivington | |
| 2011/0251974 A1 | 10/2011 | Woodward et al. | |
| 2011/0270779 A1 | 11/2011 | Showalter | |
| 2012/0005111 A2 | 1/2012 | Lowenstein et al. | |
| 2012/0011075 A1 | 1/2012 | Graboske et al. | |
| 2012/0030092 A1 | 2/2012 | Marshall et al. | |
| 2012/0072357 A1 | 3/2012 | Bradford et al. | |
| 2012/0078770 A1 | 3/2012 | Hecht | |
| 2012/0158459 A1 | 6/2012 | Villena et al. | |
| 2012/0191541 A1 | 7/2012 | Yang et al. | |
| 2012/0254045 A1 | 10/2012 | Orfano | |
| 2012/0311431 A1 | 12/2012 | Breaker et al. | |
| 2012/0323798 A1* | 12/2012 | Den Herder | G06Q 30/02 705/306 |
| 2012/0330719 A1 | 12/2012 | Malaviya et al. | |
| 2013/0041841 A1 | 2/2013 | Lyons | |
| 2013/0103459 A1 | 4/2013 | Marshall et al. | |
| 2013/0159166 A1 | 6/2013 | Irick | |
| 2013/0275252 A1 | 10/2013 | Martin et al. | |
| 2013/0304654 A1 | 11/2013 | Ma et al. | |
| 2013/0332877 A1 | 12/2013 | Florance et al. | |
| 2013/0339255 A1 | 12/2013 | Talbird | |
| 2014/0012720 A1 | 1/2014 | O'Kane | |
| 2014/0180936 A1 | 6/2014 | Ma et al. | |
| 2014/0257924 A1 | 9/2014 | Xie | |
| 2014/0279692 A1 | 9/2014 | Boothby et al. | |
| 2014/0316857 A1 | 10/2014 | Roberts | |
| 2014/0372203 A1 | 12/2014 | Powell et al. | |
| 2015/0006605 A1 | 1/2015 | Chu et al. | |
| 2015/0012335 A1 | 1/2015 | Xie et al. | |
| 2015/0066834 A1 | 3/2015 | Jeffries | |
| 2015/0149275 A1 | 5/2015 | Bax et al. | |
| 2015/0242747 A1 | 8/2015 | Packes et al. | |
| 2015/0269264 A1 | 9/2015 | Bolen | |
| 2015/0356576 A1 | 12/2015 | Malaviya et al. | |
| 2018/0232787 A1 | 8/2018 | Dupray | |
| 2020/0334279 A1 | 10/2020 | Daimler et al. | |

FOREIGN PATENT DOCUMENTS

| | | |
|---|---|---|
| WO | WO-2000055771 | 9/2000 |
| WO | WO-200211038 | 2/2002 |
| WO | WO-2002042980 | 5/2002 |
| WO | WO-2003100692 | 12/2003 |
| WO | WO-2005015441 A2 | 2/2005 |
| WO | WO-2006025830 | 3/2006 |
| WO | WO-2006043951 A2 | 4/2006 |
| WO | WO-2007051892 | 5/2007 |

OTHER PUBLICATIONS

Y. E. Hamzaoui and J. A. H. Perez, "Application of Artificial Neural Networks to Predict the Selling Price in the Real Estate Valuation Process," 2011 10th Mexican International Conference on Artificial Intelligence, Puebla, 2011, pp. 175-181 (Year: 2011).*
G. Jianxiao, W. Hongli and H. Hongchen, "Analysis of influencing factors in real estate prices based on stochastic gradient regression model," 2009 16th International Conference on Industrial Engineering and Engineering Management, Beijing, 2009 (Year: 2009).*
U.S. Appl. No. 11/927,623, filed Oct. 29, 2007, Humphries et al.
U.S. Appl. No. 13/044,480, filed Sep. 9, 2011, Humphries et al.
U.S. Appl. No. 13/044,490, filed Mar. 9, 2011, Humphries et al.
U.S. Appl. No. 13/417,804, filed Mar. 12, 2012, Humphries et al.
U.S. Appl. No. 13/828,680, filed Mar. 14, 2013, Humphries et al.
U.S. Appl. No. 13/830,497, filed Mar. 14, 2013, Humphries et al.
U.S. Appl. No. 14/041,450, filed Sep. 30, 2013, Humphries et al.
U.S. Appl. No. 14/167,962, filed Jan. 29, 2014, Humphries et al.
U.S. Appl. No. 14/318,536, filed Jun. 27, 2014, Cheng et al.
"2002 Inman Innovator Award Nominees Announced," PR Newswire, Jul. 16, 2002, 3 pages.
"About Reis, Products & Services," [online], Retrieved from the Internet via the Wayback Machine dated Feb. 5, 2002 on Jun. 13, 2013, URL: http://reis.com/about/aboutproducts_rentcomps.cfm, 2 pages.
"An Introduction to R," <http://web.archive.org/web/20060118050840/http://cran.r-project.org/doc/manuals/R-Intro.html>, [internet archive date: Jan. 18, 2006], pp. 1-105.
"Banton Technologies Announces National Home Evaluation Coverage; Company's ValueWizard 3.0 Assesses All Regions of the United States," Business Wire, Jun. 10, 2003, [online] Retrieved from the Internet: URL: http://www.the free library.com/_/print/PrintArticle.aspx?id=102949279, 2 pages.
"Basis100 Partners to Offer Automated Valuation Service," Canada StockWatch, Jan. 27, 2004, 2 pages.
"Basis100 Partners with First American," PR Newswire, Jan. 27, 2004, 3 pages.
"Casa(TM) to Value More Than $100 Billion of Residential Real Estate in 2001—Leading Lenders Saving Big without Compromising Loan Quality," PR Newswire, May 21, 2001, 3 pages.
"Centre for Mathematical Sciences," Lund University, http://web.archive.org/web/20060101005103/http://www.maths.lth.se/, [internet archive date: Jan. 1, 2006], 1 page.
"Directory of Valuation Providers, Your Source for Valuation Information," Zackin Publications Inc., 2004, 5 pages.
"First American Expands Real Estate Valuation Line, Aims to Increase Accuracy with Addition of Veros, Basis100 AVMs," Inman News, Mar. 15, 2004, 2 pages.
"First American Real Estate Solutions Experiences Record," PR Newswire, Nov. 4, 2002, 3 pages.
"First American Real Estate Solutions Releases ValuePoint4," PR Newswire, Oct. 21, 2002, 3 pages.
"First American Real Estate Solutions' ValuePoint(R)4 Experiences Explosive Growth in 2004—Leading Automated Valuation Model (AVM) Usage Grows More Than 700 Percent in 12-Month Period," PR Newswire, Mar. 24, 2005, 3 pages.
"Franchise Offering Circular for Prospective Franchisees," U.S. Appraisal, Nov. 1, 1986, 87 pages.
"GMAC-RFC Selects First American Real Estate Solutions' ValuePoint(R)4 Automated Valuation Model (AVM)," PR Newswire, Jun. 28, 2004, 3 pages.
"HNC Software and RealQuest Team to Provide Widespread Automated Property Valuation; AREAS Users to Have Online Access to Texas MLS," Business Wire, Oct. 1, 1997, 3 pages.
"HomeAdvisor Ranks First in Gomez Poll," Realty Times, Jun. 13, 2001, 3 pages.
"HomeAdvisor Spin-Off Aims to Service Realty Industry," Directions on Microsoft, Apr. 24, 2000, 2 pages.
"HomeSeekers.com and MSN HomeAdvisor Provide Free Web Pages for All Real Estate Agents," PR Newswire, May 20, 1999, 3 pages.
"How do we value your home?," [online] CSWOnline, Retrieved from the Internet via the Wayback Machine dated Oct. 23, 1999, URL: http://w w w .csw online.com/method.shtml, 1 page.
"In Brief: HomeAdvisor Secures $100 Million in Equity Funding," Directions on Microsoft, Aug. 28, 2000,1 page.
"Microsoft Real Estate Venture Gets Large Investment," The New York Times, Technology section, Aug. 23, 2000, 2 pages.
"MSN HomeAdvisor Becomes Most-Visited Home and Real Estate Web Site, According to Media Metrix," Microsoft News Center, Apr. 13, 2001, Retrieved from the Internet: URL: http://www.microsoft.com/enus/ news/press/2001/Apr01/04-13MarchTrafficPR.aspx?navV3Index=0, 2 pages.
"MSN HomeAdvisor Helps Real Estate Agents and Customers Feel Right at Home on the Internet," Microsoft News Center, Dec. 14, 1998, Retrieved from the Internet: URL: http://www.microsoft.com/enus/ news/features/1998/12-14msn.aspx?navV3Index=0, 2 pages.
"Nation's First Fully Interactive AVM Debuts in Las Vegas AVM News," PRweb press release, AVM News, Feb. 4, 2006, 1 page.

(56) References Cited

OTHER PUBLICATIONS

"NetNumina Solutions Creates Robust E-Business Solution for Leader in Real Estate Lending," PR Newswire, Aug. 16, 1999, 3 pages.
"Reis Inc.," Commercial Property News, vol. 18, Issue 6, Mar. 16, 2004, 2 pages.
"Reis, Inc. Launches Apartment Version of Online Valuation and Credit Risk Analysis Module," Business Wire, Nov. 7, 2002, 2 pages.
"RMBS: Guidelines for the Use of Automated Valuation Models for U.K. RMBS Transactions," Standard and Poors.com [online], Sep. 26, 2005 [retrieved Aug. 6, 2013], Retrieved from the Internet, S&P Archive: URL: www.standardandpoors.com/prot/ratings/articles/en/us/?articleType=HTML&assetID=1245330509010, 4 pages.
"Sample CASA Report," [online] CSWOnline, Retrieved from the Internet via the Wayback Machine dated Nov. 6, 1999, URL: http://w w w .csw online.com/sample.shtml, 3 pages.
"Standard on Automated Valuation Models (AVMs)", International Association of Assessing Officers, Approved Sep. 2003, 36 pages.
"The Appraisal" Report, U.S.Appraisal, dated at least by Sep. 29, 1983, 4 pages.
"The Appraisal" Report, U.S.Appraisal, not dated, 4 pages.
"The Appraiser," Certificate of Copyright Registration, Jun. 25, 1982, 4 pages.
"The Appraiser," Certificate of Copyright Registration, Oct. 19, 1981, 3 pages.
"The Assessor" Demo Video, U.S.Appraisal, [Accessed for review on Jun. 21, 2013, Zillow Inc. vs. Trulia Case No. 2:12-cv-01549-JLR], [Transcribed Oct. 8, 2013], 10 pages.
"The Assessor" Newsletter, US Appraisal, dated at least by Apr. 10, 1985, 4 pages.
"The Assessor" Source Code, U.S.Appraisal, [Accessed for review on Jun. 21, 2013, Zillow Inc. vs. Trulia Case No. 2:12-cv-01549-JLR], 2,460 pages.
"The Assessor," Certificate of Copyright Registration, Feb. 2, 1984, 2 pages.
"The Comprehensive R Archive Network,", 'www.cran.r-project.org, http://web.archive.org/web/20050830073913/cran.r-project.org/banner.shtml, [internet archive date: Aug. 30, 2005], pp. 1-2.
"The R Project for Statistical Computing," www.r-project.org, http://web.archive.org/web/20060102073515/www.r-project.org/main.shtml, [internet archive date: Jan. 2, 2006], 1 page.
"TransUnion Acquires Banton Technologies," PR Newswire, Oct. 20, 2003, 3 pages.
"TransUnion and CSW Form Partnership," Mortgage Banking, vol. 62, Issue 6, Mar. 31, 2002, 1 page.
"Trulia Estimates," [online], Retrieved from the Internet via the Wayback Machine dated Jan. 16, 2013, URL:http//www.trulia.com/trulia_estimates/, 2 pages.
"Uniform Standards of Professional Appraisal Practice and Advisory Opinions 2005 Edition<" Electronic USPAP 2005 Edition, Appraisal Standards Board, The Appraisal Foundation, Effective Jan. 1, 2005, 10 pages.
"USPAP Q&A," vol. 9, No. 6, The Appraisal Foundation, Jun. 2007, 2 pages.
"What Is an AVM?", Real-Info.com [online], Dec. 22, 2005 [retrieved on Aug. 6, 2013]. Retrieved from the Internet via Internet Archive Wayback Machine: URL: web.archive.org/web/20051222120807/http://www.real-info.com/products_avm.asp?RISID=e8fc23a9a1189fbff9b9b8e8f86ccde6], 3 pages.
Xactware Unveils Web-Based Valuation Tool for Underwriting, PR Newswire, Dec. 10, 2002, 3 pages.
"Xactware. (Central Utah)," Utah Business, vol. 17, Issue 3, Mar. 1, 2003, 1 page.
Appeal Brief for U.S. Appl. No. 11/524,048, Aug. 9, 2010, 20 pages.
Assignment of Copyright to U.S.Appraisal by Flying Software, Inc., Jan. 2, 1982, 2 pages.
AVM News, Thomson Media, vol. 1, Issue 1 Jan. 2002, 23 pages.
AVM News, Thomson Media, vol. 1, Issue 10, Oct. 2002, 34 pages.
AVM News, Thomson Media, vol. 1, Issue 11, Nov. 2002, 28 pages.
AVM News, Thomson Media, vol. 1, Issue 12, Dec. 2002, 14 pages.
AVM News, Thomson Media, vol. 1, Issue 2, Feb. 2002, 13 pages.
AVM News, Thomson Media, vol. 1, Issue 3, Mar. 2002, 21 pages.
AVM News, Thomson Media, vol. 1, Issue 4, Apr. 2002, 24 pages.
AVM News, Thomson Media, vol. 1, Issue 5, May 2002, 35 pages.
AVM News, Thomson Media, vol. 1, Issue 6, Jun. 2002, 19 pages.
AVM News, Thomson Media, vol. 1, Issue 7, Jul. 2002, 24 pages.
AVM News, Thomson Media, vol. 1, Issue 8, Aug. 2002, 17 pages.
AVM News, Thomson Media, vol. 1, Issue 9, Sep. 2002, 15 pages.
AVM News, Thomson Media, vol. 10, Issue 1-2, Jan.-Feb. 2011, 72 pages.
AVM News, Thomson Media, vol. 10, Issue 11-12, Nov.-Dec. 2011, 70 pages.
AVM News, Thomson Media, vol. 10, Issue 3-4, Mar.-Apr. 2011, 100 pages.
AVM News, Thomson Media, vol. 10, Issue 5-6, May-Jun. 2011, 106 pages.
AVM News, Thomson Media, vol. 10, Issue 7-8, Jul.-Aug. 2011, 82 pages.
AVM News, Thomson Media, vol. 10, Issue 9-10, Sep.-Oct. 2011, 90 pages.
AVM News, Thomson Media, vol. 11, Issue 1-2, Jan.-Feb. 2012, 66 pages.
AVM News, Thomson Media, vol. 11, Issue 3-4, Mar.-Apr. 2012, 76 pages.
AVM News, Thomson Media, vol. 11, Issue 5-6, May-Jun. 2012, 72 pages.
AVM News, Thomson Media, vol. 2, Issue 1, Jan. 2003, 24 pages.
AVM News, Thomson Media, vol. 2, Issue 10, Oct. 2003, 31 pages.
AVM News, Thomson Media, vol. 2, Issue 11, Nov. 2003, 28 pages.
AVM News, Thomson Media, vol. 2, Issue 12, Dec. 2003, 18 pages.
AVM News, Thomson Media, vol. 2, Issue 2, Feb. 2003, 26 pages.
AVM News, Thomson Media, vol. 2, Issue 3, Mar. 2003, 29 pages.
AVM News, Thomson Media, vol. 2, Issue 4, Apr. 2003, 22 pages.
AVM News, Thomson Media, vol. 2, Issue 5, May 2003, 33 pages.
AVM News, Thomson Media, vol. 2, Issue 6, Jun. 2003, 38 pages.
AVM News, Thomson Media, vol. 2, Issue 7, Jul. 2003, 31 pages.
AVM News, Thomson Media, vol. 2, Issue 8, Aug. 2003, 24 pages.
AVM News, Thomson Media, vol. 2, Issue 9, Sep. 2003, 30 pages.
AVM News, Thomson Media, vol. 3, Issue 1, Jan. 2004, 24 pages.
AVM News, Thomson Media, vol. 3, Issue 10, Oct. 2004, 55 pages.
AVM News, Thomson Media, vol. 3, Issue 11, Nov. 2004, 54 pages.
AVM News, Thomson Media, vol. 3, Issue 12, Dec. 2004, 18 pages.
AVM News, Thomson Media, vol. 3, Issue 2, Feb. 2004, 26 pages.
AVM News, Thomson Media, vol. 3, Issue 3, Mar. 2004, 31 pages.
AVM News, Thomson Media, vol. 3, Issue 4, Apr. 2004, 36 pages.
AVM News, Thomson Media, vol. 3, Issue 5, May 2004, 37 pages.
AVM News, Thomson Media, vol. 3, Issue 6, Jun. 2004, 35 pages.
AVM News, Thomson Media, vol. 3, Issue 7, Jul. 2004, 49 pages.
AVM News, Thomson Media, vol. 3, Issue 8, Aug. 2004, 37 pages.
AVM News, Thomson Media, vol. 3, Issue 9, Sep. 2004, 31 pages.
AVM News, Thomson Media, vol. 4, Issue 1, Jan. 2005, 45 pages.
AVM News, Thomson Media, vol. 4, Issue 10, Oct. 2005, 51 pages.
AVM News, Thomson Media, vol. 4, Issue 11, Nov. 2005, 52 pages.
AVM News, Thomson Media, vol. 4, Issue 12, Dec. 2005, 56 pages.
AVM News, Thomson Media, vol. 4, Issue 2, Feb. 2005, 31 pages.
AVM News, Thomson Media, vol. 4, Issue 3, Mar. 2005, 39 pages.
AVM News, Thomson Media, vol. 4, Issue 4, Apr. 2005, 40 pages.
AVM News, Thomson Media, vol. 4, Issue 5, May 2005, 51 pages.
AVM News, Thomson Media, vol. 4, Issue 6, Jun. 2005, 34 pages.
AVM News, Thomson Media, vol. 4, Issue 7, Jul. 2005, 53 pages.
AVM News, Thomson Media, vol. 4, Issue 8, Aug. 2005, 30 pages.
AVM News, Thomson Media, vol. 4, Issue 9, Sep. 2005, 48 pages.
AVM News, Thomson Media, vol. 5, Issue 1, Jan. 2006, 58 pages.
AVM News, Thomson Media, vol. 5, Issue 10, Oct. 2006, 85 pages.
AVM News, Thomson Media, vol. 5, Issue 11, Nov. 2006, 86 pages.
AVM News, Thomson Media, vol. 5, Issue 12, Dec. 2006, 54 pages.
AVM News, Thomson Media, vol. 5, Issue 2, Feb. 2006, 53 pags.
AVM News, Thomson Media, vol. 5, Issue 3, Mar. 2006, 41 pages.
AVM News, Thomson Media, vol. 5, Issue 4, Apr. 2006, 54 pages.
AVM News, Thomson Media, vol. 5, Issue 5, May 2006, 48 pages.
AVM News, Thomson Media, vol. 5, Issue 6, Jun. 2006, 62 pages.
AVM News, Thomson Media, vol. 5, Issue 7, Jul. 2006, 74 pages.

(56) References Cited

OTHER PUBLICATIONS

AVM News, Thomson Media, vol. 5, Issue 8, Aug. 2006, 57 pages.
AVM News, Thomson Media, vol. 5, Issue 9, Sep. 2006, 63 pages.
AVM News, Thomson Media, vol. 6 Issue 3, Mar. 2007, 49 pages.
AVM News, Thomson Media, vol. 6, Issue 1, Jan. 2007, 42 pages.
AVM News, Thomson Media, vol. 6, Issue 10, Oct. 2007, 52 pages.
AVM News, Thomson Media, vol. 6, Issue 11, Nov. 2007, 23 pages.
AVM News, Thomson Media, vol. 6, Issue 2, Feb. 2007, 47 pages.
AVM News, Thomson Media, vol. 6, Issue 4, Apr. 2007, 59 pages.
AVM News, Thomson Media, vol. 6, Issue 5, May 2007, 66 pages.
AVM News, Thomson Media, vol. 6, Issue 6, Dec. 2007, 38 pages.
AVM News, Thomson Media, vol. 6, Issue 6, Jun. 2007, 46 pages.
AVM News, Thomson Media, vol. 6, Issue 8, Aug. 2007, 35 pages.
AVM News, Thomson Media, vol. 6, Issue 9, Sep. 2007, 37 pages.
AVM News, Thomson Media, vol. 6, Issue7, Jul. 2007, 51 pages.
AVM News, Thomson Media, vol. 7, Issue 07-08, Jul.-Aug. 2008, 56 pages.
AVM News, Thomson Media, vol. 7, Issue 1, Jan. 2008, 44 pages.
AVM News, Thomson Media, vol. 7, Issue 11-12, Nov.-Dec. 2008, 52 pages.
AVM News, Thomson Media, vol. 7, Issue 2, Feb. 2008, 35 pages.
AVM News, Thomson Media, vol. 7, Issue 3, Mar. 2008, 34 pages.
AVM News, Thomson Media, vol. 7, Issue 4, Apr. 2008, 33 pages.
AVM News, Thomson Media, vol. 7, Issue 4-5, May-Jun. 2008, 46 pages.
AVM News, Thomson Media, vol. 7, Issue 9-10, Sep.-Oct. 2008, 68 pages.
AVM News, Thomson Media, vol. 8, Issue 1-2, Jan.-Feb. 2009, 71 pages.
AVM News, Thomson Media, vol. 8, Issue 11-12, Nov.-Dec. 2009, 62 pages.
AVM News, Thomson Media, vol. 8, Issue 3-4, Mar.-Apr. 2009, 45 pages.
AVM News, Thomson Media, vol. 8, Issue 5-6, May-Jun. 2009, 65 pages.
AVM News, Thomson Media, vol. 8, Issue 7-8, Jul.-Aug. 2009, 71 pages.
AVM News, Thomson Media, vol. 8, Issue 9-10, Sep.-Oct. 2009, 53 pages.
AVM News, Thomson Media, vol. 9, Issue 1-2, Jan.-Feb. 2010, 66 pages.
AVM News, Thomson Media, vol. 9, Issue 11-12, Nov.-Dec. 2010, 75 pages.
AVM News, Thomson Media, vol. 9, Issue 3-4, Mar.-Apr. 2010, 63 pages.
AVM News, Thomson Media, vol. 9, Issue 5-6, May-Jun. 2010, 69 pages.
AVM News, Thomson Media, vol. 9, Issue 7-8, Jul.-Aug. 2010, 63 pages.
AVM News, Thomson Media, vol. 9, Issue 9-10, Sep.-Oct. 2010, 69 pages.
Bailey, Martin J. et al., A Regression Method for Real Estate Price Index Construction, Journal of the American Statistical Association, vol. 58, No. 304 (Dec. 1963), Published by: American Statistical Association, Stable URL: http://www.jstor.org/stable/2283324, pp. 933-942, 11 pages.
Basch, Mark, "Basis100 Sold to California Firm," The Florida Times Union, Jacksonville.com, Jul. 1, 2004, 2 pages.
Borst, Richard Aa. et al., "An Evaluation of Multiple Regression Analysis, Comparable Sales Analysis and Artificial Neural Networks for the Mass Appraisal of Residential Properties in Northern Ireland," 1996, 16 pages.
Borst, Richard A. et al., "Use of GIS to Establish and Update CAMA Neighborhoods in Northern Ireland," Available prior to Sep. 1997, 9 pages.
Borst, Richard A., "A Valuation and Value Updating of Geographically Diverse Commercial Properties Using Artificial Neural Networks," 1993, 2 pages.
Borst, Richard A., "Computer Assisted Mass Appraisal, A New Growth Industry in the United States," Accessed from International Association of Assessing Officers Research and Technical Services Department, Document 00994, Dated no later than Jun. 8, 1979, 28 pages.
Borst, Richard A., "The Common Thread in Market Data Systems," World Congress on Computer-Assisted Valuation, Aug. 1-6, 1982, 14 pages.
Boston Housing Data, http://www.ics.uci.edu/~mlearn/databases/housing/housing.names, [accessed Dec. 13, 2005], 1 page.
Breiman et al., "Random Forest," Classification Description, http://www.stat.berkeley.edu/users/breiman/RandomForests/cc_home.htm, [accessed Dec. 13, 2005], pp. 1-28.
Breiman, L., "Random Forests," Machine Learning, 45, 2001, Kluwer Academic Publishers, The Netherlands, pp. 5-32.
Breiman, Leo et al., Random Forests, R Mathematical Software Package, licensed by Salford Systems, available at URL cran.r-project.org, and described at "Package 'randomForest'", version 4.6-7, Feb. 15, 2013, Published Oct. 16, 2012, available at URL cran.r-project.org/web/packages/randomforest/randomForest.pdf., 29 pages.
Calhoun, Charles A., "Property Valuation Methods and Data in the United States," Housing Finance International Journal 16.2, Dec. 2001, pp. 12-23.
Casa Property Valuation screen capture, dated at least by Jan. 24, 2005, 1 page.
Case, Karl E., et al., "Prices of Single Family Homes Since 1970: New Indexes for Four Cities," Cowles Foundation for Research in Economics at Yale University, New Haven, Connecticut, Discussion Paper No. 851, Oct. 1987, 54 pages.
Centre for Mathematical Sciences, Lund University, "Classification and Regression with Random Forest," http://web.archive.org/web/20060205051957/http://www.maths.lth.se/help/R/.R/library/randomForest/html/randomForest.html, [internet archive date: Feb. 5, 2006], pp. 1-4.
Complaint for Patent Infringement, Demand for Jury Trial for U.S. Pat. No. 7,970,674, Case 2:12-cv-01549-JLR, Sep. 12, 2012, 8 pages.
Cozzi, Guy, Real Estate Appraising from A to Z, 4th Edition, Nemmar Real Estate Training, Jan. 1, 2002, 226 pages, Parts 1-2.
Crowston, Kevin, et al., "Real Estate War in Cyberspace: An Emerging Electronic Market?," Syracuse University Surface, School of Information Studies (iSchool), Jan. 1, 1999, 14 pages.
Curriculum Vitae of Ramsey M. Al-Salam, Dec. 10, 2012, 7 pages. Do not cite per A. Johnson Oct. 11, 2013.
Curriculum Vitae of Steven R. Kursh, Ph.D., CSDP, CLP, Aug. 2013, 9 pages.
Cypress Software Introduces AVM Module for Mark IV Application; Module Provides Instant Home Appraisal for Loans Processed by the Loan-Decisioning Platform, Business Wire, Nov. 15, 2005, 2 pages.
Decision—Institution of Covered Business Method Patent Review for U.S. Pat. No. 7,970,674, Case CBM2013-00056, Entered Mar. 10, 2014, 36 pages.
Decision—Institution of Inter Partes Review for U.S. Pat. No. 7,970,674, Case No. IPR2013-00034, Apr. 2, 2013, 28 pages.
Decision on Appeal for U.S. Appl. No. 11/524,048, Mail Date Oct. 19, 2012, 7 pages.
Decision on Request for Rehearing for U.S. Pat. No. 7,970,674, Case No. IPR2013-00034, Apr. 22, 2013, 5 pages.
Declaration Brooke A.M. Taylor in Support of Plaintiff Vasudevan Software, Inc.'s Motion for Sanctions Against Microstrategy, Case No. 3:11-06637-RS-PSG, Nov. 20, 2012, 3 pages.
Declaration of Dr. Richard Borst, Aug. 26, 2013, 43 pages.
Declaration of John Kilpatrick, Case No. IPR2013-00034, Jun. 14, 2013, 23 pages.
Declaration of Jordan Connors in Support of Plaintiff Vasudevan Software, Inc.'s Motion for Sanctions Against Microstraqtegy, Case No. 3:11-06637-RS-PSG, Nov. 20, 2012, 4 pages.
Declaration of Leslie V. Payne in Support of Plaintiff Vasudevan Software, Inc.'s Motion for Sanctions Against Microstrategy, Case No. 3:11-06637-RS-PSG, Nov. 20, 2012, 3 pages.
Declaration of Steven R. Kursh, Ph.D., CSDP, CLP, CBM 2013-00056, Filed Sep. 11, 2013, 107 pages.

(56) References Cited

OTHER PUBLICATIONS

Declaration of Steven R. Kursh, Ph.D., CSDP, CLP, CBM2014-00115, Filed Apr. 10, 2014, 108 pages.
Defendant Trulia, Inc.'s Answer to Complaint for Patent Infringement and Counterclaim, Demand for Jury Trial, Case No. 2:12-cv-01549-JLR, Mar. 1, 2013, 10 pages.
Defendant Trulia, Inc.'s Non-Infringement and Invalidity Contentions, Case No. 2:12-cv-01549-JLR, Jun. 21, 2013, 24 pages.
Defendant Trulia, Inc.'s Non-Infringement and Invalidity Contentions, Exhibit A, Case No. 2:12-cv-01549-JLR, Jun. 21, 2013, 267 pages.
Dempster, A.P. et al., "Maximum Likelihood from Incomplete Data via the Algorithm," Journal of the Royal Statistical Society, 1977, Series B 39 (1): 1-38, JSTOR 2984875, MR 0501537, [online], Retrieved from the Internet: URL: http://www.jstor.org/stable/2984875?origin=JSTOR-pdf, 38 pages.
Department of the Treasury, Internal Revenue Service, "How to Depreciate Property," Publication 946, made available at www.irs.gov by dated at least 2004, 112 pages.
Deposition Transcription of John A. Kilpatrick, Ph.D., Aug. 8, 2013, 263 pages.
European Examination Report, Application No. 07018380.1, dated May 16, 2013, 6 pages.
European Examination Report, Application No. 07018380.1, dated Nov. 8, 2012, 6 pages.
Evaluation Services, Inc. Steps to Analysis, not dated, 15 pages.
Evaluation Services, Inc. Warranty to Lenders Service, Inc., dated at least by Feb. 12, 1997, 144 pages.
Evans, Blanche, "Microsoft HomeAdvisor: Software Giant, Real Estate Portal," Realty Times, Mar. 30, 2000, 3 pages.
Evans, Blanche, The Hottest E-careers in Real Estate, Dearborn Financial Publishing Inc., 2000, 241 pages.
Examiner's Answer for U.S. Appl. No. 11/524,048, dated Oct. 28, 2010, 13 pages.
Fannie Mae Form 2055, Federal National Mortgage Association [online], Mar. 2005, Retrieved from the Internet: URL: https://www.fanniemae.com/content/guide_form/2055.pdf, 8 pages.
Fannie Mae Form 2075, Desktop Underwriter Property Inspection Report, Federal National Mortgage Association [online], not dated, Retrieved from the Internet: URL: https://www.fanniemae.com/content/guide_form/2075.pdf, 3 pages.
Feldman, David et al., "Mortgage Default: Classification Trees Analysis," The Pinhas Sapir Center for Development Tel-Aviv University, Discussion Paper No. 3-2003, Oct. 2003, 46 pages.
File History of U.S. Pat. No. 7,970,674, Dated Feb. 3, 2006-Apr. 2, 2013, 404 pages, Parts 1-4.
Final Office Action for U.S. Appl. No. 11/347,000, dated Jan. 3, 2012, 17 pages.
Final Office Action for U.S. Appl. No. 11/347,024, dated Feb. 3, 2011, 28 pages.
Final Office Action for U.S. Appl. No. 11/347,024, dated Feb. 3, 2011, 35 pages.
Final Office Action for U.S. Appl. No. 11/524,047, dated Jul. 23, 2010, 7 pages.
Final Office Action for U.S. Appl. No. 11/524,047, dated Sep. 28, 2012, 8 pages.
Final Office Action for U.S. Appl. No. 11/524,048, dated Dec. 8, 2009, 11 pages.
Final Office Action for U.S. Appl. No. 13/044,480, dated Feb. 19, 2014, 31 pages.
Final Office Action for U.S. Appl. No. 13/044,490, dated Mar. 14, 2013, 35 pages.
Final Office Action for U.S. Appl. No. 11/927,623, dated Sep. 19, 2011, 13 pages.
Final Written Decision for U.S. Pat. No. 7,970,674, Case IPR2013-00034, Entered Mar. 27, 2014, 44 pages.
Finkelstein, Brad, "PlatinumData Improving Value of Its Information," Origination News and SourceMedia, Inc., vol. 15, Section: Special Report, Section:2, Nov. 1, 2005, 2 pages.
First American Real Estate Solutions Releases ValuePoint4, AVM News, Thomson Media, vol. 1, Issue 10, Oct. 2002, pp. 28-29.
Fletcher, June, "High-Tech Is Coming for High-End House Sales," Wall Street Journal, Sep. 19, 1997, 1 page.
Fletcher, June, "On the Web: What's Your House Worth?," Wall Street Journal, Sep. 26, 1997, 1 page.
Fletcher, June, "Touring the Tangled Web of For-Sale-by-Owner Homes," The Wall Street Journal, Jun. 6, 1997, 1 page.
Freddie Mac Form 70, Uniform Residential Appraisal Report, Federal Home Loan Mortgage Corporation [online], Mar. 2005, Retrieved from the Internet: URL: https://www.fanniemae.com/content/guide_form/1004.pdf, 8 pages.
Freddie Mac's Home Value Explorer screen capture, dated at least by Jul. 15, 2003, 1 page.
Hill, T. and Lewicki, P., "K-Nearest Neighbors," Statistics Methods and Applications, 2007, http://www.statsoft.com/textbook/stknn.html, [internet accessed on [Dec. 6, 2007], 5 pages.
Hochgraf, Lisa, "Tools for Top Speed," Credit Union Management, vol. 26, Issue 8, Aug. 1, 2003, 4 pages.
HomeSearch Report, [online], Retrieved from the Internet via the Wayback Machine dated Dec. 10, 2005 on Jun. 19, 2013, URL: http://homesmartreports.com/samples/samplehomesearch.htm, 3 pages.
HomeSmart About, [online], Retrieved from the Internet via the Wayback Machine dated Dec. 10, 2005 http://homesmartreports.com/hs_about.htm, 2 pages.
HomeSmart Sellers, [online], Retrieved from the Internet via the Wayback Machine dated Dec. 10, 2005 on Jun. 19, 2013, URL: http://homesmartreports.com/hs_owners.htm, 1 page.
HomeSmart Terms of Use, [online], Retrieved from the Internet via the Wayback Machine dated Dec. 10, 2005 on Jun. 19, 2013, URL: http://homesmartreports.com/hs_disclaimer.htm, 3 pages.
HomeSmartReports, [online], Retrieved from the Internet via the Wayback Machine dated Oct. 13, 2005 on Jun. 19, 2013, URL: http://homesmartreports.com/, 2 pages.
HomeSmartReports, [online], Retrieved from the Internet via the Wayback Machine dated Dec. 10, 2005 on Jun. 19, 2013, URL: http://homesmartreports.com/default.aspx, 1 page.
Infinite Regression, Certificate of Copyright Registration Filing, Apr. 2, 1984, 3 pages.
Internal Revenue Service Publication 946, "How to Depreciate Property," 2004, 112 pages.
Jensen, David L., "Alternative Modeling Techniques in Computer-Assisted Mass Appraisal," Property Tax Journal, vol. 6, No. 3, Sep. 1987, pp. 193-237.
Kilpatrick, John A., "The Future of Real Estate Information," Real Estate Issues, Spring 2001, 8 pages.
Kilpatrick, John A., et al., "House Price Impacts of School District Choice," South Carolina Center for Applied Real Estate Education and Research, Dec. 28, 1998, 25 pages.
Krasilovsky, Peter, "Chris Terrill Discusses ServiceMagic's Rebranding to 'Home Advisor,'" Home Advisor, Oct. 17, 2012, 5 pages.
Lankarge, Vicki, et al., How to Increase the Value of Your Home: Simple, Budget-Conscious Techniques and Ideas That Will Make Your Home Worth Up to $100,000 More!, McGraw-Hill, 2004, 176 pages.
Mccluskey, William J. et al., "An Evaluation of MRA, Comparable Sales Analysis, and ANNs for the Mass Apraisal of Residential Properties in Northern Ireland," Assessment Journal, Jan./Feb. 1997, 8 pages.
Mcgarity, M., "The Values Debate," Mortgage Banking, vol. 65, Issue 6, Mar. 1, 2005, 14 pages.
Mcwilliams, Charlyne H., "The Tale of AVMs," Mortgage Banking, vol. 64, Issue 5, Feb. 1, 2004, 7 pages.
Meyer, Robert T., "The Learning of Multiattribute Judgment Policies," The Journal of Consumer Research, vol. 14, No. 2, Sep. 1987, 20 pages.
Microstrategy Inc.'s Opposition to Plaintiff Vasudevan Software, Inc.'s Motion for Sanctions, Case No. 11-CV-06637-RS-PSG, Jan. 4, 2013, 23 pages.
Mobasher B. "Classification Via Decision Trees in WEKA," DePaul University, Computer Science, Telecommunications, and Informa-

(56) References Cited

OTHER PUBLICATIONS tion Systems, ECT 584-Web Data Mining, 2005, http://maya.cs.depaul.edu/~classes/Ect584/WEKA/classify.html, [internet accessed on Dec. 6, 2007], 5 pages.
Morton, T. Gregory, Regression Analysis Appraisal Models: Selected Topics and Issues, Center for Real Estate and Urban Economic Studies, University of Connecticut, Real Estate Report: No. 19, Oct. 1976, 85 pages.
Motion for Pro Hac Vice Admission and Exhibit A for U.S. Pat. No. 7,970,674, Case No. IPR2013-00034, Filing Date Dec. 17, 2012, 13 pages.
MSN House & Home—More Useful Everyday screen capture, [online], Retrieved from the Internet via the Wayback Machine dated Mar. 23, 2003 on Jun. 19, 2013, URL: http://web.archive.org/web/20030323183505/http://houseandhome.msn.com/, 2 pages.
Mullaney, Timothy J., "A new Home Site on the Block," Bloomberg Businessweek [online], Feb. 7, 2006, Retrieved from the Internet: URL: http://www.businessweek.com/stories/2006-02-07/a-new-home-site-on-the-block, 3 pages.
Munarriz, Rick A., "Pop Goes the Bubble," The Motley Fool, Fool.com [online] Feb. 14, 2006, Retrieved from the Internet; URL: http://www.fool.com/investing/small-cap/2006/02/14/pop-goes-the-bubble.aspx, 4 pages.
Non-Final Office Action for U.S. Appl. No. 11/524,047, dated May 7, 2012, 7 pages.
Non-Final Office Action for U.S. Appl. No. 11/524,047, dated Nov. 4, 2013, 8 pages.
Non-Final Office Action for U.S. Appl. No. 13/044,480, dated Oct. 24, 2013, 29 pages.
Non-Final Office Action for U.S. Appl. No. 11/347,000, dated Oct. 27, 2010, 23 pages.
Non-Final Office Action for U.S. Appl. No. 11/347,000, dated Nov. 23, 2012, 6 pages.
Non-Final Office Action for U.S. Appl. No. 11/347,000, dated Apr. 9, 2010, 18 pages.
Non-Final Office Action for U.S. Appl. No. 11/347,000, dated May 27, 2011, 13 pages.
Non-Final Office Action for U.S. Appl. No. 11/347,024, dated Dec. 10, 2009, 45 pages.
Non-Final Office Action for U.S. Appl. No. 11/347,024, dated May 13, 2010, 33 pages.
Non-Final Office Action for U.S. Appl. No. 11/524,047, dated Oct. 28, 2009, 8 pages.
Non-Final Office Action for U.S. Appl. No. 11/524,047, dated Jul. 8, 2011, 7 pages.
Non-Final Office Action for U.S. Appl. No. 11/524,048, dated Apr. 29, 2009, 10 pages.
Non-Final Office Action for U.S. Appl. No. 11/927,623, dated Dec. 28, 2010, 10 pages.
Non-Final Office Action for U.S. Appl. No. 11/971,758, dated Feb. 2, 2011, 22 pages.
Non-Final Office Action for U.S. Appl. No. 13/044,490, dated Oct. 11, 2012, 30 pages.
Non-Final Office Action for U.S. Appl. No. 13/417,804, dated Feb. 26, 2014, 13 pages.
Notice of Allowability and Examiner-Initiated Interview Summary for U.S. Appl. No. 11/524,048, dated Jul. 3, 2013, 11 pages.
Notice of Allowance for U.S. Appl. No. 11/347,024, dated Apr. 18, 2011, 7 pages.
Notice of Allowance for U.S. Appl. No. 11/524,048, dated Feb. 25, 2013, 14 pages.
Notice of Allowance for U.S. Appl. No. 11/971,758, dated Nov. 10, 2011, 12 pages.
Notice of Allowance for U.S. Appl. No. 11/347,000, dated Oct. 24, 2013, 12 pages.
Notice of Allowance for U.S. Appl. No. 14/191,388, dated Jun. 25, 2014, 9 pages.
Notice of Appeal for U.S. Pat. No. 7,970,674, Case IPR2013-00034, May 1, 2014, 5 pages.

O'Brien, Jeffrey M., "What's Your House Really Worth?," Fortune [online], Feb. 15, 2007, Retrieved from the Internet: URL: http://money.cnn.com/magazines/fortune/fortune_archive/2007/02/19/8400262/index.htm, 6 pages.
Oldham, Jennifer, "Pricing's Tangled Web, Consumers Using the Internet to Calculate Home Values Find that the Results-and Data They're Based on—Vary," Los Angeles Times, Jul. 30, 2000, 5 pages.
One-month Office Action for U.S. Appl. No. 11/347,000, dated Jul. 26, 2013, 6 pages.
Oral Hearing Petitioner Demonstratives, U.S. Pat. No. 7,970,674, Case IPR2013-00034, File Date Nov. 19, 2013, 85 pages.
Oral Hearing Transcript for U.S. Pat. No. 7,970,674, Case IPR2013-00034, Held Nov. 21, 2013, Entered Feb. 20, 2014, 96 pages.
Order Authorizing Motion for Pro Hac Vice Admission for U.S. Pat. No. 7,970,674, Case No. IPR2013-00034, Filing Date Jan. 3, 2013, 4 pages.
Pagourtzi, E. et al., "Real Estate Appraisal: A Review of Valuation Methods," Journal of Property Investment & Finance, vol. 21, No. 4, 2003, pp. 383-401.
PASS screen capture, dated at least by Oct. 20, 2004, 1 page.
Patent Owner's Demonstrative Exhibit for Oral Hearing, U.S. Pat. No. 7,970,674, Case IPR2013-00034, Exhibit 2023, File Date Nov. 19, 2013, 56 pages.
Patent Owner's Observations on Cross Examination of Dr. Richard A. Borst, Ph.D., U.S. Pat. No. 7,970,674, Case IPR2013-00034, Oct. 10, 2013, 9 pages.
Patent Owner's Response to Revised Petition for Inter Partes Review for U.S. Pat. No. 7,970,674, Case No. IPR2013-00034, Jun. 14, 2013, 41 pages.
Patent Owner's Response to the Petition for Covered Business Method Patent Review for U.S. Pat. No. 7,970,674, Case No. CBM2013-00056, Jun. 20, 2014, 72 pages.
Petition for Covered Business Method Patent Review for U.S. Pat. No. 7,970,674, CBM2013-00056, Sep. 11, 2013, 87 pages.
Petition for Covered Business Method Patent Review for U.S. Pat. No. 7,970,674, CBM2014-00115, Apr. 10, 2014, 69 pages.
Petition for Inter Partes Review for U.S. Pat. No. 7,970,674, Case No. IPR2013-00034, Mail Date Oct. 26, 2012, 65 pages.
Petitioner Response to Patent Owner's Observations on Cross Examination of Dr. Richard A. Borst, Ph.D., U.S. Pat. No. 7,970,674, Case IPR2013-00034, Oct. 24, 2013, 7 pages.
Petitioner's Reply to Patent Owner Response to Petition, U.S. Pat. No. 7,970,674, Case No. IPR2013-00034, Aug. 26, 2013, 20 pages.
Plaintiff Vasudevan Software, Inc.'s Notice of Motion and Motion for Sanctions Against Microstrategy, Case No. 3:11-06637-RS-PSG, Dec. 12, 2012, 23 pages.
Plaintiff Vasudevan Software, Inc.'s Reply in Support of Motion for Sanctions Against Microstrategy, Case No. 3:11-06637-RS-PSG, Jan. 14, 2013, 25 pages.
Potharst, R. et al., "Classification Trees for Problems with Monotonicity Constraints," ACM SIGKDD Explorations Newsletter 4.1, 2002, pp. 1-10.
Potharst, R. et al., "Classification Trees for Problems with Monotonicity Constraints," ERIM Report Series Research in Management, Erasmus Research Institute of Mangement, Apr. 2002, 39 pages.
PowerBase 6.0 screen capture, dated at least by Oct. 20, 2004, 1 page.
Prasad, Nalini et al., "Measuring Housing Price Growth—Using Stratification to Improve Median-based Measures", Reserve Bank of Australia, 2006, p. 1.
Preliminary Patent Owner Response and Exhibits for U.S. Pat. No. 7,970,674, Case No. IPR2013-00034, Feb. 15, 2013, 228 pages.
Preliminary Patent Owner Response for U.S. Pat. No. 7,970,674, Case No. CBM2013-00056, Dec. 18, 2013, 85 pages.
Preliminary Patent Owner Response for U.S. Pat. No. 7,970,674, Case No. IPR2013-00034, Feb. 15, 2013, 39 pages.
Real-info.com, "What is an AVM," www.real-info.com/products_avm.asp? Internet Archive Date: Oct. 30, 2005, [accessed Mar. 21, 2007], 5 pages.
RealEstateABC.com, see paragraph headed "How do I make the estimate more accurate?" www.realestateabc.com/home-values/ <http://

(56) References Cited

OTHER PUBLICATIONS www.realestateabc.com/home-values/>, Internet Archive Dated: Apr. 5, 2006, [accessed Mar. 20, 2007], 4 pages.
RealQuest.com screen capture, dated at least by Dec. 12, 2002, 1 page.
RealQuest.com screen capture, dated at least by Oct. 20, 2004, 1 page.
RealQuest.com ValuePoint R4 Report screen capture, dated at least by Sep. 30, 2002, 1 page.
RealQuest.com Vector screen capture, dated at least by Oct. 20, 2004, 1 page.
Reis SE 2.0 User Guide Book, Reis, 2004, 40 pages.
Reis SE 2.0 User Guide Book, Reis, 2005, 37 pages.
Reis Valuation and Credit Risk Analysis Module Overview, [online], Sep. 18, 2003, Retrieved from the Internet via the Wayback Machine dated Sep. 19, 2003 on Jun. 17, 2013, URL: http://www.reiscom/valuation/valuationOverview.cfm, 2 pages.
Replacement Oral Hearing Petitioner Demonstratives, U.S. Pat. No. 7,970,674, Case IPR2013-00034, Exhibit 2023, Oral Hearing Date Nov. 21, 2013, 83 pages.
Replacement Patent Owner's Demonstrative Exhibit for Oral Hearing, U.S. Pat. No. 7,970,674, Case IPR2013-00034, File Date Nov. 21, 2013, 36 pages.
Reply Brief for U.S. Appl. No. 11/524,048, Dec. 22, 2010, 6 pages.
Request for Rehearing for U.S. Pat. No. 7,970,674, Case No. IPR2013-00034, Apr. 16, 2013, 8 pages.
Requirement Under Rule 105 for U.S. Appl. No. 11/927,623, Jul. 2, 2014, 4 pages.
Response to Decision on Appeal for U.S. Appl. No. 11/524,048, Dec. 19, 2012, 7 pages.
Response to Final Office Action for U.S. Appl. No. 11/347,024, dated Mar. 4, 2011, 17 pages.
Revised Petition for Inter Partes Review for U.S. Pat. No. 7,970,674, Case No. IPR2013-00034, dated Nov. 13, 2012, 55 pages.
Rossini, Peter, "Using Expert Systems and Artificial Intelligence for Real Estate Forecasting," Sixth Annual Pacific-Rim Real Estate Society Conference, Sydney, Australia, Jan. 24-27, 2000, 10 pages.
Rye, Owen E., "A Multiple Criteria Analysis Model for Real Estate Evaluation," Journal of Global Optimization 12.2, Mar. 1998, pp. 197-214.
Rye, Owen E., "Automated Property Assessment," Transactions of the American Association of Cost Engineers, Nov. 2004, pp. 28-32.
Sample Appraisal Report of a Single-Family Residence, U.S. Appraisal, Sep. 15, 1982, 16 pages.
Sample HomeSmart Value Report, [online], Retrieved from the Internet via the Wayback Machine dated Dec. 10, 2005 on Jun. 19, 2013, URL: http://homesmartreports.com/samples/samplevaluation.htm, 4 pages.
Sample Residential Appraisal Report, U.S.Appraisal, Jul. 16, 1982, 2 pages.
Simons, R. A., "Chapter 6: Valuation of Impaired Property," When Bad Things Happen to Good Property, Throupe, R. et al., Environmental Law Institute, May 2006, 30 pages.
Software Referral Agreement with Sole Source Provision between Sperry Corporation and U.S.Appraisal, May 1985, 47 pages.
Standard & Poors, "Guidelines for the use of Automated Valuation Models for U.K. RMBS Transactions," http://www.rics.org/NR/rdonlyres/8Fcdd20c-7FAC-4549-86FB-3930CD0CBC05/0/StandardandPoorsReportonAVMs.pdf, Published Feb. 20, 2004, 4 pages.
StatSoft, Inc., "Classification Trees," http://www.statsoft.com/textbook/stclatre.html, ā1984-2003 [accessed Dec. 13, 2005], pp. 1-20.
Svetnik et al., "Random Forest: A Classification and Regression Tool for Compound Classification and QSAR Modeling", J Chem Info. Computer Science, vol. 43, 2003, pp. 1947-1958.
System Operations Manual for "The Research Assistant", Evaluation Services, Inc., Feb. 12, 1997, 92 pages.
System Operations Manual, "The Research Assistant", Database Valuation Version, Evaluation Services, Inc., Feb. 12, 1997, 35 pages.
Tay et al., "Artificial Intelligence and the Mass Appraisal of Residential Apartments," Journal of Property Valuation and Investment, Feb. 1, 1992, 17 pages.
The Appraisal, An Automated Computerized Appraisal System, U.S.Appraisal, not dated, 4 pages.
The Appraiser, An Automatic Computerized Appraisal System, U.S.Appraisal, not dated, 4 pages.
The Assessor, A Computerized Assessment System, NCR Corporation, 1986, 6 pages.
The MicroAppraisal, Certificate of Copyright Registration, Feb. 2, 1984, 2 pages.
Transcript of Deposition of R. A. Borst, Ph. D., Case IPR2013-00034 (JL), Transcribed Sep. 19, 2013, 177 pages.
Transcript of Proceedings in Case No. C 11-06637 RS, Jan. 24, 2013, 24 pages.
U.S.Appraisal Business Plan, dated at least since Aug. 1, 1985, 30 pages.
U.S.Appraisal Offering Memorandum, Sep. 12, 1984, 66 pages.
US. Appraisal Profit and Loss Proforma, dated at least since Aug. 1, 1985, 38 pages.
Valuation Reports, Schedule A, U.S. Appraisal, dated at least by Nov. 1, 1986, 6 pages.
Valuations, Claims Cross Engines, Inman News Features, Dec. 10, 2002, 1 page.
ValueWizard screen capture, not dated, 1 page.
Vapnik et al., "Support-Vector Networks," Machine Learning, vol. 20, 1995, 25 pages.
VeroValue screen capture, dated at least by Sep. 30, 2004, 1 page.
Visual PAMSPro 2000, [online], Retrieved from the Internet via the Wayback Machine dated Mar. 4, 2001 on Jun. 19, 2013, URL: http://www.visualpamspro.com/prod01.htm, 2 pages.
Visual PAMSPro Custom Add Ins, [online], Retrieved from the Internet via the Wayback Machine dated Mar. 5, 2001 on Jun. 19, 2013, URL: http://www.visualpamspro.com/serv04.htm, 2 pages.
Visual PAMSPro Downloads, [online], Retrieved from the Internet via the Wayback Machine dated Mar. 2, 2001 on Jun. 19, 2013, URL: http://www.visualpamspro.com/download.htm, 1 page.
Visual PAMSPro Home, [online], Retrieved from the Internet via the Wayback Machine dated Mar. 2, 2001 on Jun. 19, 2013, URL: http://www.visualpamspro.com/, 1 page.
Visual PAMSPro News, [online], Retrieved from the Internet via the Wayback Machine dated Mar. 2, 2001 on Jun. 19, 2013, URL: http://www.visualpamspro.com/news.htm, 2 pages.
Visual PAMSPro Products, [online], Retrieved from the Internet via the Wayback Machine dated Mar. 2, 2001 on Jun. 19, 2013, URL: http://www.visualpamspro.com/products.htm, 1 page.
Visual PAMSPro Real Estate Appraisal Software, Appraisal Software Real Estate, [online], Retrieved from the Internet via the Wayback Machine dated Sep. 2, 2001 on Jun. 19, 2013, URL: http://www.visualpamspro.com/prodvpp2.htm, 6 pages.
Visual PAMSPro Tips and Tricks, [online], Retrieved from the Internet via the Wayback Machine dated Mar. 2, 2001 on Jun. 19, 2013, URL: http://www.visualpamspro.com/Tips-Tricks.htm, 1 page.
Wikipedia, Expectation-maximization Algorithm, [online] Retrieved from the Internet via the Wayback Machine dated Dec. 21, 2013 on Feb. 28, 2014, URL: http://en.wikipedia.org/wiki/Expectation%E2%80%93maximization_algorithm, 13 pages.
Bennett, Kristin P., "Support Vector Machines: Hype or Hallelujah?" SIGKDD Explorations, Dec. 2000, vol. 2, issue 2, ACM SIGKDD, 13 pages.
FHFA, "Distress-Free House Price Indexes." https://www.fhfa.gov/DataTools/Downloads/Documents/HPI_Focus_Pieces/201202_HPI_N508.pdf. Jul. 13, 2014.
Final Office Action for U.S. Appl. No. 13/828,680, dated Jul. 26, 2016, 59 pages.
Final Office Action for U.S. Appl. No. 13/843,577, dated Mar. 22, 2016, 63 pages.
Final Office Action for U.S. Appl. No. 14/078,076, dated Feb. 26, 2016, 21 pages.

(56) References Cited

OTHER PUBLICATIONS

Final Office Action for U.S. Appl. No. 11/927,623, dated Nov. 3, 2016, 15 pages.
Inman, "Zilpy, the new 'Z' site in online real estate", published Feb. 7, 2008, retrieved from http://www.inman.com/2008/02/07/zilpy-new-z-site-in-online-real-estate/ on Aug. 11, 2016, 2 pages.
Melville, J., "How much should I charge to rent my house?", published Dec. 5, 2010, retrieved from http://homeguides.sfgate.com/much-should-charge-rent-house-8314.html on Aug. 11, 2016, 2 pages.
MRMLS Realist Tax System Foreclosure User Guide, crmls.org/help/realist_manuals/realist_foreclosure.pdf. Oct. 30, 2007.
Non-Final Office Action for U.S. Appl. No. 11/927,623, dated Jan. 11, 2016, 13 pages.
Non-Final Office Action for U.S. Appl. No. 13/044,490, dated Jan. 14, 2016, 18 pages.
Non-Final Office Action for U.S. Appl. No. 13/828,680, dated Dec. 15, 2015, 42 pages.
Non-Final Office Action for U.S. Appl. No. 13/830,497, dated Sep. 14, 2016, 52 pages.
Non-Final Office Action for U.S. Appl. No. 14/078,076, dated Oct. 19, 2016, 29 pages.
Non-Final Office Action for U.S. Appl. No. 13/044,480, dated Aug. 17, 2016, 40 pages.
Non-Final Office Action for U.S. Appl. No. 13/044,490, dated Jul. 22, 2016, 11 pages.
Non-Final Office Action for U.S. Appl. No. 14/041,450, dated Aug. 18, 2016, 48 pages.
Non-Final Office Action for U.S. Appl. No. 12/924,037, dated Nov. 10, 2016, 19 pages.
Notice of Allowance for U.S. Appl. No. 13/417,804, dated Aug. 18, 2016, 15 pages.
Quirk, B., "Zilpy.com launches a rental data website built in partnership with Zillow!!!", published Jan. 29, 2008, retrieved from http://www.propertymanagementmavens.com/archives/2008/1 on Aug. 11, 2016, 3 pages.
Final Office Action for U.S. Appl. No. 12/924,037, dated Jul. 19, 2017, 25 pages.
Final Office Action for U.S. Appl. No. 14/078,076, dated Jul. 27, 2017, 32 pages.
Final Office Action for U.S. Appl. No. 13/044,480, dated Jun. 12, 2017, 55 pages.
Final Office Action for U.S. Appl. No. 13/044,490, dated Mar. 29, 2017, 7 pages.
Final Office Action for U.S. Appl. No. 13/830,497, dated Jun. 8, 2017, 57 pages.
Final Office Action for U.S. Appl. No. 14/041,450, dated Apr. 6, 2017, 47 pages.
Non-Final Office Action for U.S. Appl. No. 13/843,577, dated Dec. 19, 2016, 80 pages.
Non-Final Office Action for U.S. Appl. No. 14/167,962, dated Apr. 6, 2017, 22 pages.
U.S. Appl. No. 15/456,235 of VanderMey et al., filed Mar. 10, 2017.
U.S. Appl. No. 15/439,388 of Bruce et al., filed Feb. 22, 2017.
U.S. Appl. No. 12/924,037 of Flint et al., filed Sep. 16, 2010.
U.S. Appl. No. 14/524,148, filed Oct. 27, 2014, Humphries et al.
Final Office Action for U.S. Appl. No. 14/191,388, dated Dec. 15, 2014, 12 pages.
Final Office Action for U.S. Appl. No. 14/318,536, dated Dec. 11, 2014, 47 pages.
Non-Final Office Action for U.S. Appl. No. 11/524,047, dated Dec. 1, 2014, 26 pages.
Non-Final Office Action for U.S. Appl. No. 13/044,490, dated Dec. 17, 2014, 30 pages.
Non-Final Office Action for U.S. Appl. No. 13/417,804, dated Jan. 28, 2015, 12 pages.
Non-Final Office Action for U.S. Appl. No. 13/943,604, dated Nov. 19, 2014, 24 pages.
Non-Final Office Action for U.S. Appl. No. 14/167,962, dated Oct. 31, 2014, 23 pages.
Palmquist, Raymond B., "Alternative Techniques for Developing Real Estate Price Indexes," The Review of Economics and Statistics, vol. 62, No. 3 (Aug. 1980), pp. 442-448.
Redfin, https://web.archive.org/web/20060907212454/http :/ /www.redfin.com/stingray/do/terms-ofuse?rt=fn-tl, Wayback Machine Sep. 7, 2006.
U.S. Appl. No. 12/924,037, filed Sep. 16, 2010, Flint, Pete et al.
U.S. Appl. No. 13/843,577, filed Mar. 15, 2013, Humphries, Stanley B., et al.
U.S. Appl. No. 14/078,076, filed Nov. 12, 2013, Daimler, Matthew S., et al.
U.S. Appl. No. 14/709,719, filed May 12, 2015, Humpries, Stanley et al.
U.S. Appl. No. 14/721,437, filed May 26, 2015, Humphries, Stanley B., et al.
U.S. Appl. No. 14/846,632, filed Sep. 4, 2015, Ma, Brian et al.
U.S. Appl. No. 14/640,860, filed Mar. 6, 2015, Rao, Kristina.
U.S. Appl. No. 14/704,567, filed May 5, 2015, Wang, Yiqing et al.
Australian Examiner's First Report in Australian Patent Application 2007216858, dated Dec. 22, 2008, 2 pages.
CDR Business Solutions, LLC, What is RELAR, <http://www.relar.com/relarsystem.aspx> Aug. 24, 2011, Archivved by Internet Wayback Machine <http://web.archive.org/web/20110824084613/http://www.relar.com/relarsystem.aspx> viewed Aug. 20, 2015, pp. 1-4.
European Examination Report, Application No. 07018380.1, dated Oct. 24, 2008, 6 pages.
Final Office Action for U.S. Appl. No. 11/524,047, dated Jun. 12, 2015, 31 pages.
Final Office Action for U.S. Appl. No. 13/044,480, dated Jul. 10, 2015, 35 pages.
Final Office Action for U.S. Appl. No. 13/044,490, dated May 7, 2015, 36 pages.
Final Office Action for U.S. Appl. No. 13/943,604, dated Mar. 6, 2015, 28 pages.
Final Office Action for U.S. Appl. No. 14/167,962, dated Sep. 30, 2015, 13 pages.
Final Office Action for U.S. Appl. No. 12/924,037, dated May 16, 2013, 11 pages.
Final Office Action for U.S. Appl. No. 12/924,037, dated Jun. 16, 2015, 19 pages.
Final Office Action for U.S. Appl. No. 13/417,804, dated Oct. 14, 2015, 11 pages.
Google, Google Trends, retrieved from the internet Oct. 12, 2015 <http://www.google.com/trends> (website address only—No document).
Great Britain Examination Report in Application No. GB0701944.1, dated May 5, 2010, 3 pages.
Indeed, Job Trends: Podcast, retrieved from the internet Oct. 12, 2015 <http://www.indeed.com/jobtrends> (website only—No document).
Jobster, Job Search Trends for Keywords and Locations, retrieved from the internet Oct. 12, 2015 <http://www.jobster.com/find/US/jon/search/trends> (website only—No document).
John Battelle's Searchblog,: The Database of Intentions, Nov. 13, 2003.
Leonhardt, David, The Internet Knows What You'll Do Next, Jul. 5, 2006, http://www.nytimes.com/2006/07/05/business/05leonhardt.html?ex=1309752000&en=8be0be92819a6f8f&ei=5088&partner=rssnyt&emc=rss.
Miller et al., A Note on Leading Indicators of Housing Market Price Trends, vol. 1, No. 1, 1986.
Miller et al., Multiple Regression Condominium Valuation with a Touch of Behavioral Theory, The Appraisal Journal 1987.
Miller et al., Pricing Strategies and Residential Property Selling Prices, The Journal of Real Estate Research, vol. 2, No. 1, Nov. 1, 1987.
Miller et al., The Impact of Interest Rates and Employment on Nominal Housing Prices, International Real Estate Review, vol. 8 No. 1, pp. 26-42, 2005.
Non-Final Office Action for U.S. Appl. No. 13/044,480, dated Mar. 12, 2015, 32 pages.
Non-Final Office Action for U.S. Appl. No. 13/843,577, dated Sep. 24, 2015, 50 pages.

(56) References Cited

OTHER PUBLICATIONS

Non-Final Office Action for U.S. Appl. No. 14/167,962, dated Mar. 3, 2015, 26 pages.
Non-Final Office Action for U.S. Appl. No. 12/924,037, dated Nov. 17, 2014, 13 pages.
Non-Final Office Action for U.S. Appl. No. 12/924,037, dated Jan. 10, 2013, 9 pages.
Non-Final Office Action for U.S. Appl. No. 12/924,037, dated May 27, 2014, 14 pages.
Non-Final Office Action for U.S. Appl. No. 14/078,076, dated Aug. 14, 2015, 15 pages.
Real Info Inc., RELAR Sample Report, <http://www.real-info.com/products_RELAR.asp> Aug. 18, 2010, Archived by Internet Wayback Machine <http://web.archive.org/web/20100818012252/http://www.real-info.com/products_RELAR.asp> viewed Aug. 24, 2015, Pages.
Second Office Action in Chinese Patent Application No. 200710306194.8, dated Apr. 1, 2010, 9 pages, English translation.
Wikipedia, Survival Analysis, <http://en.wikipedia.org/wiki/Survival_analysis> Oct. 16, 2011, Archived by Internet Wayback Machine <http://web.archive.org/web/20111016061152/http://!en.wikipedia.org/wiki/Survival_analysis>, viewed Aug. 28, 2015, pages.
Zillow.com, Quarterly Report 2Q 2006, A Review of the San Francisco Real Estate Market.
Quinlan, Ross J., "C4.5: Programs for Machine Learning," Machine Learning, 1993, Morgan Kaufmann Publishers, San Francisco, CA, USA., 302 pages. Book to be mailed to USPTO.
Final Office Action for U.S. Appl. No. 13/417,804, dated Aug. 13, 2014, 14 pages.
Great Britain Search Report for GB0701944.1, dated Mar. 28, 2007, 3 pages.
Non-Final Office Action for U.S. Appl. No. 14/191,388, dated Aug. 7, 2014, 5 pages.
Non-Final Office Action for U.S. Appl. No. 14/318,536, dated Aug. 8, 2014, 38 pages.
Notice of Allowance for U.S. Appl. No. 11/524,048, dated Jul. 18, 2013, 10 pages.
ValuePoint4 Report; File No. 04040103629, Apr. 12, 2004, 3 pages.
U.S. Appl. No. 15/698,276 of Humphries et al., filed Sep. 7, 2017.
U.S. Appl. No. 15/715,098 of Moghimi, filed Sep. 25, 2017.
U.S. Appl. No. 15/789,617 of VanderMey, filed Oct. 20, 2017.
Beracha, E., et al., "The Rent versus Buy Decision: Investigating the Needed Property Appreciation Rates to be Indifferent between Renting and Buying Property." Journal of Real Estate Practice and Education, 15(2), 71-88.
Final Office Action for U.S. Appl. No. 14/167,962, dated Nov. 9, 2017, 23 pages.
Final Office Action for U.S. Appl. No. 13/843,577, dated Oct. 6, 2017, 83 pages.
Non-Final Office Action for U.S. Appl. No. 14/041,450, dated Nov. 16, 2017, 11 pages.
Non-Final Office Action for U.S. Appl. No. 14/704,567, dated Dec. 7, 2017, 19 pages.
Non-Final Office Action for U.S. Appl. No. 12/924,037, dated Jan. 10, 2018, 17 pages.
Non-Final Office Action for U.S. Appl. No. 13/044,490, dated Jan. 24, 2018, 8 pages.
Non-Final Office Action for U.S. Appl. No. 13/828,680, dated Nov. 16, 2017, 47 pages.
Non-Final Office Action for U.S. Appl. No. 14/524,148, dated Dec. 15, 2017, 27 pages.
Non-Final Office Action for U.S. Appl. No. 14/721,437, dated Dec. 18, 2017, 53 pages.
Non-Final Office Action for U.S. Appl. No. 14/846,632, dated Jan. 16, 2018, 9 pages.
Non-Final Office Action for U.S. Appl. No. 11/927,623, dated Oct. 6, 2017, 15 pages.
Non-Final Office Action for U.S. Appl. No. 14/709,719, dated Jan. 31, 2018, 11 pages.
U.S. Appl. No. 15/996,787 of VanderMey, filed Jun. 4, 2018.
Archer, W.R. et al., "Measuring the Importance of Location in House Price Appreciation", J. of Urban Economics, vol. 40, 1996, pp. 334-353, accessible at https://www.sciencedirect.com/science/article/pii/S0094119096900364 (accessed Feb. 26, 2018). (Year: 1996).
Campbell, "Forced Sales and House Prices", 101 American Economic Review 2108, pp. 2108-2131, Aug. 2011.
Clauretie, "Estimating the House Foreclosure Discount Corrected for Spatial Price Interdependence and Endogeneity of Marketing Time", 37 Real Estate Economics 43, pp. 44-48, 2009.
Final Office Action for U.S. Appl. No. 14/041,450, dated Jun. 29, 2018, 14 pages.
Final Office Action for U.S. Appl. No. 14/704,567, dated May 1, 2018, 24 pages.
Final Office Action for U.S. Appl. No. 12/924,037, dated Jun. 7, 2018, 19 pages.
Final Office Action for U.S. Appl. No. 14/524,148, dated Jul. 19, 2018, 54 pages.
Final Office Action for U.S. Appl. No. 13/828,680, dated Jul. 11, 2018, 59 pages.
Final Office Action for U.S. Appl. No. 14/846,632, dated Jun. 11, 2018, 16 pages.
Gelfand, A.E. et al., "The Dynamics of Location in Home Price," J. of Real Estate Fin. and Econ., vol. 29:2, 2004, pp. 149-166, accessible at https://link.springer.com/content/pdf/10.1023%2FB%3AREAL.0000035308.15346.0a.pdf (accessed Feb. 26, 2018). (Year: 2004).
Humphries, S., "Foreclosure Liquidations Abate in the Fourth Quarter But at the Expense of Number of Homes Underwater," Zillow Research, Feb. 8, 2011, 3 pages.
Non-Final Office Action for U.S. Appl. No. 13/044,480, dated May 2, 2018, 51 pages.
Non-Final Office Action for U.S. Appl. No. 11/927,623, dated Mar. 26, 2018, 15 pages.
Non-Final Office Action for U.S. Appl. No. 14/640,860, dated Mar. 7, 2018, 141 pages.
Non-Final Office Action for U.S. Appl. No. 13/830,497, dated Apr. 12, 2018, 48 pages.
Notice of Allowance for U.S. Appl. No. 13/044,490, dated May 22, 2018, 8 pages.
Notice of Allowance for U.S. Appl. No. 14/167,962, dated Apr. 9, 2018, 11 pages.
Notice of Allowance for U.S. Appl. No. 14/167,962, dated May 14, 2018, 8 pages.
Quercia, R.G. et al., "Spatio-Temporal Measurement of House Price Appreciation in Underserved Areas," J. of Housing Research, vol. 11, 2000, available at https://pdfs.semanticscholar.org/3a44/ddfbc508f61f8952d7e440c37cfdfaf441 ba.pdf (accessed Feb. 26, 2018). (Year: 2000).
Roth, JD, "Is it Better to Rent or to Buy?" Time Business, Dec. 3, 2012, 2 pages.
U.S. Appl. No. 16/125,318 for Humphries, filed Sep. 7, 2018.
U.S. Appl. No. 16/129,282 for Humphries, filed Sep. 12, 2018.
Final Office Action for U.S. Appl. No. 14/721,437, dated Nov. 9, 2018, 84 pages.
Final Office Action for U.S. Appl. No. 14/709,719, dated Aug. 3, 2018, 27 pages.
Final Office Action for U.S. Appl. No. 14/640,860, dated Oct. 23, 2018, 85 pages.
Non-Final Office Action for U.S. Appl. No. 12/924,037, dated Nov. 7, 2018, 10 pages.
Non-Final Office Action for U.S. Appl. No. 13/843,577, dated Aug. 30, 2018, 63 pages.
Readyratios.com, "Cost Approach to Value," https://www.readyratios.com/reference/appraisal/cost_approach_to_value.html, archived on Jul. 16, 2013, https://web.archive.org/web/20130716153950/https:www.readyratios.com/reference/appraisal/cost_approach_to_value.html, viewed Oct. 30, 2018, p. 1.
U.S. Appl. No. 16/235,009 for Humphries, filed Dec. 28, 2018.
Notice of Allowance for U.S. Appl. No. 13/044,490, dated Dec. 5, 2018, 6 pages.
Final Office Action for U.S. Appl. No. 13/044,480, dated Dec. 14, 2018, 35 pages.

(56) References Cited

OTHER PUBLICATIONS

Non-Final Office Action for U.S. Appl. No. 14/846,632, dated Dec. 26, 2018, 13 pages.
Non-Final Office Action for U.S. Appl. No. 14/041,450, dated Jan. 8, 2019, 23 pages.
Final Office Action for U.S. Appl. No. 11/927,623, dated Jun. 14, 2019, 18 pages.
Blelloch, G.E., "Prefix Sums and Their Applications," School of Computer Science, Carnegie Mellon University, 26 pages.
Manski, C et al., "Monotone Instrumental Variables: With an Application to the Returns to Schooling," Econometrica 68 (Jul. 2000) pp. 997-1010.
Non-Final Office Action for U.S. Appl. No. 15/446,283, dated Oct. 10, 2019, 21 pages.
Non-Final Office Action for U.S. Appl. No. 15/439,388, dated Oct. 18, 2019, 76 pages.
Non-Final Office Action for U.S. Appl. No. 15/698,276, dated Oct. 16, 2019, 34 pages.
Notice of Allowance for U.S. Appl. No. 14/704,567, dated Oct. 15, 2019, 17 pages.
Oladunni, T et al., "Predictive Real Estate Multiple Listing System Using MVC Architecture and Linear Regression," ISCA 24th International Conference on Software Engineering and Data Engineering, 2015.
Oladunni, T. et al., "Hedonic Housing Theory—A Machine Learning Investigation," 2016.
Travis, M.R. et al., "VIEWIT: computation of seen areas, slope, and aspect for land-use planning," Pacific Southwest Forest and Range Experiment Station, PWS—Nov. 1975, 11 pages.
Van Kreveld, M., "Variations on Sweep Algorithms: efficient computation of extended viewsheds and class intervals," Dept. of Computer Science, Utrecth University, 14 pages.
Wen, H.Z.. et al., "An improved method of real estate evaluation based on Hedonic price model," IEEE International Engineering Management Conference, 2004.
Zurowski, B, "Essays in Social and Behavioral Economics," Retrieved from the University of Minnesota Digital Conservancy, http://hdl.handle.net/11299/175495, 2015.
Final Office Action for U.S. Appl. No. 14/041,450, dated Sep. 24, 2019, 22 pages.
Final Office Action for U.S. Appl. No. 14/846,632, dated Aug. 6, 2019, 16 pages.
Non-Final Office Action for U.S. Appl. No. 14/640,860, dated Sep. 6, 2019, 83 pages.
Non-Final Office Action for U.S. Appl. No. 13/828,680, dated Jul. 1, 2019, 63 pages.
Non-Final Office Action for U.S. Appl. No. 14/721,437, dated Aug. 22, 2019, 84 pages.
Notice of Allowance for U.S. Appl. No. 13/044,480, dated Jun. 26, 2019, 17 pages.
U.S. Appl. No. 16/449,210 for Flint et al., filed Jun. 21, 2019.
U.S. Appl. No. 16/178,457 for Martin et al., filed Nov. 1, 2018.
U.S. Appl. No. 16/457,390 for Shahbazi et al., filed Jun. 28, 2019.
Non-Final Office Action for U.S. Appl. No. 14/704,567, dated Apr. 1, 2019, 29 pages.
Non-Final Office Action for U.S. Appl. No. 14/709,719, dated Jun. 3, 2019, 29 pages.
Notice of Allowance for U.S. Appl. No. 12/924,037, dated Apr. 24, 2019, 11 pages.
Eamer, M., "ZipRealty and Redfin Integrate with Zillow's API," via the Wayback Machine as published on Oct. 23, 2006.
Final Office Action for U.S. Appl. No. 13/828,680, dated Jan. 3, 2020, 60 pages.
Final Office Action for U.S. Appl. No. 14/709,719, dated Dec. 2, 2019, 35 pages.
Gudell, Svenja, "One More Advance in Creating a Better Price-to-Rent Ratio", retrieved from the Internet, URL: https://www.zillow.com/research/one-more-advance-in-creating-a-better-price-to-rent-ratio-2968, Jul. 27, 2012, 4 pages.
Kottle, M.L., Zillow traffic up after shift; site known for real estate prices decided to add for-sale listings. San Francisco Chronicle.
Non-Final Office Action for U.S. Appl. No. 11/927,623, dated Nov. 5, 2019, 18 pages.
Non-Final Office Action for U.S. Appl. No. 14/524,148, dated Nov. 1, 2019, 44 pages.
Non-Final Office Action for U.S. Appl. No. 14/846,632, dated Nov. 29, 2019, 24 pages.
Non-Final Office Acton for U.S. Appl. No. 16/235,009, dated Jan. 24, 2020, 18 pages.
U.S. Appl. No. 16/665,426 for Humphries et al., filed Oct. 28, 2019.
Final Office Action for U.S. Appl. No. 15/698,276, dated Apr. 9, 2020, 32 pages.
Final Office Action for U.S. Appl. No. 14/846,632, dated May 7, 2020; 22 pages.
Final Office Action for U.S. Appl. No. 16/235,009, dated Jul. 13, 2020; 21 pages.
Final Office Action for U.S. Appl. No. 14/524,148, dated Mar. 9, 2020, 62 pages.
Final Office Action for U.S. Appl. No. 14/640,860, dated Apr. 14, 2020, 85 pages.
Final Office Action for U.S. Appl. No. 14/721,437, dated Apr. 16, 2020, 103 pages.
Final Office Action for U.S. Appl. No. 11/927,623, dated Jun. 12, 2020, 15 pages.
Mikhed, V., et al., "Testing for Bubbles in Housing Markets: A Panel Data Approach," The Journal of Real Estate Finance and Economics, vol. 38, 2007, pp. 366-386.
Nazerzadeh, H., "Internet Advertising: Optimization and Economic Aspects," Stanford University, 2009, 6 pages.
Non-Final Office Action for U.S. Appl. No. 15/789,617, dated Mar. 26, 2020, 37 pages.
Non-Final Office Action for U.S. Appl. No. 16/125,318, dated Mar. 13, 2020, 20 pages.
Notice of Allowance for U.S. Appl. No. 14/704,567, dated Jun. 25, 2020, 17 pages.
Notice of Allowance for U.S. Appl. No. 15/439,388, dated Jan. 23, 2020, 12 pages.
Notice of Allowance for U.S. Appl. No. 15/439,388, dated May 27, 2020, 12 pages.
Notice of Allowance for U.S. Appl. No. 14/078,076, dated Apr. 10, 2020, 9 pages.
Notice of Allowance for U.S. Appl. No. 14/078,076, dated May 20, 2020, 17 pages.
Remodeling Magazine, Remodeling Cost vs Value Report 2006, Hanley Wood LLC, pp. 1-6.
Turner, J., "Ad Slotting and Pricing: New Media Planning Models for New Media," Carnegie Mellon University, Apr. 23, 2010, 132 pages.
De Floriani, L. et al., "Algorithms for visibiliyt computation on terrains: a survey," Environment and Planning B: Planning and Design 2003, vol. 30, pp. 709-728.
Final Office Action for U.S. Appl. No. 16/125,318, dated Aug. 25, 2020, 25 pages.
Final Office Action for U.S. Appl. No. 15/789,617, dated Sep. 3, 2020, 45 pages.
Igan et al., "Global Housing Cycles," IMF Working Paper, Aug. 2012, pp. 1-55.
Non-Final Office Action for U.S. Appl. No. 13/828,680, dated Jul. 27, 2020, 66 pages.
Non-Final Office Action for U.S. Appl. No. 14/524,148, dated Aug. 3, 2020, 65 pages.
Non-Final Office Action for U.S. Appl. No. 14/709,719, dated Sep. 4, 2020, 38 pages.
Notice of Allowance for U.S. Appl. No. 14/846,632, dated Sep. 16, 2020, 11 pages.
U.S. Appl. No. 16/930,603 for Daimler et al. filed Jul. 16, 2020.
U.S. Appl. No. 17/002,969 for Bruce et al. filed Aug. 26, 2020.
U.S. Appl. No. 17/025,330 for Abdallah et al. filed Sep. 18, 2020.

\* cited by examiner

| home id | feature id | distance | intervening streets | intervening parcels |
|---|---|---|---|---|
| 667134912 | 119642 | 0 m | 0 | 0 |
| 67321419 | 119642 | 90 m | 1 | 0 |
| 67321419 | 121316 | 140 m | 0 | 2 | home feature table — 300

Henderson County recent sales table — 800

| id | address | sq. ft. | bedrooms | bathrooms | floors | view | year | selling price | date |
|---|---|---|---|---|---|---|---|---|---|
| 1 | 111 Main St., Hendricks, IL 62012 | 1850 | 4 | 2 | 2 | no | 1953 | $132,500 | 1/3/2005 |
| 2 | 96 Elm St., Hendricks, IL 62014 | 2220 | 6 | 2 | 3 | no | 1965 | $201,000 | 1/8/2005 |
| 3 | 140 Cottontail Rd., Baron, IL 62019 | 1375 | 3 | 1 | 1 | no | 1974 | $98,750 | 1/11/2005 |
| 4 | 6 Spratt Ln., Baron, IL 62019 | 1590 | 2 | 2 | 1 | no | 1973 | $106,500 | 1/14/2005 |
| 5 | 776 Fir St., Hendricks, IL 62014 | 2280 | 3 | 3 | 2 | yes | 1948 | $251,000 | 1/26/2005 |
| 6 | 111 Industry Ave., Fenton IL 62017 | 1950 | 2 | 2 | 1 | no | 1925 | $240,000 | 2/4/2005 |
| 7 | 105 Elm St., Hendricks, IL 62014 | 2180 | 5 | 2 | 3 | yes | 1940 | $230,000 | 2/4/2005 |
| 8 | 110 Muffet St., Baron, IL 62019 | 1675 | 4 | 2 | 1 | no | 1975 | $74,900 | 2/14/2005 |
| 9 | 156 Elm St., Hendricks, IL 62014 | 2400 | 6 | 3 | 2 | yes | 1938 | $253,500 | 2/15/2005 |
| 10 | 142 Cottontail Rd., Baron, IL 62019 | 1450 | 3 | 1 | 1 | no | 1966 | $102,000 | 2/18/2005 |
| 11 | 160 Prospect Blvd., Fenton IL 62017 | 1952 | 4 | 2 | 1 | no | 1920 | $230,000 | 2/20/2005 |
| 12 | 36 Spratt Ln., Baron, IL 62019 | 1475 | 4 | 2 | 1 | no | 1964 | $111,000 | 2/20/2005 |
| 13 | 118 Main St., Hendricks, IL 62012 | 2140 | 5 | 2 | 2 | no | 1935 | $211,000 | 2/21/2005 |
| 14 | 234 Cottontail Rd., Baron, IL 62019 | 1980 | 4 | 3 | 2 | yes | 1930 | $197,900 | 2/24/2005 |
| 15 | 677 Fir St., Hendricks, IL 62014 | 2320 | 5 | 3 | 3 | yes | 1927 | $238,000 | 2/28/2005 |

| id | address | bedrooms | view | selling price |
|---|---|---|---|---|
| | | | | tree 1 basis table — 1000 |
| 2 | 96 Elm St., Hendricks, IL 62014 | 6 | no | $201,000 — 802 |
| 8 | 110 Muffet St., Baron, IL 62019 | 4 | no | $74,900 — 808 |
| 9 | 156 Elm St., Hendricks, IL 62014 | 6 | yes | $253,500 — 809 |
| 11 | 160 Prospect Bldv., Fenton IL 62017 | 4 | no | $230,000 — 811 |
| 13 | 118 Main St., Hendricks, IL 62012 | 5 | no | $211,000 — 813 |
| 15 | 677 Fir St., Hendricks, IL 62014 | 5 | yes | $238,000 — 815 |
| 821 | 822 | 824 | 827 | 829 |

*FIG. 10* tree 1 scoring table

| id | address | bedrooms | view | selling price | valuation | error |
|----|---------|----------|------|---------------|-----------|-------|
| 1 | 111 Main St., Hendricks, IL 62012 | 4 | no | $132,500 | $152,450 | 0.1506 |
| 3 | 140 Cottontail Rd., Baron, IL 62019 | 3 | no | $98,750 | $152,450 | 0.5438 |
| 4 | 6 Spratt Ln., Baron, IL 62019 | 2 | no | $106,500 | $152,450 | 0.4315 |
| 5 | 776 Fir St., Hendricks, IL 62014 | 3 | yes | $251,000 | $152,450 | 0.3926 |
| 6 | 111 Industry Ave., Fenton IL 62017 | 2 | no | $240,000 | $152,450 | 0.3648 |
| 7 | 105 Elm St., Hendricks, IL 62014 | 5 | yes | $230,000 | $245,750 | 0.0685 |
| 10 | 142 Cottontail Rd., Baron, IL 62019 | 3 | no | $102,000 | $152,450 | 0.4946 |
| 12 | 36 Spratt Ln., Baron, IL 62019 | 4 | no | $111,000 | $152,450 | 0.3734 |
| 14 | 234 Cottontail Rd., Baron, IL 62019 | 4 | yes | $197,900 | $152,450 | 0.2297 | median err. 0.3734

*FIG. 14* recent listings table — 1600

| id | address | sq. ft. | bedrooms | bathrooms | floors | view | year | listing price | date |
|---|---|---|---|---|---|---|---|---|---|
| 1 | 1611 Coleman Drive, Gloucester, VA 23189 | 2280 | 4 | 3 | 2 | no | 1995 | $245,000 | 7/30/12 |
| 2 | 252 Zelkova Road, Williamsburg, VA 23185 | 2100 | 3 | 2 | 2 | yes | 2001 | $266,000 | 6/16/12 |
| 3 | 4521 Hilltop Drive, Clinton, VA 23698 | 2240 | 3 | 2 | 2 | Yes | 1986 | $259,000 | 7/19/12 |
| 4 | 574 New England Turnpike, New London, VA 23758 | 1640 | 2 | 1 | 2 | yes | 2009 | $163,500 | 5/17/12 |
| 5 | 1433 Green River Rd SW, Harrisonburg, VA 23752 | 1690 | 2 | 2 | 2 | no | 1963 | $225,500 | 6/13/12 |
| 6 | 38150 N 7th Ave N, Williamsburg, VA 23185 | 2300 | 2 | 2 | 1 | no | 1966 | $239,000 | 6/22/12 |
| 7 | 4326 W Ardmore Rd, Williamsburg, VA 23117 | 1590 | 2 | 1 | 1 | no | 1980 | $225,000 | 7/19/12 |
| 8 | 42231 N Celebration Way, Williamsburg, VA 23185 | 1900 | 3 | 2 | 2 | yes | 2001 | $245,000 | 6/12/12 |
| 9 | 8430 N 15th St, Williamsburg, VA 23185 | 1500 | 3 | 1 | 1 | no | 1982 | $185,000 | 7/23/12 |
| 10 | 29425 N 49th St, Harrisonburg, VA 24187 | 1200 | 2 | 2 | 1 | no | 1985 | $166,000 | 7/25/12 |
| 11 | 1006 E Mountain Vista Drive, Harrisonburg, VA 22896 | 1480 | 3 | 2 | 2 | yes | 2002 | $140,000 | 6/27/12 |
| 12 | 2743 E Sierra St, Harrisonburg, VA 99742 | 1535 | 4 | 1 | 1 | no | 1966 | $125,000 | 7/10/12 |
| 13 | 22378 N 70th Dr, Arlington, VA 22202 | 1965 | 2 | 2 | 1 | yes | 2001 | $255,000 | 7/18/12 |
| 14 | 4631 E Michelle Dr, Arlington, VA 22741 | 1110 | 3 | 2 | 2 | no | 1997 | $167,000 | 7/7/12 |
| 15 | 19 Quaker Ridge Rd, Arlington, VA 22801 | 1295 | 2 | 1 | 1 | no | 1988 | $140,000 | 6/19/12 |

FIG. 16A tree 1 testing table — 1650

| id | address | bedrooms | view | actual listing price | estimated listing price | error |
|---|---|---|---|---|---|---|
| 3 | 4521 Hilltop Drive, Clinton, VA 23698 | 3 | yes | $259,000 | $217,000 | 0.1935 |
| 4 | 574 New England Turnpike, New London, VA 00758 | 2 | yes | $163,500 | $197,500 | 0.1722 |
| 5 | 1433 Green River Rd SW, Harrisonburg, VA 88752 | 2 | no | $225,500 | $197,500 | 0.1418 |
| 6 | 38150 N 7th Ave N, Williamsburg, VA 23185 | 2 | no | $239,000 | $197,500 | 0.2101 |
| 7 | 4326 W Ardmore Rd, Williamsburg, VA 23117 | 2 | no | $225,000 | $197,500 | 0.1392 |
| 10 | 29425 N 49th St, Harrisonburg, VA 24187 | 2 | no | $166,000 | $197,500 | 0.1595 |
| 12 | 2743 E Sierra St, Harrisonburg, VA 99742 | 4 | no | $125,000 | $215,000 | 0.5814 |
| 14 | 4631 E Michelle Dr, Arlington, VA 22741 | 3 | no | $167,000 | $215,000 | 0.2874 | median err. | 0.1829 — 1651

FIG. 16C recent listings and sales table

| id | address | sq. ft. | bedrooms | bathrooms | floors | view | year | listing date | listing price | sale date | selling price |
|---|---|---|---|---|---|---|---|---|---|---|---|
| 1 | 1000 Coney Island Ave, Williamsburg, VA 23742 | 2280 | 4 | 3 | 2 | no | 1995 | 2/25/12 | $245,000 | 4/30/12 | $235,000 |
| 2 | 2962 Dunedin Cir, Williamsburg, VA 23114 | 2100 | 3 | 2 | 2 | yes | 2001 | 4/21/12 | $266,000 | 5/16/12 | $254,000 |
| 3 | 1500 Vance Ave, Williamsburg, VA 23174 | 2240 | 3 | 2 | 2 | yes | 1986 | 5/23/12 | $259,000 | 7/19/12 | $251,000 |
| 4 | 915 E 7th St, Harrisonburg, VA 24887 | 1640 | 2 | 1 | 2 | yes | 2009 | 1/18/12 | $163,500 | 2/17/12 | $142,500 |
| 5 | 91157 1st St, Harrisonburg, VA 24478 | 1690 | 2 | 2 | 2 | no | 1963 | 2/9/12 | $225,500 | 3/13/12 | $205,000 |
| 6 | 9257 Raleigh Terrace Rd, Harrisonburg, VA 24741 | 2300 | 2 | 2 | 1 | no | 1966 | 4/22/12 | $239,000 | 6/22/12 | $225,000 |
| 7 | 5478 Leadsville Ave, Williamsburg, VA 23213 | 1590 | 2 | 1 | 1 | no | 1980 | 5/19/12 | $225,000 | 6/3/12 | $212,000 |
| 8 | 1 Industrial Plaza S, Williamsburg, VA 23441 | 1900 | 3 | 2 | 2 | yes | 2001 | 2/30/12 | $245,000 | 4/12/12 | $225,000 |
| 9 | 1100 Elm Drive, Williamsburg, VA 23559 | 1500 | 3 | 1 | 1 | no | 1982 | 4/28/12 | $185,000 | 5/23/12 | $182,500 |
| 10 | 2214 Main St E, Williamsburg, VA 23185 | 1200 | 2 | 2 | 1 | no | 1985 | 2/12/12 | $166,000 | 3/25/12 | $160,000 |
| 11 | 87 Acme Blvd, Williamsburg, VA 23185 | 1480 | 3 | 2 | 2 | yes | 2002 | 4/3/12 | $140,000 | 6/27/12 | $133,000 |
| 12 | 15 Clifford St SE, Williamsburg, VA 23351 | 1535 | 4 | 1 | 1 | no | 1966 | 6/15/12 | $125,000 | 7/10/12 | $122,500 |
| 13 | 33 Paula Lane, Harrisonburg, VA 24745 | 1965 | 2 | 2 | 1 | yes | 2001 | 6/3/12 | $255,000 | 8/18/12 | $239,000 |
| 14 | 574 New England Turnpike, New London, VA 23758 | 1110 | 3 | 2 | 2 | no | 1992 | 3/24/12 | $167,000 | 5/7/12 | $162,500 |
| 15 | 1433 Green River Rd SW, Harrisonburg, VA 24752 | 1295 | 2 | 1 | 1 | no | 1988 | 2/10/12 | $140,000 | 4/19/12 | $132,000 |

*FIG. 19* recent listings and synthetic sales table — 2200

| id | address | sq. ft. | bedrooms | bathrooms | floors | view | year | listing price | date | synthetic sale price |
|---|---|---|---|---|---|---|---|---|---|---|
| 1 | 305 Dune St., Williamsburg, VA 23189 | 2280 | 4 | 3 | 2 | no | 1995 | $245,000 | 7/30/12 | $229,000 |
| 2 | 1335 Farrell Road, Williamsburg, VA 23185 | 2100 | 3 | 2 | 2 | yes | 2001 | $266,000 | 6/16/12 | $249,500 |
| 3 | 1228 Sexton Drive, Arlington, VA 22698 | 2240 | 3 | 2 | 2 | yes | 1986 | $259,000 | 7/19/12 | $246,000 |
| 4 | 7878 16th St., Williamsburg, VA 23758 | 1640 | 2 | 1 | 2 | yes | 2009 | $163,500 | 3/17/12 | $161,000 |
| 5 | 149 Red River Rd S, Arlington, VA 22752 | 1690 | 2 | 2 | 2 | no | 1963 | $225,500 | 7/13/12 | $222,000 |
| 6 | 1135 8th Ave N, Williamsburg, VA 23185 | 2300 | 2 | 2 | 1 | no | 1966 | $239,000 | 2/22/12 | $232,000 |
| 7 | 6689 Williams Rd, Williamsburg, VA 23117 | 1590 | 2 | 1 | 2 | no | 1980 | $225,000 | 1/19/12 | $218,500 |
| 8 | 246 Partison Ave, Williamsburg, VA 23185 | 1900 | 3 | 2 | 1 | yes | 2001 | $245,000 | 3/12/12 | $242,000 |
| 9 | 9844 N 18th St, Williamsburg, VA 23185 | 1500 | 3 | 2 | 1 | no | 1982 | $185,000 | 5/23/12 | $179,000 |
| 10 | 1313 Robin Way, Arlington, VA 22187 | 1200 | 2 | 2 | 2 | no | 1985 | $166,000 | 3/25/12 | $161,500 |
| 11 | 4593 E Hillside Drive, Williamsburg, VA 23896 | 1480 | 3 | 2 | 2 | yes | 2002 | $140,000 | 5/27/12 | $136,000 |
| 12 | 855256 Valley Road, Williamsburg, VA 23742 | 1535 | 4 | 1 | 1 | no | 1966 | $125,000 | 7/10/12 | $122,000 |
| 13 | 7832 16th Ave, Arlington, VA 22854 | 1965 | 2 | 2 | 1 | yes | 2001 | $255,000 | 6/18/12 | $245,000 |
| 14 | 7923 Darling Rd, Arlington, VA 22741 | 1110 | 3 | 2 | 2 | no | 1993 | $167,000 | 5/7/12 | $160,000 |
| 15 | 1367 Movington St, Arlington, VA 22801 | 1295 | 2 | 1 | 1 | no | 1988 | $140,000 | 3/19/12 | $135,500 |

Zillow.com™ Beta

| Home | Map & Search | Inside Edge | Top Cities | FAQ |

| Value Any Home | Address OR Street OR Neighborhood (Optional) | City, State OR ZIP (Required) |

My Zestimator (What's this?)

7055 18th Ave. N.E., Seattle, WA 98115 — 3012

3000 —

3010 — [Prev] [Next] | 1 Edit Home Facts | 2 Add Home Improvements | 3 Add Other Features | 4 Choose Comps | 5 Summary

Step 2 of 5: Add Home Improvements (No updates to make? Click the Next button.)

ZESTIMATE™: $555,727 — 3020

My Refined Value = $557,227 — 3080     [Update Value] — 3070

Find out how we calculate improvement values.

3030 —
| Improvement Type — 3031 | Date completed | Total cost | Improvement Value |
| Mid-range major kitchen remodel ▼ | 1 year ▼ | $5,000 ▼ | $3,000 (Edit) |
|  | — 3032 | — 3033 | — 3034 — 3035 |

Add another home improvement
— 3039

Subtotal improvements = + $3,000 — 3040

Improvement Type Descriptions

3050 —

⊖ Kitchen

Minor Kitchen Remodel
♦ Refinish existing cabinets; new wall covering or paint.
♦ New energy-efficient wall oven, cooktop.
♦ New mid-priced sink, faucet, laminate countertops. See more >>

Mid-range Major Kitchen Remodel
♦ New cabinets, laminate countertops, double stainless-steel sink.
♦ Eneergy efficient wall oven, cooktop, new ventilation system.
♦ New built-in microwave, dishwasher, custom lighting. See more >>

Upscale Major Kitchen Remodel
♦ New cherry cabinets, granite or marble countertops, imported ceramic tile backsplash.
♦ New 36-inch commercial grade range/hood, built-in microwave/convection oven.
♦ New built-in refrigerator, dishwasher. See more >>

⊕ Bathroom
⊕ Exterior
⊕ Additional Rooms

NOTE: Changes you make in My Zestimator™ will not be saved and will not affect the Zestimate™. Learn more.

Overall Summary — 3330
- Original Zestimate .................... $555,727 — 3320
- Change Home Fact ................. + $ 1,500 — 3331
- Change Home Improvements ....... + $ 3,300 — 3332
- Your other estimated values ........ – $ 300 — 3333
- Change based on comparable homes ...... + $ 2650 — 3334
- NEW REVISED VALUE  =  $ 563,177 — 3380

*FIG. 33B*

Home Facts Detailed Summary — 3340

| | | | | | |
|---|---|---|---|---|---|
| Residence: | Single Family | Views: | | Water *(none) | — 3342 |
| # Bedrooms: | 4 *(3) | Garage: | Attached | | |
| # Baths: | 2.5 — 3341 | Architectural style: | Colonial | | |
| Sq ft: | 1650 | Construction quality: | Good | | |
| Lot size (sf): | 2356 | Pool: | No | | |
| Year built: | 1955 | | | | |

Total changes to home facts = $1500 — 3431       * (Previous info)

*FIG. 33C*

Home Improvements Detailed Summary — 3350
- New Roof ............................ + $300 — 3351
- Kitchen Remodel ................. + $3000 — 3352
- Total home improvements  =  $ 3300 — 3332

*FIG. 33D*

Other Values Detailed Summary — 3460
- Orchard in back ................... + $700 — 3361
- Need new fence .................. – $1000 — 3362
- Total other values  =  – $ 300 — 3333

*FIG. 33E*

Comparable Homes Detailed Summary
Total comps refinement = $2650

My comps
choose up to 10.

☐① 1605 NE 73rd...
2
3
4
5
6
7
8
9
10

Zillow Comps                                                                 Page 1 | 2 | 3 | 4 | 5

|  |  | Comparable Home | Sold Price | Date Sold | Home (Sq ft) | Lot (Sq ft) | BR | BA | Home $/Sq ft | Lot $/Sq ft | Year Built |
|---|---|---|---|---|---|---|---|---|---|---|---|
|  |  | 810 N Monterey Jack St 12 | -- | -- | 1313 | 17,082 | 2 | 3 | $120 | $233 | 1979 |
| ⊟ Remove | ① | 814 N Monterey St 1 | $185,000 | 10/03/05 | 1313 | 1782 | 2 | 3 | $123 | $123 | 1979 |
| ⊞ Add | ② | 6427 111th St | $402,000 | 10/03/05 | 1313 | 1782 | 2 | 3 | $233 | $233 | 1979 |
| ⊞ Add | ③ | 13036 NE 128th Place | $170,000 | 10/03/05 | 1313 | 1782 | 2 | 3 | $250 | $250 | 1979 |
| ⊞ Add | ④ | 2335 Bothell- | $152,500 | 10/03/05 | 1575 | 1838 | 3 | 3 | $530 | $530 | 1975 |
| ⊞ Add | ⑤ | 814 N Monterey | $249,000 | 10/03/05 | 1575 | 1838 | 3 | 3 | $120 | $120 | 1975 |
| ⊞ Add | ⑥ | 814 N Monterey | $177,000 | 10/03/05 | 1358 | 1838 | 2 | 3 | $223 | $223 | 1975 |
| ⊞ Add | ⑦ | 814 N Monterey | $29,500 | 10/03/05 | 1313 | 1782 | 2 | 3 | $80 | $80 | 1979 |
| ⊞ Add | ⑧ | 814 N Monterey | $164,000 | 10/03/05 | 1313 | 1782 | 2 | 3 | $100 | $100 | 1979 |
| ⊞ Add | ⑨ | 814 N Monterey | $173,000 | 10/03/05 | 1313 | 1782 | 2 | 3 | $118 | $118 | 1979 |
| ⊞ Add | ⑩ | 814 N Monterey | $399,000 | 10/03/05 | 1313 | 1782 | 2 | 3 | $168 | $168 | 1979 |

Page 1 | 2 | 3 | 4 | 5

*FIG. 34*

Henderson County recent sales table for linear regression model — 3500

| id | sq. ft. | lot size | bedrooms | bathrooms | floors | year | selling price | roof type | use code | |
|---|---|---|---|---|---|---|---|---|---|---|
| 1 | 1850 | 4345 | 4 | 2 | 2 | 1953 | $132,500 | shingle | single-family | — 3501 |
| 2 | 2220 | 6000 | 6 | 2 | 3 | 1965 | $201,000 | shingle | single-family | — 3502 |
| 3 | 1375 | 3100 | 3 | 1 | 1 | 1974 | $98,750 | tile | single-family | — 3503 |
| 4 | 1590 | 4575 | 2 | 2 | 1 | 1973 | $106,500 | shingle | single-family | — 3504 |
| 5 | 2280 | 7300 | 3 | 3 | 2 | 1948 | $251,000 | shingle | single-family | — 3505 |
| 6 | 1950 | 6205 | 2 | 2 | 1 | 1925 | $240,000 | shingle | single-family | — 3506 |
| 7 | 2180 | 7880 | 5 | 2 | 3 | 1940 | $230,000 | shake | single-family | — 3507 |
| 8 | 1675 | 3421 | 4 | 2 | 1 | 1975 | $74,900 | shingle | single-family | — 3508 |
| 9 | 2400 | 6050 | 6 | 3 | 2 | 1938 | $253,500 | shingle | single-family | — 3509 |
| 10 | 1450 | 3230 | 3 | 1 | 1 | 1966 | $102,000 | shingle | single-family | — 3510 |
| 11 | 1952 | 4912 | 4 | 2 | 1 | 1920 | $230,000 | shingle | single-family | — 3511 |
| 12 | 1475 | 2900 | 4 | 2 | 1 | 1964 | $111,000 | shingle | single-family | — 3512 |
| 13 | 2140 | 6330 | 5 | 2 | 2 | 1935 | $211,000 | shingle | single-family | — 3513 |
| 14 | 1980 | 3500 | 4 | 3 | 2 | 1930 | $197,900 | shingle | single-family | — 3514 |
| 15 | 2320 | 4250 | 5 | 3 | 2 | 1927 | $238,000 | shake | single-family | — 3515 |
| 16 | 1925 | 5015 | 4 | 2 | 2 | 1949 | $179,900 | shingle | single-family | — 3516 |
| 17 | 2025 | 4015 | 4 | 2 | 2 | 1959 | $229,900 | shake | single-family | — 3517 |

Zillow.com™
Your Edge in Real Estate
Beta

| Home | Map & Search | How to Buy & Sell Real Estate | FAQ | My Zillow |

Value Any Home    Address OR Street OR Neighborhood    City, State OR ZIP    [ GO ] Advanced Search

My Zillow
- Favorite Homes
- My Account

Favorite Homes

Sort by [default sort] ▼

Your home report ☑ can include all favorites or none. see sample

♦ You are the confirmed owner of this home

6829 27th Ave NE
Seattle WA 98115
4 bedrooms, 1.5 baths, 1800 sq ft
Duplex, built 1924 *
(*Update home facts)

$778,161   Zestimate™
$793,296   My Estimate (Public)
                              — 3813

☑ Home Report

65432 Lake Sammamish Pkwy NE
Seattle WA 12345
3 bedrooms, 2 baths, 2050 sq ft
Single-family, built 1987 *
(*See home facts provided by owner)

$809,200   Zestimate™
$816,400   Owner's Estimate
                    My Estimate
                    — 3825    — 3831

× Remove
☑ Home report

56789 Western Washington Blvd NE
Seattle WA 34567
3 bedrooms, 2 baths, 1900 sq ft    3832
Single-family, built 2002

$690,500   Zestimate™
$675,100   Owner's Estimate
                    My Estimate
              3834— — 3835

× Remove
☐ Home report 3810
3820
3830
3800

*FIG. 38*

Zillow.com ™ Beta
Your Edge in Real Estate

Hello susan54! (Not susan54? Sign out.)

| Home | Map & Search | How to Buy & Sell Real Estate | FAQ | My Zillow |

Value Any Home | Address OR Street OR Neighborhood | City, State OR ZIP | GO | Advanced Search 6829 27th Ave NE, Seattle, WA 98115 — 3901
Owner's Estimate: $793,296 — 3902    This is public. Change — 3921
Zestimate: $784,161 — 3924
This estimate was created with My Estimator on 6/24/06

Comments  Edit
We changed our home value to correct the home facts for sq ft
and to indicate the recent addition of a deck in the back yard 3922  [ Update Estimate ]  3923  [ Delete ]
— 3905

Home Details
Overview
My Estimator
Data & Graphs
Large Bird's Eye View — 3914

[Print] [Send] — 3913

Overall Summary
Original Zestimate          $ 784,161
Home Facts update           $ 0
Home improvements update    $ 0
Other Features update       $ 0
Comps update              + $ 9,135     } 3906
My Estimate            = $ 793,296

Home Facts Summary                  } 3907
Residence    Single family
Bedrooms     5
Bathrooms    3.5
Total rooms  —
Stories    2
  # Stories    2
  Sq ft        3680
  Year built   1900
  Roof type    Unknown
Total Home Facts update     - $ 0       } 3908

Home Improvement Summary
Total Home Facts update     - $ 0       } 3909, 3910

Other Features Summary
Total Other Features update  - $ 0      } 3911, 3912

ESTIMATING THE VALUE OF A PROPERTY IN A MANNER SENSITIVE TO NEARBY VALUE-AFFECTING GEOGRAPHIC FEATURES

CROSS REFERENCE TO RELATED APPLICATIONS

This application claims the benefit of U.S. Provisional Application No. 61/939,268, filed on Feb. 13, 2014.

This application is related to the following applications:
(a) U.S. application Ser. No. 11/347,000, filed Feb. 3, 2006;
(b) U.S. application Ser. No. 11/971,758, filed Jan. 9, 2008; and
(c) U.S. application Ser. No. 13/828,680, filed Mar. 14, 2013.

Each of the foregoing applications is incorporated herein by reference in its entirety. To the extent the foregoing applications or any other material incorporated herein by reference conflicts with the present disclosure, the present disclosure controls.

TECHNICAL FIELD

The described technology is directed to the field of automated valuation techniques.

BACKGROUND

In many roles, it can be useful to be able to accurately determine the value of residential real estate properties ("homes"). As examples, by using accurate values for homes: taxing bodies can equitably set property tax levels; sellers and their agents can optimally set listing prices; buyers and their agents can determine appropriate offer amounts; insurance firms can properly value their insured assets; and mortgage companies can properly determine the value of the assets securing their loans.

A variety of conventional approaches exist for valuing houses, Perhaps the most reliable is, for a house that was very recently sold, attributing its selling price as its value.

Another widely-used conventional approach to valuing houses is appraisal, where a professional appraiser determines a value for a house by comparing some of its attributes to the attributes of similar nearby homes that have recently sold ("comps"). The appraiser arrives at an appraised value by subjectively adjusting the sale prices of the comps to reflect differences between the attributes of the comps and the attributes of the house being appraised.

A further widely-used conventional approach to valuing houses involves statistical modeling. For particular geographic region, such as a county, home sale transactions are used together with attributes of the sold homes to train a model capable of predicting the value of an arbitrarily-selected home within the geographic region based upon its attributes. This model can then be applied to the attributes of any home in the geographic area in order to estimate the value of this home.

BRIEF DESCRIPTION OF THE DRAWINGS

FIG. 3 is a table diagram showing sample contents of a home feature table used by the facility in some embodiments to store information about value-affecting features near particular homes.

FIG. 8 is a table diagram showing sample contents of a recent sales table.

FIG. 10 is a table diagram showing sample contents of a basis table containing the basis information selected for the tree.

FIG. 14 is a table diagram showing sample results for scoring a tree.

FIG. 16A is a table diagram showing sample contents of a recent listings table.

FIG. 16C is a table diagram showing sample results for testing a tree.

FIG. 19 is a table diagram showing sample contents of a recent listings and sales table.

FIG. 22 is a table diagram showing sample contents of a recent listings table including synthetic sale prices.

FIG. 29 is a display diagram showing a sample display typically presented by the facility to display an initial valuation of the subject home and solicit updated home attributes from the user.

FIG. 30 is a display diagram showing a typical display presented by the facility to permit the user to describe improvements made to the subject home.

FIG. 31 is a display diagram showing a sample display typically presented by the facility to enable the user to describe other aspects of the subject home that affect its value.

FIGS. 33A-E and 34 show a sample display typically presented by the facility in order to present an overall revised value for the subject home.

FIG. 35 is a table diagram showing sample contents of recent sales information used to construct a linear regression valuation model that is based on the attributes whose values are available for the user to update in the first step of the process of generating a tailored valuation.

FIG. 38 is a display diagram showing a display typically presented by the facility where the user selects to save the refined valuation with the private level of access.

FIG. 39 is a display diagram showing a display typically presented by the facility where the user selects to save the refined valuation with the public level of access.

DETAILED DESCRIPTION

Figure 1:
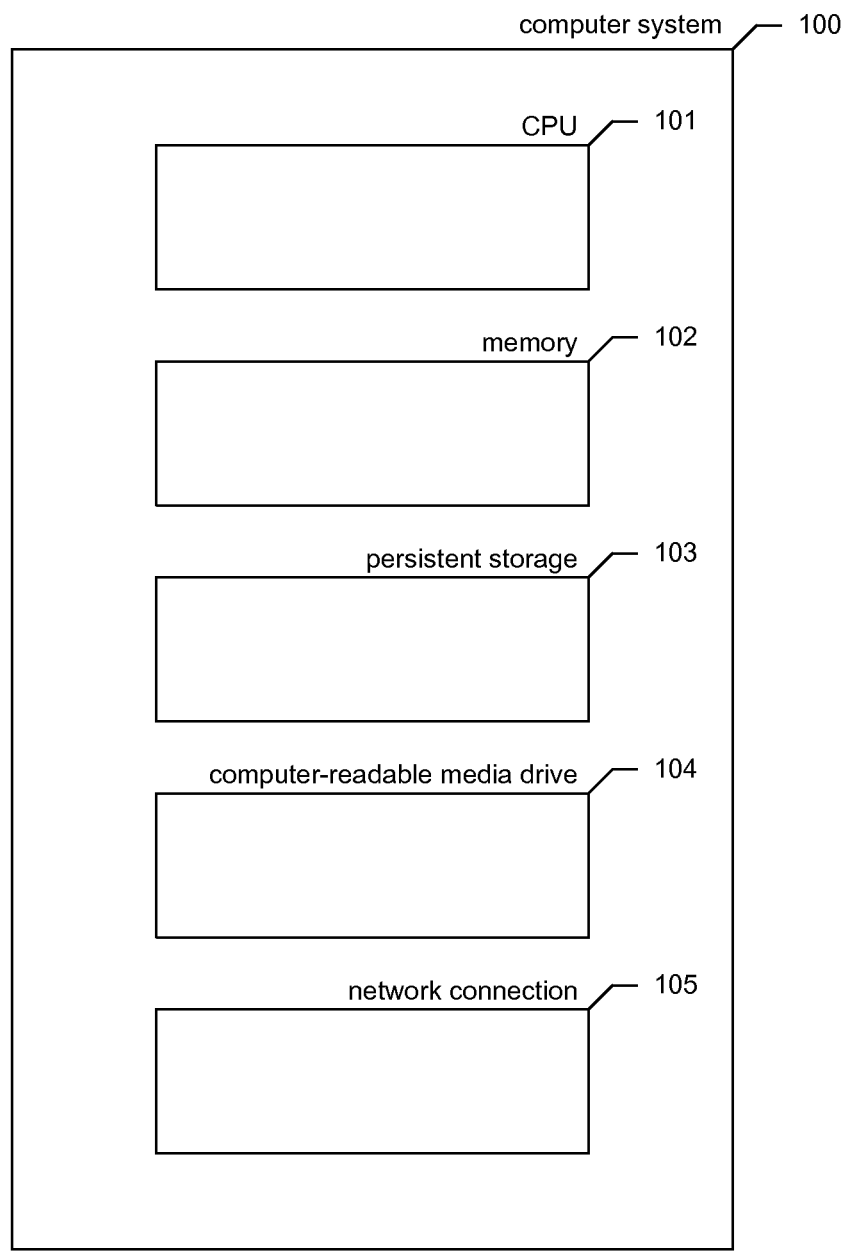
FIG. 1 is a block diagram showing some of the components typically incorporated in at least some of the computer systems and other devices on which the facility operates.

The inventors have recognized that the conventional approaches to valuing houses have significant disadvantages. For instance, attributing the most recent sale price of a home as its value has the disadvantage that the house's current value can quickly diverge from its sale price. Accordingly, the sale price approach to valuing a house tends to be accurate for only a short period after the sale occurs. For that reason, at any given time, only a small percentage of houses can be accurately valued using the sale price approach.

The appraisal approach, in turn, has the disadvantage that its accuracy can be adversely affected by the subjectivity involved. Also, appraisals can be expensive, can take days or weeks to complete, and may require physical access to the house by the appraiser.

The statistical modeling approach has the disadvantage that it frequently fails to accurately account for geographic features near the home that are capable of having a material effect on the home's value, either positive or negative. On the positive side, these can include bodies of water such as oceans, lakes, rivers, etc.; parks; golf courses; transit resources; desirability of a neighborhood or block; etc. On the negative side, such features can include factories and other industrial buildings; sewage treatment plants; strip malls; busy roads and highways; unseemliness of a neighborhood; etc. In some cases, the proximity of such geographic features can have dramatic effect on the value of the home, which is often not reflected by the estimates of value generated by conventional statistical modelling.

In view of the shortcomings of conventional approaches to valuing houses discussed above, the inventors have recognized that a new approach to automatically valuing houses that better accounted for nearby value-affecting geographic features would have significant utility.

A software and/or hardware facility for automatically determining a current value for a home ("the facility") in a manner sensitive to nearby value-affecting geographic features is described.

In some embodiments, the facility uses both (1) one or more home valuation models having no particular sensitivity to a home's proximity to value-affecting geographic features, and (2) one or more home valuation models specifically designed to be sensitive to a home's proximity to value-affecting geographic features. For brevity, the former are referred to herein as "feature-insensitive models," while the latter are referred to as "feature-sensitive models."

In various embodiments, the facility constructs the feature-insensitive model or models that it uses in a variety of manners. In some embodiments, the facility constructs such feature-insensitive models in some or all of the manners described in U.S. application Ser. No. 11/347,000 and the section titled "Home Valuation," which discusses training one or more valuation models for a particular geographic area using observations each corresponding to a home recently sold in that geographic area and containing the selling price as dependent variable, and a variety of home attributes as independent variables.

In some embodiments, the facility constructs the feature-sensitive model or models training one or more valuation models for a particular geographic area using observations each corresponding to a home recently sold in that geographic area and containing the selling price as dependent variable. The independent variables used by the facility in such models include both (1) some or all of the home attributes used as independent variables in the feature-insensitive models, as well as (2) additional home attributes relating to nearby value-affecting geographic features. In various embodiments, these additional home attributes include such additional home attributes as an identifier for a value-affecting geographic feature that the home is near; a distance from the home to the feature; a number of streets intervening between the home and the feature; a number of home parcels intervening between the home and the feature; etc.

In some embodiments, the facility trains the feature-sensitive models in such a manner that the relative value of different features is inferred as part of constructing the model itself. In some embodiments, the facility constructs a specialized model, called a "heat map model," that determines relative values for the different features, which is then used as an independent variable in training the feature-sensitive models.

The facility further constructs a meta-model to combine valuations determined for a particular home in the geographic area by (1) the feature-insensitive model(s) and (2) the feature-sensitive model(s). In some embodiments, the facility constructs such feature-insensitive models in some or all of the manners described in U.S. application Ser. No. 11/971,758 and the section titled "Home Valuation." The meta-model predicts, for a home having particular attributes, the proper relative weighting to be given to valuations produced for the home by the feature-insensitive model(s) versus those produced by the feature-sensitive model(s) based on the subject the home attributes of the home, including the additional home attributes of the home. For example, for a home very close to a significant feature, the meta-model would tend to predict a high weighting for valuations generated by feature-sensitive models relative to valuations generated by feature-insensitive models; on the other hand, for a home that is not close to any significant feature, the meta-model would tend to predict a low weighting for valuations generated by feature-sensitive models relative to valuations generated by feature-insensitive models.

In order to estimate the value of a particular home, the facility: (1) subject the home attributes of the home to one or more feature-insensitive models to obtain a feature-insensitive valuation; (2) subject the home attributes of the home, including the additional home attributes of the home, to one or more feature-sensitive models to obtain a feature-sensitive valuation; (3) subject the home attributes of the home, including the additional home attributes of the home, to the meta-model to obtain a relative weighting for the feature-insensitive valuation and the a feature-sensitive valuation; and (4) generate a weighted average of the feature-insensitive valuation and the a feature-sensitive valuation in accordance with the relative weighting obtained by applying the meta-model to obtain an overall valuation for the home.

In various embodiments, valuations produced by the facility are used as a basis for communicating an estimated valuation for an individual home, determining aggregate housing indices for geographic regions, etc. The valuations are also used as a basis for communicating the estimated impact on valuation of a feature. For example, the valuations are used to estimate the change in valuation being on located directly on the shoreline at a particular location of a body of water.

In some embodiments, the facility constructs feature-insensitive models, feature sensitive models, or both in some or all of the manners described in U.S. application Ser. No. 13/828,680 and the section titled "Home Valuation," which discusses training one or more valuation models for a particular geographic area using observations each corresponding to a home recently listed for sale in that geographic area and containing a selling price predicted for the home based upon its listing price and home attributes as dependent variable, and a variety of home attributes as independent variables.

In some embodiments, the facility identifies a value-affecting geographic feature for every home. In some such embodiments, the facility identifies for some or all homes a neighborhood as a value-affecting geographic feature. Such a neighborhood can encompass, in various embodiments, a portion of a block, a block, a group of blocks, a subdivision, etc.

By performing in some or all the ways described above, the facility automatically determined valuations for homes in a manner that is sensitive to nearby value-affecting geographic features.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions, cameras, etc.

FIG. 1 is a block diagram showing some of the components typically incorporated in at least some of the computer systems and other devices on which the facility operates. In various embodiments, these computer systems and other devices 100 can include server computer systems, desktop computer systems; laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data (such as models generated and used by the facility, and information about homes, their attributes, and value-affecting geographic features used by the facility), an operating system including a kernel, and device drivers; a persistent storage device 103; such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware; such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
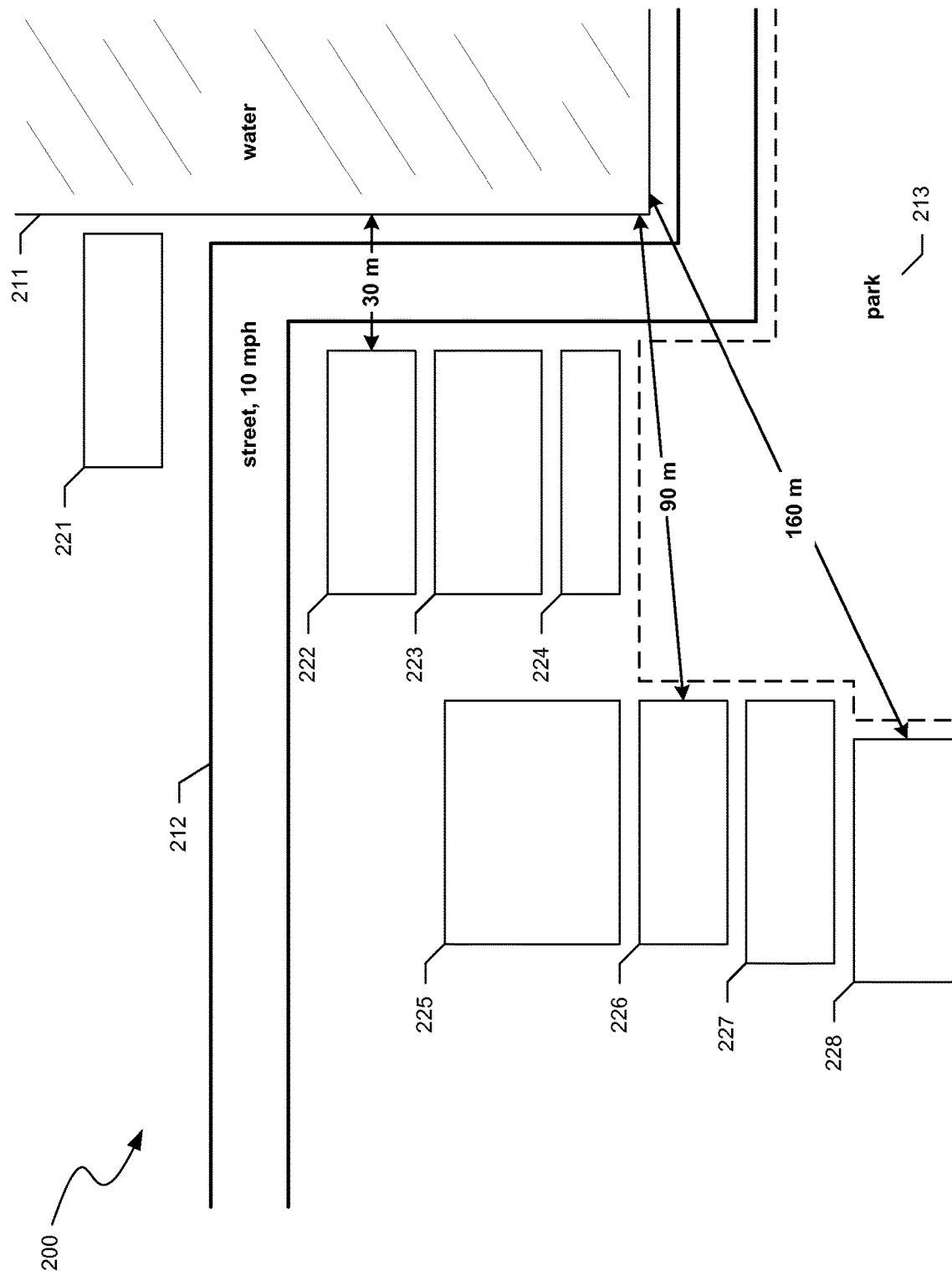
FIG. 2 is a map diagram showing a sample geographic layout of homes with respect to value-affecting features.

FIG. 2 is a map diagram showing a sample geographic layout of homes with respect to value-affecting features. The map 200 shows a value-affecting feature 211, body of water such as a lake. A street 212 the speed limit is 10 mph heads toward the body of water, then turns to follow its shore. The map further shows home parcels 221-228. Parcel 221 is directly adjacent to the body of water. Parcel 222 is separated from the body of water by the street, at a distance of 30 m. Parcel 225 is separated from the body of water both by the street, and by intervening parcel 223, at a distance of 90 m. Parcels 226-228 are separated from the body of water by the road and a park 213, but not by any intervening home parcels, at distances from 90 m to 160 m. The facility collects this information about the relationship between the shown parcels and the shown feature and stores it for its use in a home feature table.

FIG. 3 is a table diagram showing sample contents of a home feature table used by the facility in some embodiments to store information about value-affecting features near particular homes. The table 300 is made up of rows such as rows 301-303, each corresponding to a different combination of a home and a value-affecting feature that is near the home. Each row is divided into the following columns: a home ID column 311 containing an identifier identifying the home to which the row corresponds, and correlating this row to a row of a home attribute table containing primary attributes for the home; a feature ID column 312 containing an identifier identifying the feature to which the row corresponds and that the home is near; a distance column 313 indicating a distance between the home and the feature; and intervening streets column 314 indicating a number of streets that pass between the home and the feature; and an intervening parcels column 315 indicating the number of other home parcels on a direct route from the home to the feature. For example, row 302 indicates that the home having home identifier 67321419 is 90 m from the feature having feature identifier 119642, and further that there is one street and no other home parcels between this home and this feature. It can be seen that rows 301 and 302 correspond to different homes and the same nearby feature, while rows 302 and 303 correspond to the same home and different features.

In various embodiments, the facility stores various other sorts of information in the home feature table. For example, the distance stored in the home feature table may be measured as the bird flies, or via less direct routes of various kinds, including walking, driving, public transportation, etc. The table may contain information about whether the feature is in line-of-sight of the home, or otherwise visible from the home or elsewhere on the home's parcel.

While FIG. 3 shows a table whose contents and organization are designed to make them more comprehensible by a human reader, those skilled in the art will appreciate that actual data structures used by the facility to store this information may differ from the table shown, in that they, for example, may be organized in a different manner; may contain more or less information in each row than shown; may be compressed and/or encrypted; may contain a much larger number of rows than shown, etc.

Figure 4:
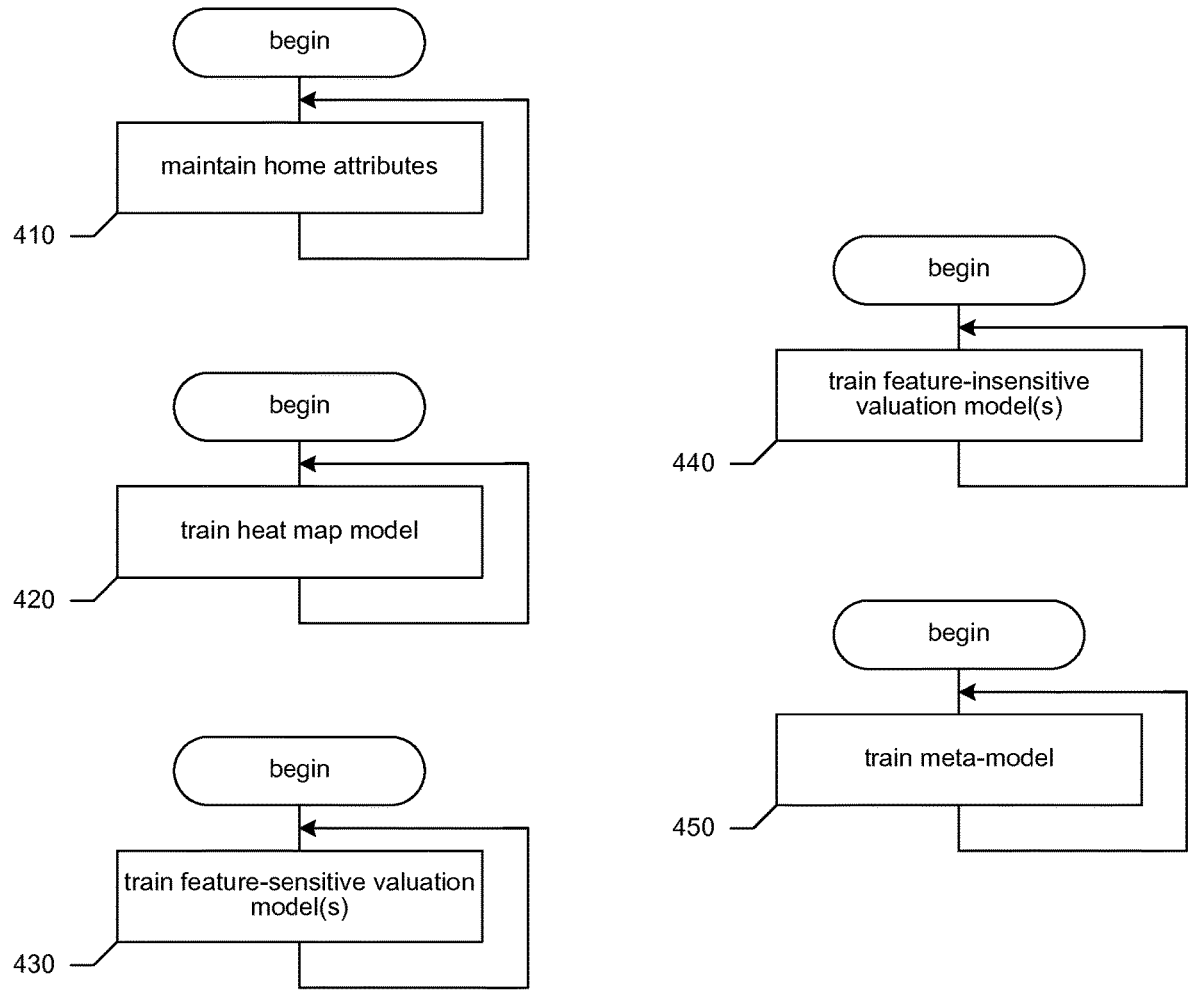
FIG. 4 is a group of flow diagrams showing steps typically performed by the facility in order to maintain models for use in estimating the value of homes in a particular geographic area.

FIG. 4 is a group of flow diagrams showing steps typically performed by the facility in order to maintain models for use in estimating the value of homes in a particular geographic area. In step 410, the facility maintains all the home attributes used by the facility, including both primary home attributes used in both the feature-sensitive and feature-insensitive models—including selling price for homes sold and listing price for homes listed for sale, and additional home attributes used in the feature-sensitive model, such as those shown in the home feature table. After step 410, the facility continues in step 410 to continue maintaining the home attributes it uses.

In step 420, where used, the facility uses the maintained home attributes to train a heat map model that determines relative values for the different features tracked by the facility. These different features may be different stretches of waterfront along the same body of water; and features of a variety of types, including both features having a positive value features having a negative value. In some embodiments, the heat map model trained by the facility uses modeling approaches similar to the expectation-maximization ("EM") technique such as one or more of those described in Dempster, A. P.; Laird, N. M.; Rubin, D. B. (1977), "Maximum Likelihood from Incomplete Data via the EM Algorithm," Journal of the Royal Statistical Society, Series B 39 (1): 1-38. JSTOR 2984875, MR 0501537; and in Wikipedia, Expectation-maximization algorithm, retrieved from each of which is hereby Incorporated by reference in its entirety. After step 420, the facility continues in step 420 to update the heat map model based upon changes to the home attributes.

In step 430, the facility trains one or more feature-sensitive valuation models. In some embodiments, the facility trains multiple feature-sensitive valuation models of different types, as well as a meta-model designed to determine, for each home, the proper relative weighting of the valuations produced by the different feature-sensitive valuation models. In various embodiments, these models are of various types, including random forest, spline regression, neural network, linear regression, quantile analysis, etc. In various embodiments, these models use various strategies, including a hedonic comparable strategy, a listing surface strategy, a prior sale surface strategy, a tax assessment surface strategy, etc. after step 430, the facility continues in step 430 to update the feature-sensitive valuation models based upon changes to the home attributes.

In step 440, the facility trains one or more feature-insensitive valuation models. In some embodiments, the facility trains multiple feature-insensitive valuation models of different types, as well as a meta-model designed to determine, for each home, the proper relative weighting of the valuations produced by the different feature-insensitive valuation models. In various embodiments, these models are of various types, including random forest, spline regression, neural network, linear regression, quantile analysis, KNN, etc. In various embodiments, these models use various strategies, including a hedonic comparable strategy, a listing surface strategy, a prior sale surface strategy, a tax assessment surface strategy, etc. after step 440, the facility continues in step 440 to update the feature-insensitive valuation models based upon changes to the home attributes.

In step 450, the facility trains a meta-model to determine, for each home, the proper relative weighting of the valuations produced by the feature-sensitive valuation models and the feature-insensitive valuation models. In various embodiments, these models are of various types, including logistic regression, random forest, spline regression, neural network, linear regression, quantile analysis, KNN etc. In various embodiments, cross validation is used to avoid over-fitting of the meta-models. After step 450, the facility continues in step 450 to update the meta-model based upon changes to the home attributes.

Those skilled in the art will appreciate that the steps shown in each of the flow diagrams of FIG. 4 and in those figures discussed below may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

Figure 5:
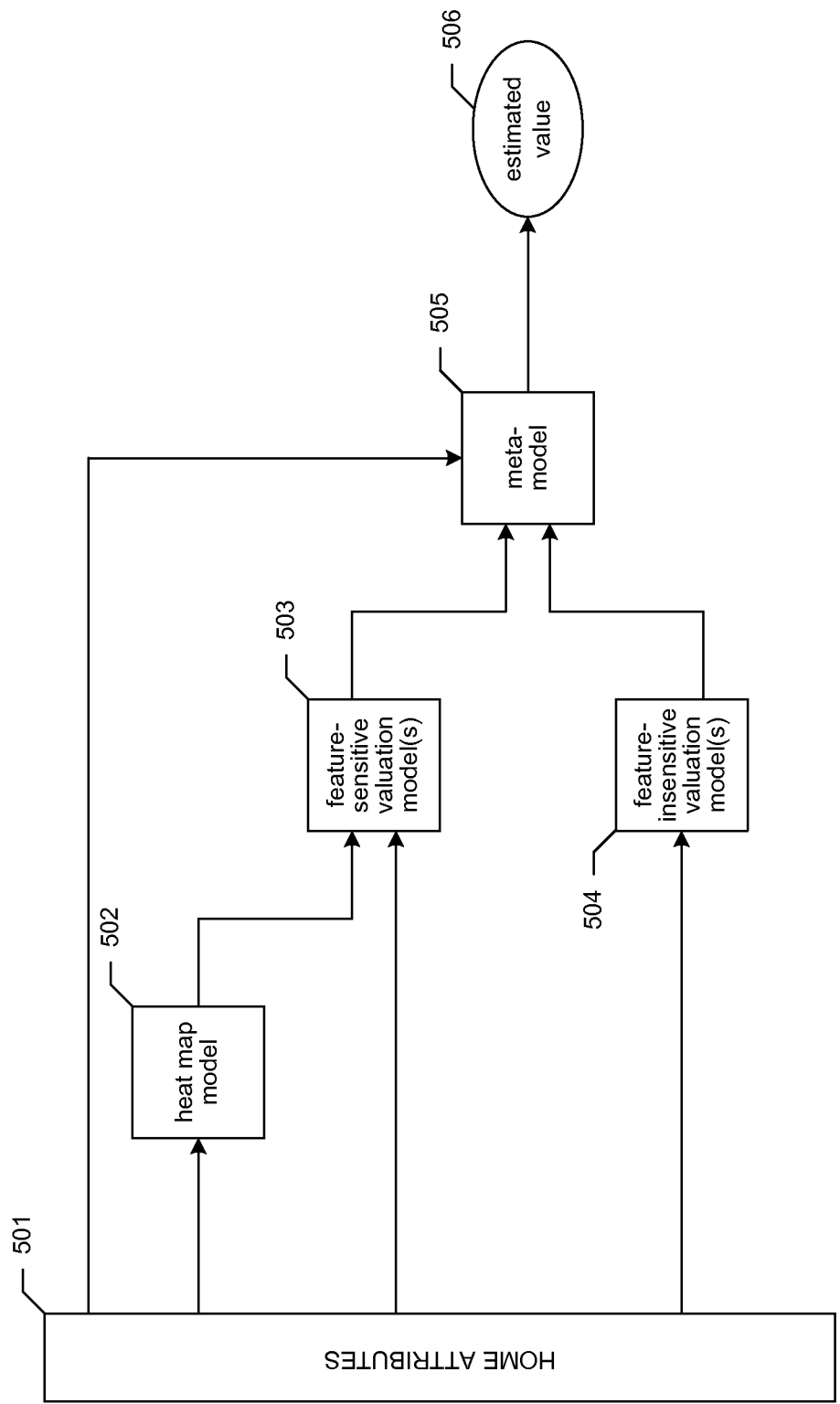
FIG. 5 is a data flow diagram showing data flows involved in training and applying models used by the facility in some embodiments.

FIG. 5 is a data flow diagram showing data flows involved in training and applying models used by the facility in some embodiments. The home attributes 501 are used as a basis for training the heat map model 502, the feature-sensitive valuation models 503, and the feature-insensitive valuation models 504. The output of the heat map model it is also used in training the feature-sensitive valuation models. The output of both the feature-sensitive valuation models and the feature-insensitive valuation models is used as a basis for training a meta-model 505, as are the home attributes.

When an estimated value is being determined for a particular home by the facility, it applies the heat map model 502 to the attributes 501 for the home to obtain a relative valuation for the features that the homes near. The facility applies the feature-sensitive valuation model to the home attributes and those feature relative valuations to generate a feature-sensitive valuation for the home. The facility applies the feature-insensitive valuation model to the home attributes to generate a feature-insensitive valuation for the home. The facility applies the meta-model 505 to the home attributes to determine a relative weighting for the feature-sensitive valuation and the feature-insensitive valuation. The facility then determines a weighted average of the feature-sensitive valuation and the feature-insensitive valuation in accordance with the relative weighting determined by the meta-model. This weighted average is the estimated value 506 determined by the facility.

Figure 6:
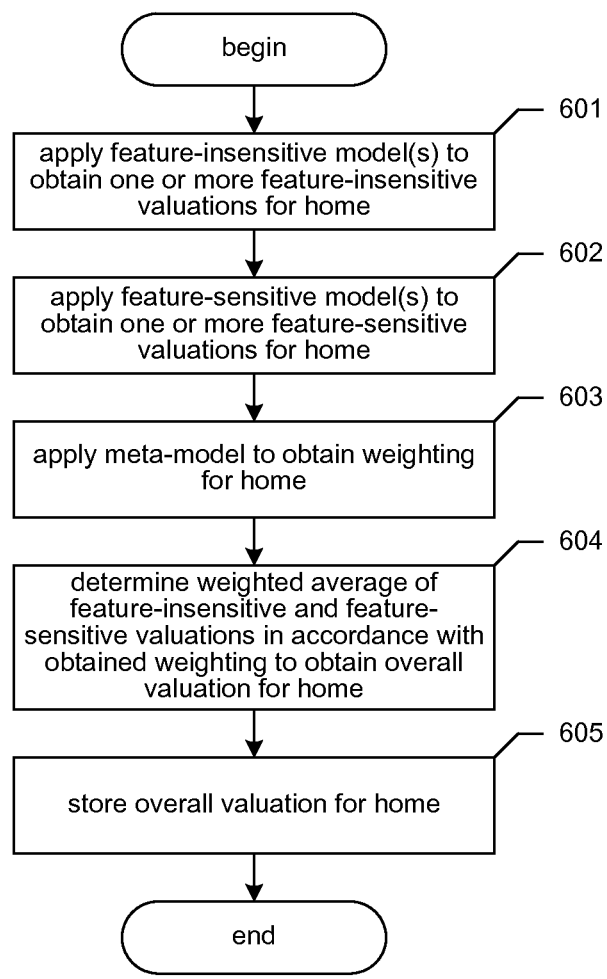
FIG. 6 is a flow diagram showing steps typically performed by the facility in order to generate an estimated value for a particular home.

FIG. 6 is a flow diagram showing steps typically performed by the facility in order to generate an estimated value for a particular home. In step 601, the facility applies the feature-insensitive model(s) to obtain one or more feature-insensitive valuations for the home. In step 602, the facility applies the feature-sensitive model(s) to obtain one or more feature-sensitive valuations for the home. In step 603, the facility applies the meta-model to obtain a weighting between the feature-insensitive valuations and feature-sensitive valuations for the home. In step 604, the facility determines a weighted average of the feature-insensitive and feature-sensitive valuations in accordance with the weighting obtained in step 603 to obtain an overall valuation for the home. In step 605, the facility stores the overall valuation for the home. In various environment, this stored valuation to be the basis for displaying the valuation, such as in a web page containing information about the home; computing and aggregate housing index for geographic areas contain home; etc. After step 605, these steps conclude, Home Valuation In some embodiments, the facility constructs and/or applies housing price models each constituting a forest of classification trees. In some such embodiments, the facility uses a data table that identifies, for each of a number of homes recently sold in the geographic region to which the forest corresponds, attributes of the home and its selling price. For each of the trees comprising the forest, the facility randomly selects a fraction of homes identified in the table, as well as a fraction of the attributes identified in the table. The facility uses the selected attributes of the selected homes, together with the selling prices of the selected homes, to construct a classification tree in which each non-leaf node represents a basis for differentiating selected homes based upon one of the selected attributes. For example, where number of bedrooms is a selected attribute, a non-leaf node may represent the test "number of bedrooms≤4," This node defines 2 subtrees in the tree: one representing the selected homes having 4 or fewer bedrooms, the other representing the selected homes having 5 or more bedrooms. Each leaf node of the tree represents all of the selected homes having attributes matching the ranges of attribute values corresponding to the path from the tree's root node to the leaf node. The facility assigns each leaf node a value corresponding to the mean of the selling prices of the selected homes represented by the leaf node.

In some areas of the country, home selling prices are not public records, and may be difficult or impossible to obtain. Accordingly, in some embodiments, the facility estimates the selling price of a home in such an area based upon loan values associated with its sale and an estimated loan-to-value ratio.

In order to weight the trees of the forest, the facility further scores the usefulness of each tree by applying the tree to homes in the table other than the homes that were selected to construct the tree, and, for each such home, comparing the value indicated for the home by the classification tree (i.e., the value of the root leaf node into which the tree classifies the home) to its selling price. The closer the values indicated by the tree to the selling prices, the higher the score for the tree.

Figure 7:
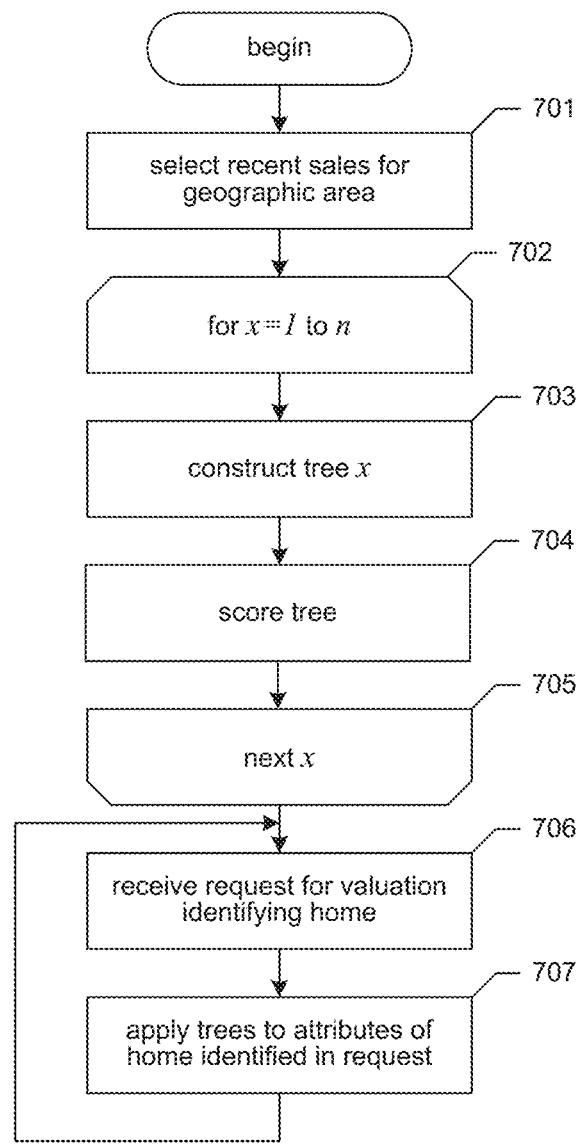
FIG. 7 is a flow diagram showing steps typically performed by the facility to automatically determine current values for homes in a geographic area.

FIG. 7 is a flow diagram showing steps typically performed by the facility to automatically determine current values for homes in a geographic area. The facility may perform these steps for one or more geographic areas of one or more different granularities, including neighborhood, city, county, state, country, etc. These steps may be performed periodically for each geographic area, such as daily. In step 701, the facility selects recent sales occurring in the geographic area. The facility may use sales data obtained from a variety of public or private sources.

FIG. 8 is a table diagram showing sample contents of a recent sales table. The recent sales table 800 is made up of rows 801-815, each representing a home sale that occurred in a recent period of time, such as the preceding 60 days. Each row is divided into the following columns: an identifier column 821 containing an identifier for the sale; an address column 822 containing the address of the sold home; a square foot column 823 containing the floor area of the home; a bedrooms column 824 containing the number of bedrooms in the home; a bathrooms column 825 containing the number of bathrooms in the home; a floors column 826 containing the number of floors in the home; a view column 827 indicating whether the home has a view; a year column 828 showing the year in which the house was constructed; a selling price column 829 containing the selling price at which the home was sold; and a date column 830 showing the date on which the home was sold. For example, row 801 indicates that sale number 1 of the home at 111 Main St., Hendricks, Ill. 62012 having a floor area of 1850 square feet, 4 bedrooms, 2 bathrooms, 2 floors, no view, built in 1953, was for $132,500, and occurred on Jan. 3, 2005. While the contents of recent sales table 800 were included to pose a comprehensible example, those skilled in the art will appreciate that the facility can use a recent sales table having columns corresponding to different and/or a larger number of attributes, as well as a larger number of rows. Attributes that may be used include, for example, construction materials, cooling technology, structure type, fireplace type, parking structure, driveway, heating technology, swimming pool type, roofing material, occupancy type, home design type, view type, view quality, lot size and dimensions; number of rooms, number of stories, school district, longitude and latitude, neighborhood or subdivision, tax assessment, attic and other storage, etc. For a variety of reasons, certain values may be omitted from the recent sales table. In some embodiments, the facility imputes missing values using the median value in the same column for continuous variables, or the mode (i.e., most frequent) value for categorical values.

While FIG. 8 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

Returning to FIG. 7, in steps 702-705, the facility constructs and scores a number of trees, such as 100. This number is configurable, with larger numbers typically yielding better results but requiring the application of greater computing resources. In step 703, the facility constructs a tree. In some embodiments, the facility constructs and applies random forest valuation models using an R mathematical software package available at cran.r-project.org/ and described at www.maths.lth.se. Step 703 is discussed in greater detail below in connection with FIG. 9. In step 704, the facility scores the tree constructed in step 703. Step 704 is discussed in greater detail below in connection with FIG. 8.

In steps 706-707, the facility uses the forest of trees constructed and scored in steps 702-705 to process requests for home valuations. Such requests may be individually issued by users, or issued by a program, such as a program that automatically requests valuations for all homes in the geographic area at a standard frequency, such as daily, or a program that requests valuations for all of the homes occurring on a particular map in response to a request from a user to retrieve the map. In step 706, the facility receives a request for valuation identifying the home to be valued. In step 707, the facility applies the trees constructed in step 703, weighted by the scores generated for them in step 704, to the attributes in the home identified in the received request in order to obtain a valuation for the home identified in the request. After step 707, the facility continues in step 706 to receive the next request.

Those skilled in the art will appreciate that the steps shown in FIG. 7 and in each of the flow diagrams discussed below may be altered in a variety of ways. For example, the order of the steps may be rearranged; substeps may be performed in parallel; shown steps may be omitted, or other steps may be included; etc.

Figure 9A:
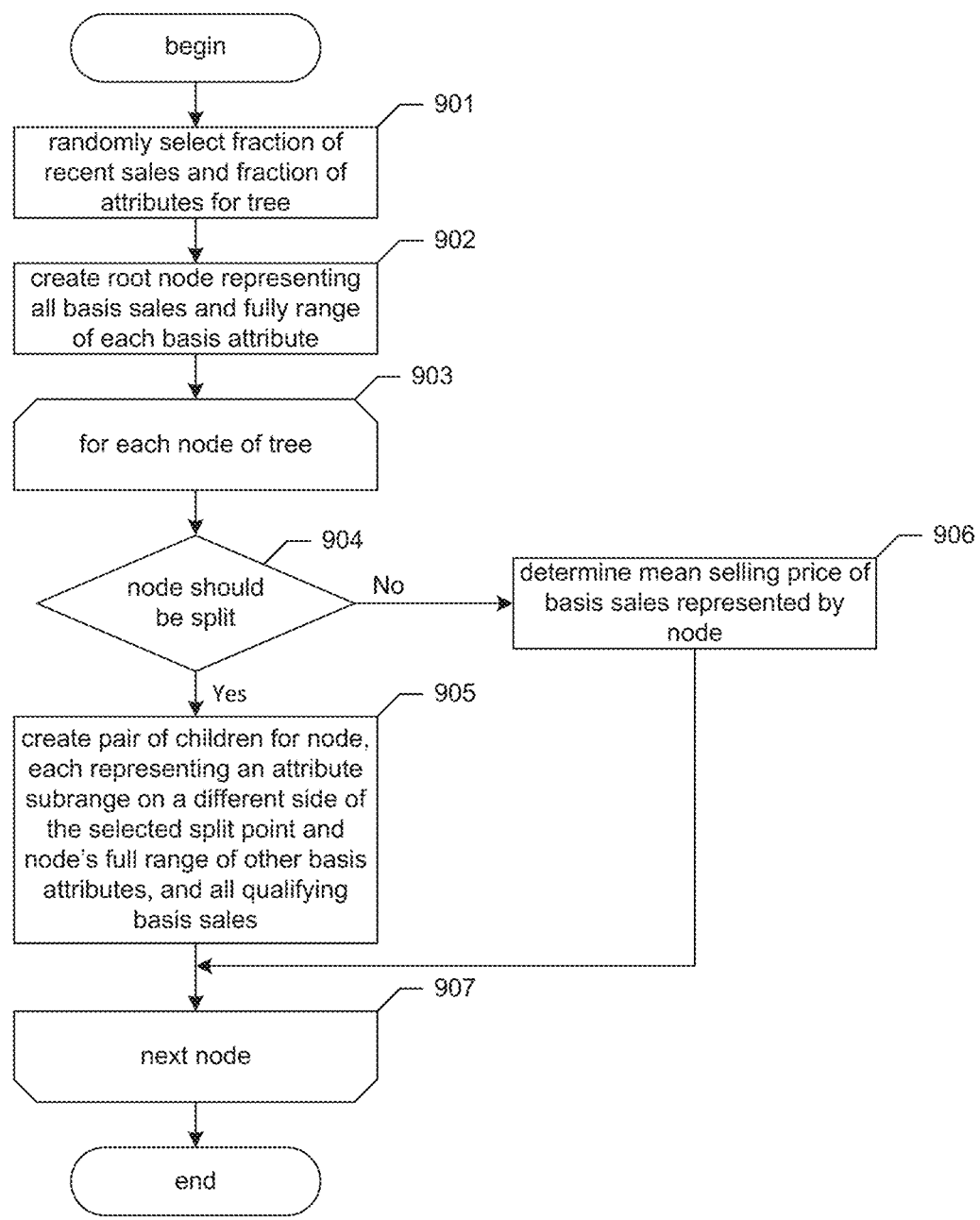
FIG. 9A is a flow diagram showing steps typically performed by the facility in order to construct a tree.

FIG. 9A is a flow diagram showing steps typically performed by the facility in order to construct a tree. In step 901, the facility randomly selects a fraction of the recent sales in the geographic area to which the tree corresponds, as well as a fraction of the available attributes, as a basis for the tree.

FIG. 10 is a table diagram showing sample contents of a basis table containing the basis information selected for the tree. Basis table 1000 contains rows randomly selected from the recent sales table 800, here rows 802, 808, 809; 811, 813, and 815. The basis table further includes the identifier column 821, address column 822, and selling price column 829 from the recent sales table, as well as randomly selected columns for two available attributes: a bedrooms column 824 and a view column 827. In various embodiments, the facility selects various fractions of the rows and attribute columns of the recent sales table for inclusion in the basis table; here, the fraction one third is used for both.

In some embodiments, the facility filters rows from the basis table having selling prices that reflect particularly rapid appreciation or depreciation of the home relative to its immediately-preceding selling price. For example, in some embodiments, the facility filters from the basis table recent sales whose selling prices represent more than 50% annual appreciation or more than 50% annual depreciation. In other embodiments, however, the facility initially performs the filtering described above, then uses the filtered basis table to construct a preliminary model, applies the preliminary model to the unfiltered basis table, and excludes from the basis table used to construct the primary model those sales where the valuation produced by the preliminary model is either more than 2 times the actual selling price or less than one-half of the actual selling price.

Returning to FIG. 9A, in step 902; the facility creates a root node for the tree that represents all of the basis sales contained in the basis table and the full range of each of the basis attributes.

Figure 11:
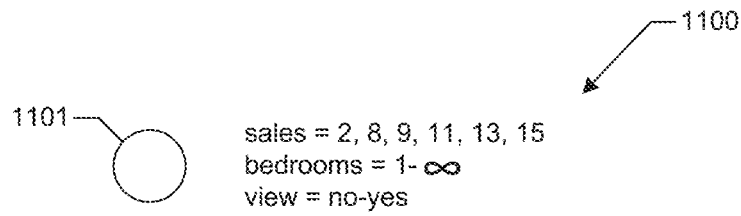
FIG. 11 is a tree diagram showing a root node corresponding to the basis table 1000.

FIG. 11 is a tree diagram 1100 showing a root node corresponding to the basis table 1000. The root node 1101 represents the sales having identifiers 2, 8, 9, 11, 13, and 15; values of the bedrooms attribute between 1-∞; and values of the view attribute of yes and no.

Returning to FIG. 9A, in steps 903-907, the facility loops through each node of the tree, including both the root node created in step 902 and any additional nodes added to the tree in step 905. In step 904, if it is possible to "split" the node, i.e., create two children of the node each representing a different subrange of an attribute value range represented by the node, then the facility continues in step 905, else the facility continues in step 906.

Figure 9B:
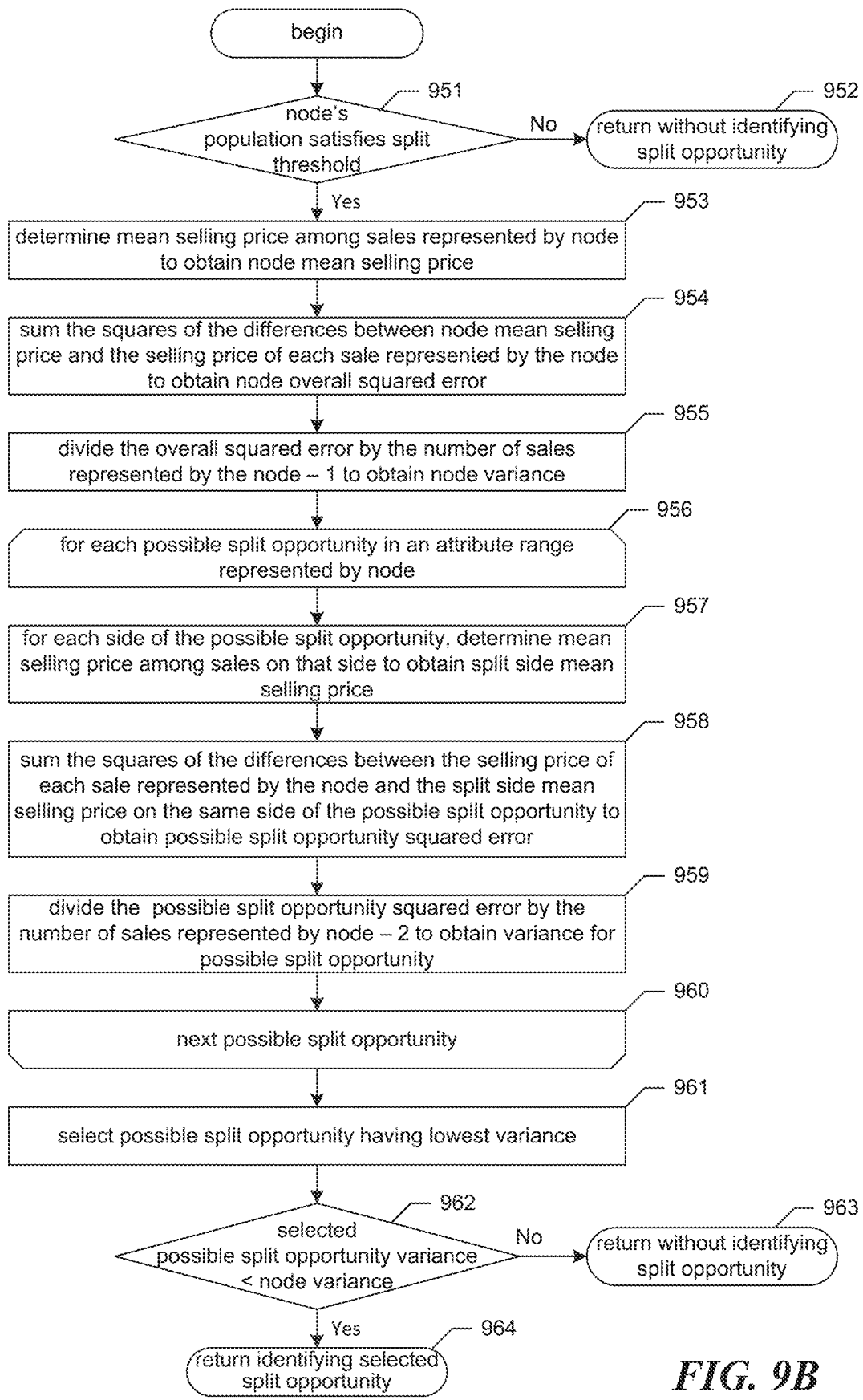
FIG. 9B is a flow diagram showing steps typically performed by the facility in order to determine whether and how to split a node of a tree.

FIG. 9B is a flow diagram showing steps typically performed by the facility in order to determine whether and how to split a node of a tree. These steps generally identify a potential split opportunity having the highest information gain, and determine whether the information gain of that potential split opportunity exceeds the information gain of the current node. In step 951, the facility determines whether the node's population—that is, the number of basis sales represented by the node—satisfies a split threshold, such as a split threshold that requires more than three basis sales. If the threshold is not satisfied, then the facility returns to step 904 in step 952 without identifying any split opportunity, such that the facility will not split the node; otherwise, the facility continues in step 953. Though not shown, the facility may apply a variety of other tests to determine whether the node should be split, including whether any of the selected attribute ranges represented by the node is divisible. For example, where the selected attributes are bedrooms and view, and a node represents the ranges bedrooms=5 and view=no, none of the node's selected attribute ranges can be split.

In steps 953-955, the facility analyzes the characteristics of the node in order to be able to compare them to characteristics of pairs of possible child nodes that would result from different opportunities for splitting the node. In step 953, the facility determines the mean selling price among the sales represented by the node to obtain a node mean selling price for the node. Applying step 953 to root node 1100 shown in FIG. 11, the facility determines a mean selling price for the node as shown below in Table 1 by determining the mean of all the selling prices shown in basis table 1000.

TABLE 1

| 1 | Node mean selling price = | $201,400 |
|---|---|---|

In step 954, the facility sums the squares of the differences between the node mean selling price determined in step 954 and the selling price of each sale represented by the node to obtain a node overall squared error. This calculation is shown below in Table 2 for root node 1101.

TABLE 2

| 2 | Sale 2 overal squared error = $(\$201,000-\text{line}1)^2 =$ | 160000 |
|---|---|---|
| 3 | Sale 8 overall squared error = $(\$74,900-\text{line }1)^2 =$ | 16002250000 |
| 4 | Sale 9 overall squared error = $(\$253,500-\text{line }1)^2 =$ | 2714410000 |

TABLE 2-continued

| 5 | Sale 11 overall squared error = ($230,000-line 1)$^2$ = | 817960000 |
| 6 | Sale 13 overall squared error = ($211,000-line 1)$^2$ = | 92160000 |
| 7 | Sale 15 overall squared error = ($238,000-line 1)$^2$ = | 1339560000 |
| 8 | Node overall squared error = | 20966500000 |

In step 955, the facility divides the overall squared error by one fewer than the number of sales represented by the node in order to obtain a node variance. The calculation of step 955 for root node 1100 is shown below in Table 3.

TABLE 3

| 9 | Node variance = line 8/5 = | 4193300000 |

In steps 956-960, the facility analyzes the characteristics of each possible split opportunity that exists in the node; that is, for each attribute range represented by the node, any point at which that range could be divided. For root node 1100, three such split opportunities exist: (1) view=no/view=yes; (2) bedrooms≤4/bedrooms>4; and (3) bedrooms≤5/bedrooms>5. In step 957, for each side of the possible split opportunity, the facility determines the mean selling price among sales on that side to obtain a split side mean selling price. Table 4 below shows the performance of this calculation for both sides of each of the three possible split opportunities of root node 1100.

TABLE 4

| 10 | Split side mean selling price of view = no side of possible split opportunity 1 = mean of selling prices for sales 2, 8, 11, and 13 = | $179,225 |
| 11 | Split side mean selling price of view = yes side of possible split opportunity 1 = mean of selling prices for sales 9 and 15 = | $245,750 |
| 12 | Split side mean selling price for bedrooms ≤ 4 side of possible split opportunity 2 = mean of selling prices of sales 8 and 11 = | $152,450 |
| 13 | Split side mean selling price for bedrooms > 4 side of possible split opportunity 2 = mean of selling prices of sales 2, 9, 13, and 15 = | $225,875 |
| 14 | Split side mean selling price for bedrooms ≤ 5 side of possible split opportunity 3 = mean of selling prices of sales 8, 11, 13, and 15 = | $188,475 |
| 15 | Split side mean selling price for bedrooms > 5 side of possible split opportunity 3 = mean of selling prices of sales 2 and 9 = | $227,250 |

In step 958, the facility sums the squares of the differences between the selling price of each sale represented by the node and the split side mean selling price on the same side of the possible split opportunity to obtain a possible split opportunity squared error. The result of the calculation of step 958 for root node 1100 is shown below in Table 5.

TABLE 5

| 16 | Possible split opportunity 1 squared error for sale 2 = ($201,000-line 10)$^2$ = | 474150625 |
| 17 | Possible split opportunity 1 squared error for sale 8 = ($74,900-line 10)$^2$ = | 10883705625 |
| 18 | Possible split opportunity 1 squared error for sale 9 = ($253,500-line 11)$^2$ = | 60062500 |
| 19 | Possible split opportunity 1 squared error for sale 11 = ($230000-line 10)$^2$ = | 2578100625 |
| 20 | Possible split opportunity 1 squared error for sale 13 = ($211,000-line 10)$^2$ = | 1009650625 |

TABLE 5-continued

| 21 | Possible split opportunity 1 squared error for sale 15 = ($238,000-line 11)$^2$ = | 60062500 |
| 22 | Possible split opportunity 1 squared error = sum of lines 16-21 = | 15065732500 |
| 23 | Possible split opportunity 2 squared error for sale 2 = ($201,000-line 13)$^2$ = | 618765625 |
| 24 | Possible split opportunity 2 squared error for sale 8 = ($74900-line 12)$^2$ = | 6014002500 |
| 25 | Possible split opportunity 2 squared error for sale 9 = ($253500-line 13)$^2$ = | 763140625 |
| 26 | Possible split opportunity 2 squared error for sale 11 = ($230000-line 12)$^2$ = | 6014002500 |
| 27 | Possible split opportunity 2 squared error for sale 13 = ($211,000-line 13)$^2$ = | 221265625 |
| 28 | Possible split opportunity 2 squared error for sale 15 = ($238000-line 13)$^2$ = | 147015625 |
| 29 | Possible split opportunity 2 squared error = sum of lines 23-28 = | 13778192500 |
| 30 | Possible split opportunity 3 squared error for sale 2 = ($201,000-line 15)$^2$ = | 689062500 |
| 31 | Possible split opportunity 3 squared error for sale 8 = ($74900-line 14)$^2$ = | 12899280625 |
| 32 | Possible split opportunity 3 squared error for sale 9 = ($253500-line 15)$^2$ = | 689062500 |
| 33 | Possible split opportunity 3 squared error for sale 11 = ($230000-line 14)$^2$ = | 1724325625 |
| 34 | Possible split opportunity 3 squared error for sale 13 = ($211,000-line 14)$^2$ = | 507375625 |
| 35 | Possible split opportunity 3 squared error for sale 15 = ($238000-line 14)$^2$ = | 2452725625 |
| 36 | Possible split opportunity 3 squared error = sum of lines 30-35 = | 18961832500 |

In step 959, the facility divides the possible split opportunity squared error by two less than the number of sales represented by the node to obtain a variance for the possible split opportunity. The calculation of step 959 is shown below in Table 6 for the three possible split opportunities of root node 1100.

TABLE 6

| 37 | Variance for possible split opportunity 1 = line 22/4 = | 3766433125 |
| 38 | Variance for possible split opportunity 2 = line 29/4 = | 3444548125 |
| 39 | Variance for possible split opportunity 3 = line 36/4 = | 4740458125 |

In step 960, if another possible split opportunity remains to be processed, then the facility continues in step 956 to process the next possible split opportunity, else the facility continues in step 961.

In step 961, the facility selects the possible split opportunity having the lowest variance. In the example, the facility compares lines 37, 38 and 39 to identify the possible split opportunity 2 as having the lowest variance. In step 962, if the selected possible split opportunity variance determined in step 961 is less than the node variance determined in step 955, then the facility continues in step 964 to return, identifying the split opportunity selected in step 961, else the facility continues in step 963 to return without identifying a split opportunity. In the example, the facility compares line 38 to line 9, and accordingly determines to split the root node in accordance with split opportunity 2.

Returning to FIG. 9A, in step 905, where the steps shown in FIG. 9B determine that the node should be split, the facility creates a pair of children for the node. Each child represents one of the subranges of the split opportunity identified in step 904 and the node's full range of unselected attributes. Each child represents all basis sales whose attributes satisfy the attribute ranges represented by the child. Step 905 is discussed in greater detail below in connection with FIG. 12.

In step 906, because the node will be a leaf node, the facility determines the mean selling price of basis sales represented by the node.

In step 907, the facility processes the next node of the tree. After step 907, these steps conclude.

Figure 12:
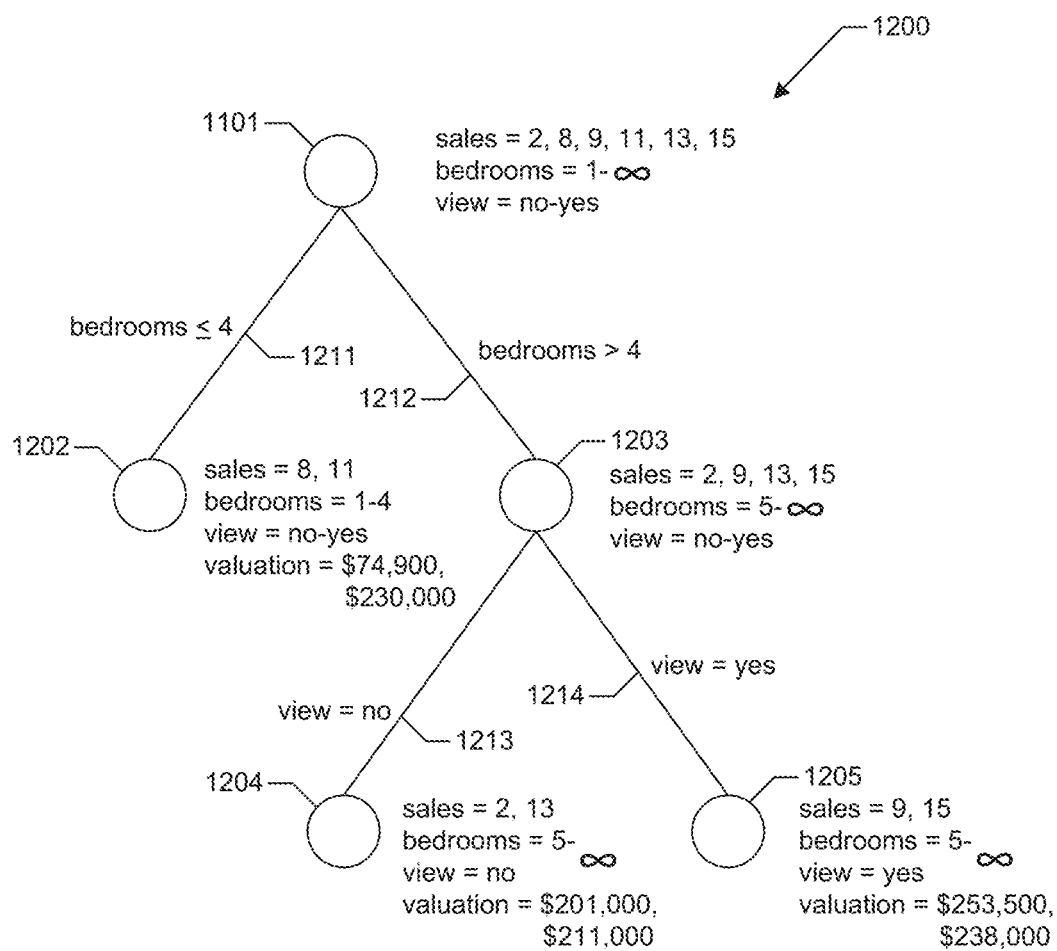
FIG. 12 is a tree diagram showing a completed version of the sample tree.

FIG. 12 is a tree diagram 1200 showing a completed version of the sample tree. It can be seen that the facility added child nodes 1202 and 1203 to root node 1101 corresponding to the subranges defined by the split opportunity selected in step 961. Node 1202 represents sales whose bedrooms attribute is less than or equal to 4, that is, between 1 and 4, as well as the full range of view attribute values represented by node 1101. Accordingly, node 1202 represents sales 8 and 11, having selling prices $74,900 and $230,000. Because this number of sales is below the threshold of 4, node 1202 qualifies as a leaf node.

Node 1203 represents sales with bedrooms attribute values greater than 4, that is, 5-∞. Node 1203 further represents the full range of view attributes values for node 1101. Accordingly, node 1203 represents sales 2, 9, 13, and 15. Because this number of sales is not smaller than the threshold number and the node's ranges are not indivisible, the facility proceeded to consider possible split opportunities. In order to do so, the facility performs the calculation shown below in Table 7. For the following two possible split opportunities: (4) view=no/view=yes; and (5) bedrooms=5/bedrooms>5.

TABLE 7

| | | |
|---|---|---|
| 40 | node mean selling price = mean of selling prices for sales 2, 9, 13, and 15 = | $225,875 |
| 41 | sale 2 overall squared error = ($201,000-line 40)² = | 618765625 |
| 42 | sale 9 overall squared error = ($253,500-line 40)² = | 76314625 |
| 43 | sale 13 overall squared error = ($211,000-line 40)² = | 221265625 |
| 44 | sale 15 overall squared error = ($238,000-line 40)² = | 147015625 |
| 45 | node overall squared error = | 1750187500 |
| 46 | node variance = line 45/3 = | 583395833 |
| 47 | split side mean selling price of view = no side of possible split opportunity 4 = mean selling prices of sales 2 and 13 = | $206,000 |
| 48 | split side mean selling price of view = yes side of possible split opportunity 4 = mean selling prices of sales 9 and 15 = | $245,750 |
| 49 | split side mean selling price for bedrooms ≤ 5 side of possible split opportunity 5 = mean selling prices of sales 13 and 15 = | $224,500 |
| 50 | split side mean selling price of bedrooms > 5 side of possible split opportunity 5 = mean selling prices of sales 2 and 9 = | $227,250 |
| 51 | possible split opportunity 4 squared error for sale 2 = ($201,000-line 47)² = | 25000000 |
| 52 | possible split opportunity 4 squared error for sale 9 = ($253,500-line 48)² = | 60062500 |
| 53 | possible split opportunity 4 squared error for sale 13 = ($211,000-line 47)² = | 25000000 |
| 54 | possible split opportunity 4 squared error for sale 15 = ($238,000-line 48)² = | 60062500 |
| 55 | possible split opportunity 4 squared error = sum of lines 51-54 = | 17012500 |
| 56 | possible split opportunity 5 squared error for sale 2 = ($201,000-line 50)² = | 689062500 |
| 57 | possible split opportunity 5 squared error for sale 9 = ($253,500-line 50)² = | 689062500 |
| 58 | possible split opportunity 5 squared error for sale 13 = ($211,000-line 49)² = | 182250000 |
| 59 | possible split opportunity 5 squared error for sale 15 = ($238000-line 49)² = | 182250000 |
| 60 | possible split opportunity 5 squared error = sum of lines 56-59 = | 1742625000 |
| 61 | variance for possible split opportunity 4 = line 55/2 = | 85062500 |
| 62 | variance for possible split opportunity 5 = line 60/2 = | 871312500 |

From Table 7, it can be seen that, between split opportunities 4 and 5, split opportunity 4 has the smaller variance, shown on line 61. It can further be seen that the variance of possible split opportunity 4 shown on line 61 is smaller than the node variance shown on line 46. Accordingly, the facility uses possible split opportunity 4 to split node 1203, creating child nodes 1204 and 1205. Child node 1204 represents basis sales 2 and 13 having selling prices $201,000 and $211,000, and attribute ranges bedrooms=5-∞ and view=no. Node 1205 represents base of sales 9 and 15 having selling prices $233,000 and $238,000, and attribute value ranges bedrooms=5-∞ and view=yes.

In order to apply the completed tree 1200 shown in FIG. 12 to obtain its valuation for a particular home, the facility retrieves that home's attributes. As an example, consider a home having attribute values bedrooms=5 and view=yes. The facility begins at root node 1101, and among edges 1211 and 1212, traverses the one whose condition is satisfied by the attributes of the home. In the example, because the value of the bedroom's attribute for the home is 5, the facility traverses edge 1212 to node 1203. In order to proceed from node 1203, the facility determines, among edges 1213 and 1214, which edge's condition is satisfied. Because the home's value of the view attribute is yes, the facility traverses edge 1214 to leaf node 1205. The facility then combines the selling prices represented by leaf node 1205 with those represented by the leaf nodes representing the home by the other trees of the forest, and selects the median as the forest's valuation of the home.

Those skilled in the art will appreciate that the tree shown in FIG. 12 may not be representative in all respects of trees constructed by the facility. For example, such trees may have a larger number of nodes, and/or a larger depth. Also, though not shown in this tree, a single attribute may be split multiple times, i.e., in multiple levels of the tree.

Figure 13:
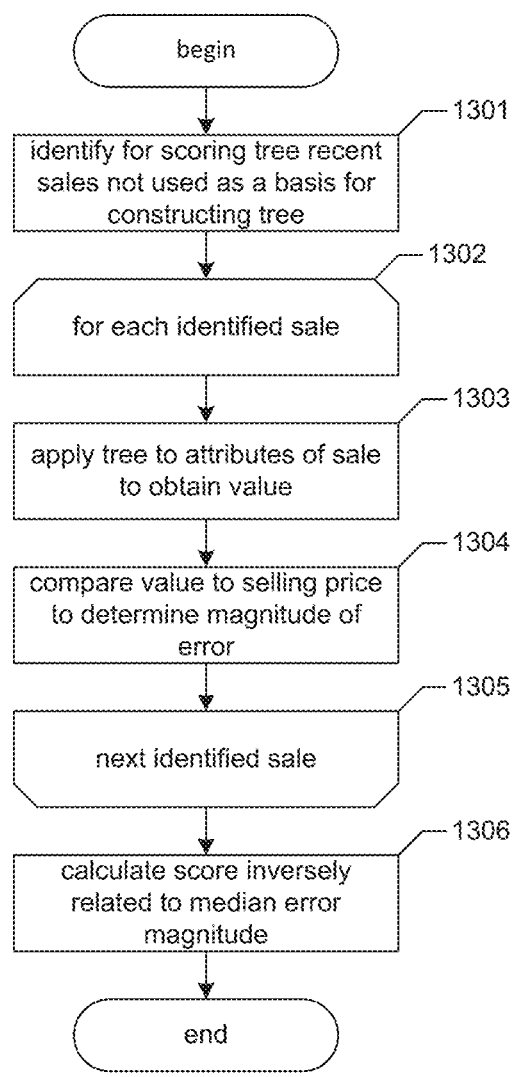
FIG. 13 shows steps typically performed by the facility in order to score a tree.

FIG. 13 shows steps typically performed by the facility in order to score a tree. In step 1301, the facility identifies recent sales in the geographic area that were not used as a basis for constructing the tree in order to score the tree. In steps 1302-1305; the facility loops through each sale identified in step 1301. In step 1303, the facility applies the tree to the attributes of the sale to obtain a value. In step 1304, the facility compares the value obtained in step 1303 to the selling price for the sale to determine an error magnitude, dividing the difference between valuation and selling price by selling price. In step 1306, the facility calculates a score that is inversely related to the median error magnitude determined in step 1304. After step 1306, these steps conclude.

FIG. 14 is a table diagram showing sample results for scoring a tree. Scoring table 1400 scores tree 1200 based upon the contents of recent sales table 800. The scoring table is made up of the rows of recent sales table 800 other than those used as basis sales for constructing the tree, i.e., rows 801, 803, 804, 805, 806, 807, 810, 812, and 814. It further contains the following columns from recent sales table 800: identifier column 821, address column 822, bedroom column 824, view column 827, and selling price column 829.

The scoring table further contains a valuation column 1411 containing the valuation of each home determined in step 1303. For example, row 807 shows that the facility determines the valuation of $245,750 for sale 7 using tree 1200. In particular, the facility begins at root node 1101; traverses to node 1203 because the number of bedrooms 5 is greater than 4; traverses to node 1205 because view=yes; and adopts the valuation of node 1205, $245,750. Scoring table 1400 further contains an error column 1412 indicating the difference between each home's valuation and selling price. For example, row 807 contains an error of 0.0685, the difference between valuation $245,750 and selling price $230,000, divided by selling price $230,000. Associated with the table is a median error field 1451 containing the median of error values in the scoring table, or 0.3734. Each tree's median error value is used to determine weightings for the trees that are inversely related to their median error values. In some embodiments, the facility determines the particular tree's weighting by generating an accuracy metric for each tree by subtracting its median error value from 1, and dividing the tree's accuracy measure by the sum of all of the trees' accuracy measures. Also, a variety of different approaches to determine a score that is negatively correlated with the average error may be used by the facility.

When a home is valued using the forest, the sample tree will be applied to the attributes of the home in the same way it was applied to homes in the scoring process described above. (If any attributes of the home are missing, the facility typically imputes a value for the missing attribute based upon the median or mode for that attribute in the recent sales table.) The valuation produced will be averaged with the valuations produced by the other trees of the forest. In the average, each valuation will be weighted by the score attributed by the facility to the tree. This resultant average is presented as the valuation for the home.

Figure 15:
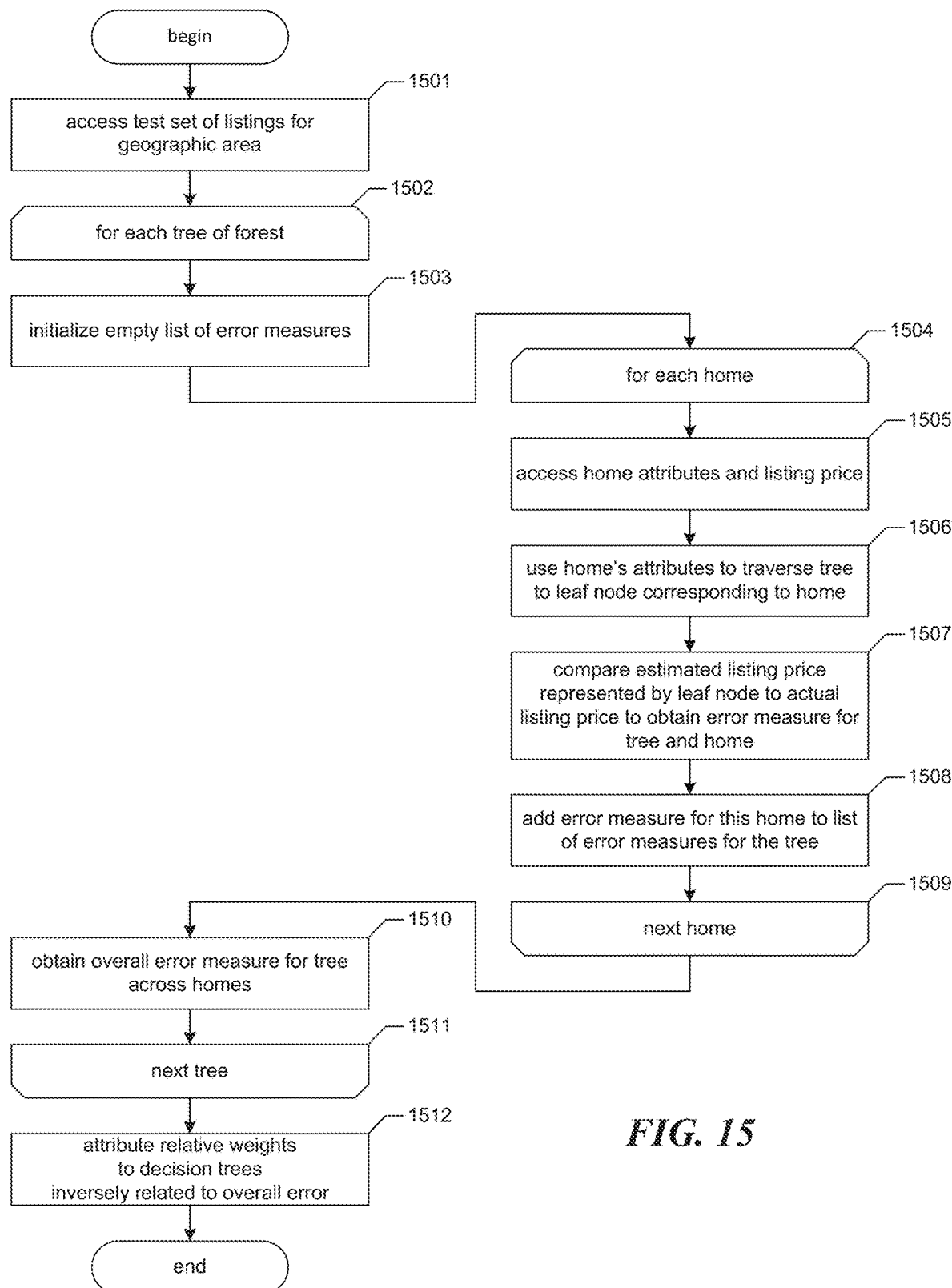
FIG. 15 is a flow diagram showing steps typically performed by the facility in some embodiments in evaluating the efficacy of trees in the forest and assigning corresponding relative weights to the trees.
Figure 16B:
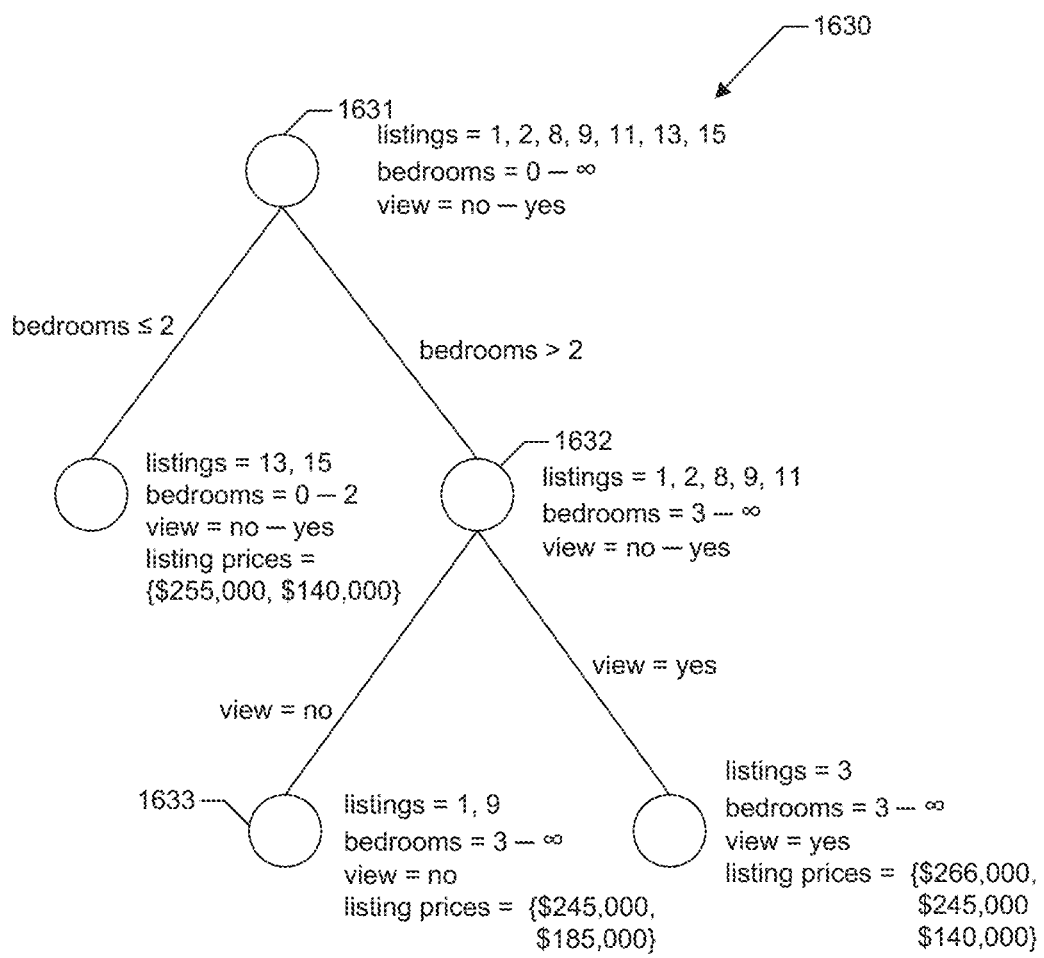
FIG. 16B is a tree diagram showing a completed version of the sample tree.

FIG. 15 is a flow diagram showing steps typically performed by the facility in some embodiments in evaluating the efficacy of trees in the forest and assigning corresponding relative weights to the trees. Once a forest of trees has been constructed and trained with a first set of recent listings (a training set) as described above, the facility in step 1501 accesses a distinct second set of listings (a test set) to gauge the accuracy of predictions of each tree in the forest. The facility loops through each tree in the forest in step 1502, typically initializing in step 1503 a data structure such as a list or array for collecting error measures for the tree's listing price estimations for each home listing in the test set. In steps 1504-1505, the facility loops through each home listing in the test set and for each home accesses the home's attribute values and actual listing price. In step 1506, the facility applies the home's attribute values to the tree in order to reach a leaf node of the tree corresponding to the home and an estimated listing price associated with that leaf node. Steps 1505-1506 are the same steps the facility would use to apply a tree (such as tree 1630 shown in FIG. 16B) to the attribute values of a distinguished home to obtain an estimated listing price for the home.

In step 1507, the facility compares the estimated listing price for the home determined from the tree's leaf node with the actual listing price for the home accessed in step 1505. In some embodiments, the comparison determines the absolute value of the difference between the estimated listing price and the actual listing price, and calculates the magnitude of the estimation's error in relation to the actual listing price by dividing the difference by the actual listing price. In step 1508, the resulting error measure for the tree's listing price estimation for the home is added to the list of error measures for the tree, and in step 1509 the process is repeated until error measures for the tree's estimations have been collected for each home in the test set. In step 1510, the facility obtains an overall error measure for the tree based on the collected error measures for the test set homes. In some embodiments, the overall error measure for the tree is determined by taking an average (e.g., the median value) of the individual error measures calculated from the tree's estimations for the homes in the test set.

In step 1511, steps 1503-1510 are repeated for each tree in the forest, resulting in the facility assigning an overall error measure to each tree. In step 1512, the facility accords a relative weight to each tree that is inversely related to the overall error measure for the tree. In this manner, trees that provided more accurate listing price estimates over the test set may be attributed increased likelihood of producing correct estimates. In some embodiments, to determine a particular tree's weighting the facility generates an accuracy metric for each tree by subtracting its median error value from 1, and dividing the tree's accuracy measure by the sum of all of the trees' accuracy measures. In various embodiments, the facility uses a variety of different approaches to determine a rating that is negatively correlated with the tree's overall error measure.

FIG. 16C is a table diagram showing sample results for testing a tree, Tree 1 testing table 1650 tests tree 1630 based upon the contents of recent listings table 1600. More particularly, testing is performed using recent listings that were not used to train the tree. The testing table is thus made up of rows 1601, 1602, 1603, 1604, 1605, 1606, 1607, and 1608 of recent listings table 1600. It also contains the following columns from recent listings table 1600: identifier column 1621, address column 1622, bedrooms column 1623, view column 1624, and actual listing price column 1625. The testing table further contains an estimated listing price column 1626 containing the estimated listing price of each home determined in steps 1506-1507. For example, row 1608 shows that the facility determines a listing price of $215,000 for listing 14 using tree 1630. To arrive at that determination, the facility begins at root node 1631; traverses to node 1632 because the number of bedrooms 3 is greater than 2; traverses to node 1633 because the value for view is "no;" and adopts the estimated listing price of node 1633; $215,000.

Tree 1 testing table 1650 further contains an error column 1627 indicating the difference between each home's estimated listing price and actual listing price. For example, row 1608 shows an error of 0.2874, calculated as the absolute difference between estimated listing price $215,000 and actual listing price $167,000, divided by actual listing price $167,000. Associated with the table is a median error field 1651 containing the median of error values in the testing table, or 0.1829, Each tree's median error value is used to determine weightings for the trees that are inversely related to their median error values.

Figure 17:
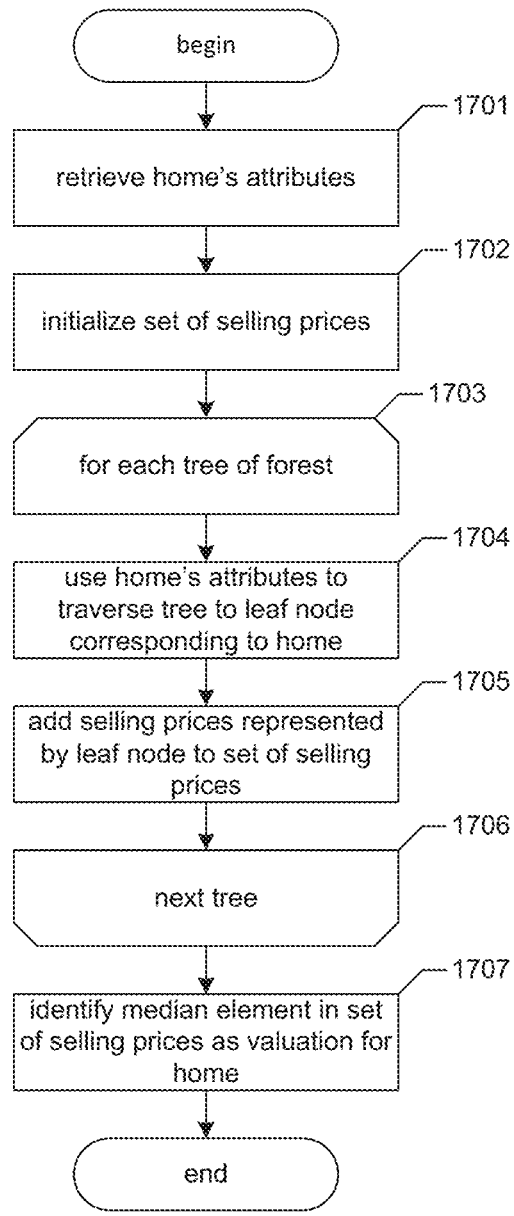
FIG. 17 shows steps typically performed by the facility in order to apply a forest of trees to obtain a valuation for a home.

FIG. 17 shows steps typically performed by the facility in order to apply a forest of trees to obtain a valuation for a home. In step 1701; apply a forest of trees valuation model to obtain a valuation for a particular home. In step 1701, the facility retrieves the home's attributes. In step 1702, the facility initializes a set of selling prices. In steps 1703-1706, the facility loops through each tree of the forest. In step 1704, the facility uses the home's attributes retrieved in step 1701 to traverse the tree to a leaf corresponding to the home and its attributes. In step 1705, the facility copies from the leaf node traversed-to in step 1704, the list of the selling prices of basis sales represented by the leaf node. In step

1706, if additional trees of the forest remain to be processed; then the facility continues in step 1703 to process the next tree, else the facility continues in step 1707. In step 1707, the facility identifies as its valuation for the home a median element in the set of selling prices accumulated in step 1705. After step 1707, the steps conclude.

Figure 18:
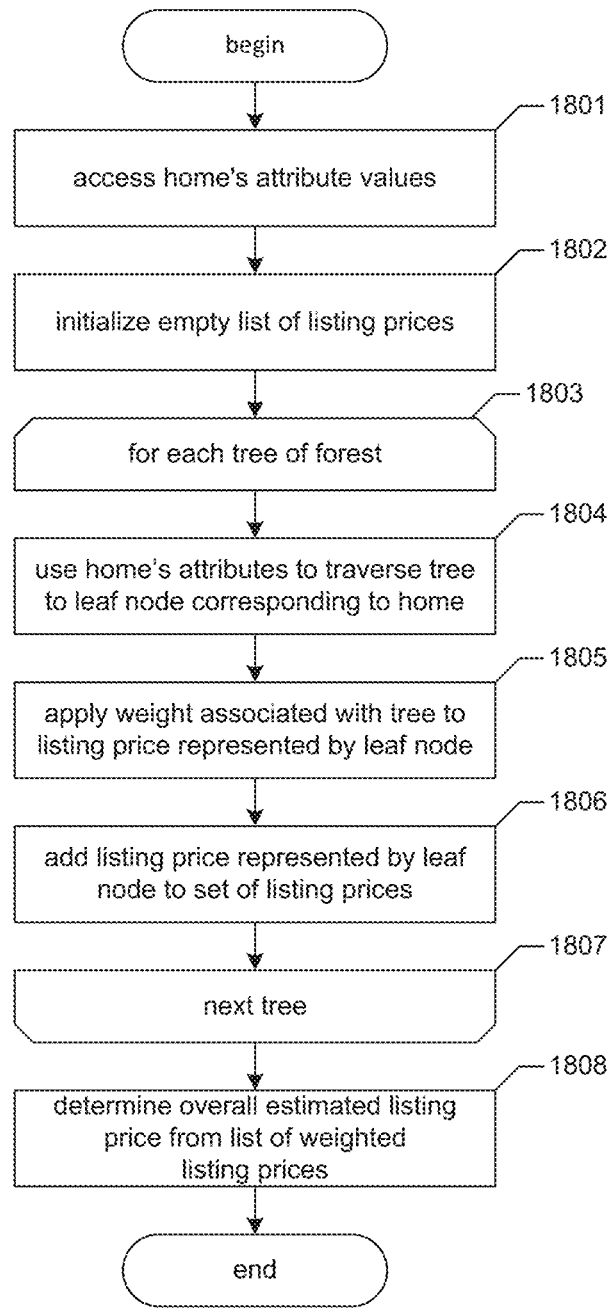
FIG. 18 is a flow diagram showing steps typically performed by the facility in some embodiments in order to apply a forest of trees to estimate a listing price for a distinguished home.

FIG. 18 is a flow diagram showing steps typically performed by the facility in some embodiments in order to apply a forest of trees to estimate a listing price for a distinguished home. In step 1801, the facility accesses the distinguished home's attribute values. In step 1802, the facility typically initializes a data structure such as a list or array for collecting listing price estimations from each tree in the forest. In steps 1803-1807, the facility loops through each tree in the forest obtaining an estimated listing price for the distinguished home from each tree. In step 1804, the facility uses the home's attributes retrieved in step 1801 to traverse the tree to a leaf node corresponding to the home's attributes. (If any attributes of the home are missing, the facility typically imputes a value for the missing attribute based upon the median or mode for that attribute in the recent listings table.) The application of a tree to a home in step 1804 is performed in the same way that a tree is applied to a home in the testing process described above in connection with FIGS. 15 and 16. In step 1805, the estimated listing price associated with the leaf node is weighted by the rating attributed by the facility to the tree. In some embodiments, the weight attributed to the tree in the testing process is already incorporated into the estimated listing price as part of the testing process. In some embodiments, weighting is applied when the estimated listing prices of the trees in the forest are combined. In step 1808, the facility determines an overall estimated listing price for the distinguished home by combining the accumulated weighted estimated listing prices obtained by applying each tree in the forest to the home's attribute values. In some embodiments, the weighted estimated listing price from each tree is averaged with the weighted estimated listing prices from the other trees of the forest, and the resultant average is presented as the overall estimated listing price for the home.

FIG. 19 is a table diagram showing sample contents of a recent listings and sales table. The recent listings and sales table 1900 is made up of rows 1901-1915, each representing a home listing and a corresponding sale that occurred in a recent period of time, such as the preceding six months. Each row is divided into the following columns: an identifier column 1921 containing an identifier for the listing and sale; an address column 1922 containing the address of the listed and sold home; a square foot column 1923 containing the floor area of the home; a bedrooms column 1924 containing the number of bedrooms in the home; a bathrooms column 1925 containing the number of bathrooms in the home; a floors column 1926 containing the number of floors in the home; a view column 1927 indicating whether the home has a view; a year column 1928 showing the year in which the home was constructed; a listing date column 1929 showing the date on which the home was listed for sale; a listing price column 1930 containing the listing price at which the home was listed; a sale date column 1931 showing the date on which the home was sold; and a selling price column 1932 containing the selling price at which the home was sold.

For example, row 1911 indicates that for listing-and-sale ID number 11, the home at 87 Acme Boulevard, Williamsburg, Va. 23185 having a floor area of 1480 square feet, 3 bedrooms, 2 bathrooms, 2 floors, a view, built in 2002, was listed for sale at $140,000 on Apr. 3, 2012, and sold for $133,000 on Jun. 27, 2012. Though the contents of recent listings and sales table 1900 are included to present a comprehensible example, those skilled in the art will appreciate that the facility can use a recent listings and sales table having columns corresponding to different and/or a larger number of attributes, as well as a larger number of rows. Attributes that may be used include, for example, construction materials, cooling technology, structure type, fireplace type, parking structure, driveway; heating technology, swimming pool type, roofing material, occupancy type, home design type, view type, view quality, lot size and dimensions; number of rooms, number of stories; school district, longitude and latitude; neighborhood or subdivision, tax assessment, attic and other storage; etc. For a variety of reasons, certain values may be omitted from the recent listings and sales table. In some embodiments, the facility imputes missing values using the median value in the same column for continuous variables, or the mode (i.e., most frequent) value for categorical values.

Figure 20A:
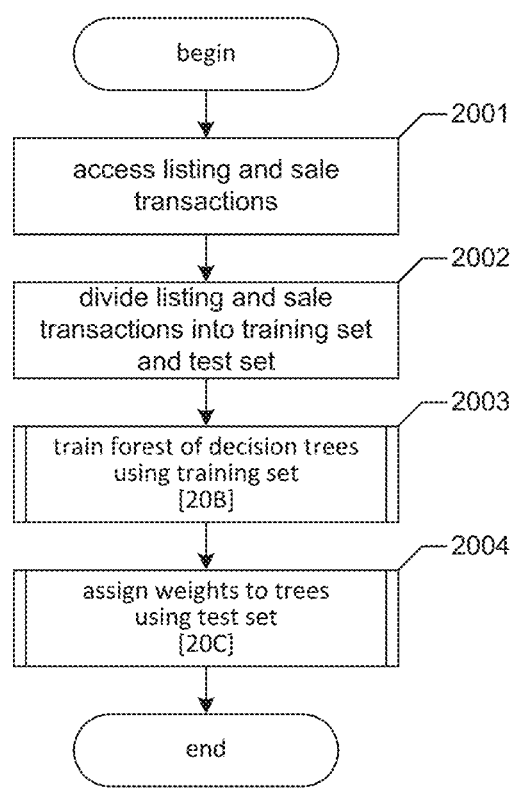
FIGS. 20A-20C are a flow diagram showing steps typically performed by the facility in some embodiments in order to prepare and weight a forest of valuation-estimating decision trees.
Figure 20B:
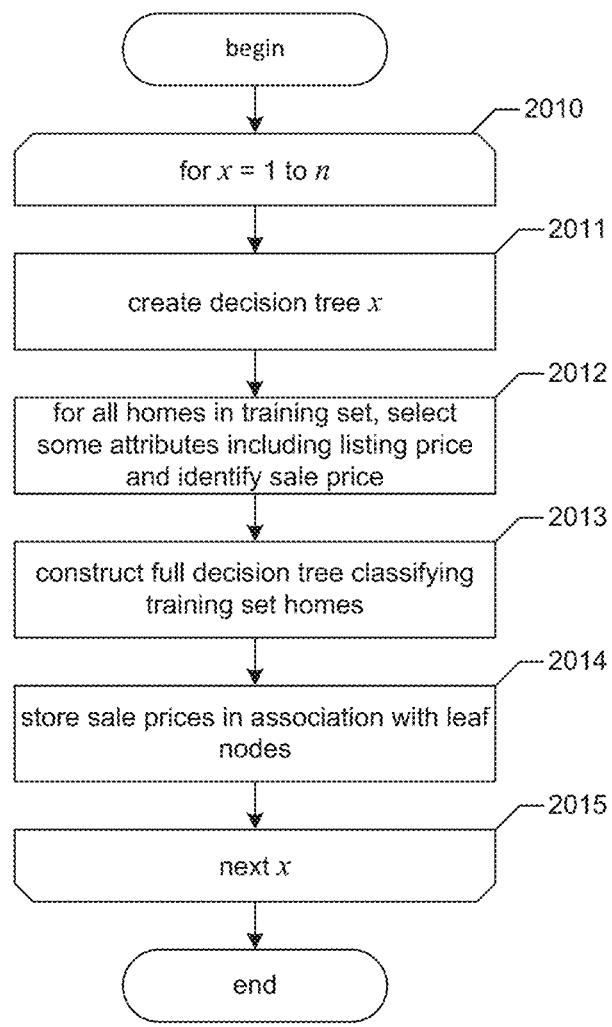
Figure 20C:
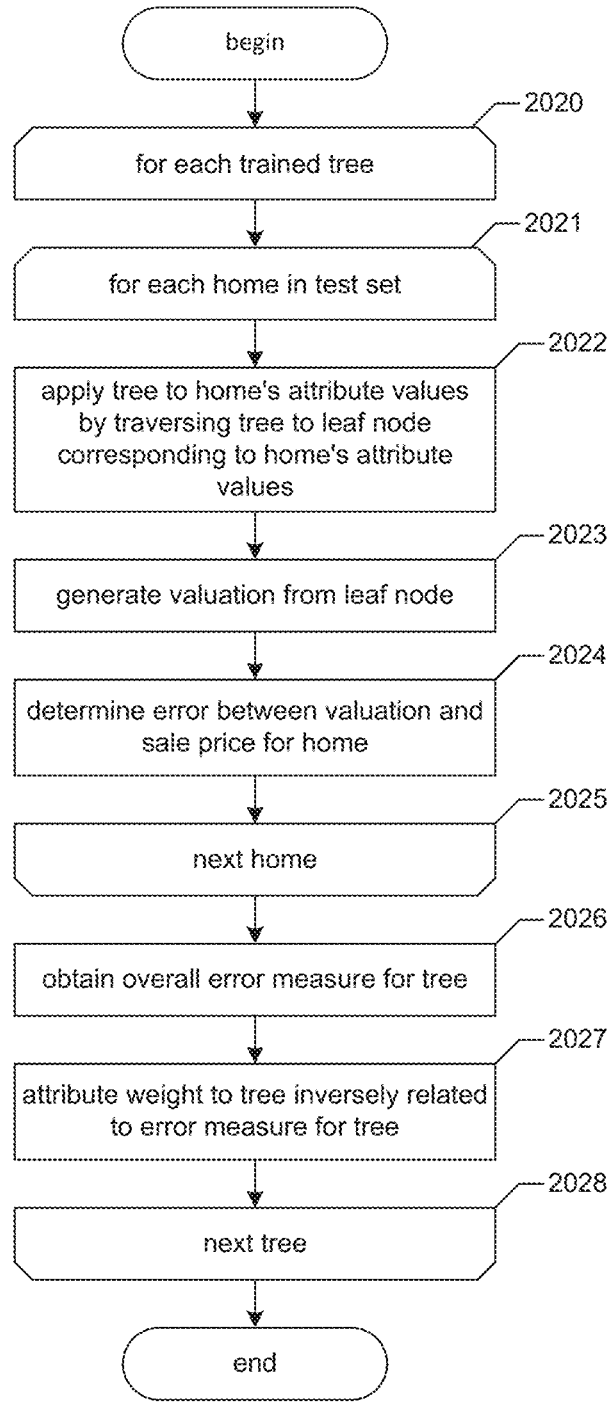

FIGS. 20A-20C are a flow diagram showing steps typically performed by the facility in some embodiments in order to prepare and weight a forest of valuation-estimating decision trees. FIG. 20A is a flow diagram showing a broad outline of the steps performed in building a forest of trained, weighted decision trees that use home attributes including listing prices to generate home valuations. In step 2001, the facility accesses recent listings and sales of homes in a geographic area, comprising home attribute values, listing transactions, and sale transactions. An example of such data is provided in recent listings and sales table 1900 in FIG. 19. In some embodiments, accessing recent listings and sales includes filtering the data to exclude bad data or outlier data. In some embodiments, portions of the data used to train the trees are listings data for homes that have been listed for sale, for which synthetic sale prices have been generated as discussed in greater detail below in connection with FIGS. 21 and 23. In step 2002, the facility divides the listing and sale transactions into two distinct sets: a first set of home listings and sales data for training a valuation model (a training set) and a second, distinct set of home listings and sales data for testing and weighting the valuation model (a test set). In step 2003, the facility trains, using the training set, a forest of decision trees to estimate home valuations from the homes' attribute values and listing prices. Step 2003 is discussed in greater detail below in connection with FIG. 20B. In step 2004, the facility tests, using the test set, the accuracy of the decision trees' estimations and assigns weights to the trees of the forest in order to improve the quality of home valuation estimates. Step 2004 is discussed in greater detail below in connection with FIG. 20C.

FIG. 20B is a flow diagram showing steps typically performed by the facility in some embodiments in order to create and train a forest of decision trees to estimate home valuations from home attribute values and listing prices. In steps 2010-2015, the facility constructs and trains a number n of trees, such as 100. This number is configurable, with larger numbers typically yielding better results but requiring the application of greater computing resources. In step 2011, the facility constructs a new tree (i.e., a root node). In step 2012, the facility selects a subset of the attributes in the training set home listing and sale data, including listing price, and identifies the sale price, as a basis for training the tree. In step 2013, the facility fully constructs (i.e., trains) the tree to classify the training set home data using the subset of attributes including listing price selected in step 2012, resulting in a trained tree that can be used to estimate a home valuation from home attributes including a listing price. (The process of creating and training a home valuation-estimating decision tree is analogous to the process of creating and training a home listing-price-estimating decision tree.) Once the tree has been fully constructed, each leaf node represents a range of home attribute values including listing prices, such that each home in the training set corresponds to exactly one leaf node. In step 2014, the facility stores, in association with the leaf nodes, the sale prices of the training set homes that correspond to the attribute value ranges of each leaf node. The facility after step 2015 has created a forest of n trained but un-tested and non-weighted decision trees.

FIG. 20C is a flow diagram showing steps typically performed by the facility in some embodiments in testing and assigning relative weight to the trees of the forest created and trained as described in connection with FIG. 20B. (The process of testing and weighting a forest of home valuation-estimating decision trees is analogous to the process of testing and weighting a forest of home listing-price-estimating decision trees described above in connection with FIG. 15.) In step 2020, the facility iterates through each tree in the forest, performing steps 2021-2027 for each tree. In step 2021, the facility loops through each home listing and sale entry in the test set, and accesses the home's attribute values including listing price, and its sale price. In step 2022, the facility applies the home's attribute values to the tree, traversing the tree to a leaf node corresponding to the home's attribute values and its listing price. In step 2023, the facility generates an estimated home valuation associated with that leaf node. (Steps 2022-2023 are the same steps the facility would use to apply a home valuation-estimating tree to the attribute values and listing price of a distinguished home to obtain a valuation for the home, as discussed in further detail below in connection with FIG. 21.) In step 2024, the facility compares the estimated valuation for the home as generated in step 2023 with the sale price for the home contained in the test set data, and determines an error measure (e.g., the absolute difference divided by the sale price) for the estimation by that tree for that home. In step 2025, the facility performs the same steps for each home listing and sale entry in the test set, recording the error measures for each home for that tree. In step 2026, the facility obtains an overall error measure for the tree based on the collected error measures for the test set homes. In step 2027, the facility attributes a weight to the tree inversely related to the tree's overall error measure. In step 2028, the facility repeats steps 2021-2027 for each tree, resulting in a forest of trained, weighted decision trees that use a home's attributes and listing price to generate a home valuation.

Figure 21:
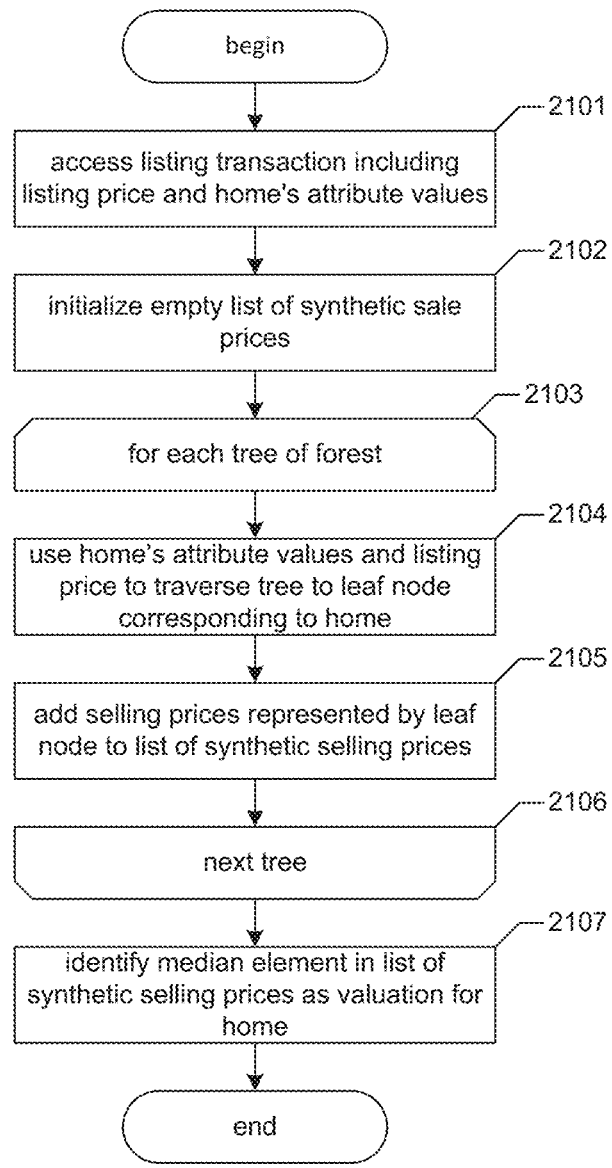
FIG. 21 is a flow diagram showing steps typically performed by the facility in some embodiments in order to apply a forest of trees to generate a synthetic sale price for a home.

FIG. 21 is a flow diagram showing steps typically performed by the facility in some embodiments in order to apply a forest of trees to generate a synthetic sale price for a home. In step 2101, the facility accesses a home listing transaction including home attribute values and a listing price for a distinguished home. In step 2102, the facility initializes a data structure such as a list or array for collecting synthetic sale price estimations from each tree in the forest. In steps 2103-2106, the facility iterates through each tree in a forest of decision trees that use home attributes and a listing price to generate a home valuation. In step 2104, the facility applies a tree to the home's attribute values and listing price, traversing the edges of the tree graph to reach the leaf node whose range of encompassed attribute values and listing prices corresponds to the home's attribute values and listing price. In step 2105, the valuation or selling prices associated with that leaf node are added to the data structure that was initialized in step 2102 for collecting sale price estimations. After applying each tree in the forest to the distinguished home in step 2106, the data structure has collected valuations for the home from each tree. In step 2107, the facility generates a synthetic sale price for the distinguished home based on the collected valuations. In some embodiments, the home's overall synthetic sale price is generated by identifying the median element in the list of synthetic sale prices generated by the trees of the valuation-estimating decision tree forest.

FIG. 22 is a table diagram showing sample contents of a recent listings table including synthetic sale prices. The recent listings and sales table 2200 is made up of rows 2201-2215, each representing a home listing that occurred in a recent period of time, such as the preceding six months, and a corresponding synthetic sale price, Each row is divided into the following columns: an identifier column 2221 containing an identifier for the listing and synthetic sale; an address column 2222 containing the address of the listed home; a square foot column 2223 containing the floor area of the home; a bedrooms column 2224 containing the number of bedrooms in the home; a bathrooms column 2225 containing the number of bathrooms in the home; a floors column 2226 containing the number of floors in the home; a view column 2227 indicating whether the home has a view; a year column 2228 showing the year in which the home was constructed; a listing price column 2229 containing the listing price at which the home was listed; a date column 2230 showing the date on which the home was listed for sale; and a synthetic sale price column 2231 containing the synthetic sale price generated for the home.

For example, row 2206 indicates that for listing number 6, the home at 1135 Eighth Avenue North, Williamsburg, Va. 23185 having a floor area of 2300 square feet, 2 bedrooms, 2 bathrooms, 1 floor, no view, built in 1966, was listed for sale at $239,000 on Feb. 22, 2012, and was accorded a synthetic sale price of $232,000. Though the contents of recent listings and synthetic sales table 2200 are included to present a comprehensible example, those skilled in the art will appreciate that the facility can use a recent listings and synthetic sales table having columns corresponding to different and/or a larger number of attributes, as well as a larger number of rows. For a variety of reasons, certain values may be omitted from the recent listings and sales table. In some embodiments, the facility imputes missing values using the median value in the same column for continuous variables, or the mode (i.e., most frequent) value for categorical values.

Figure 23:
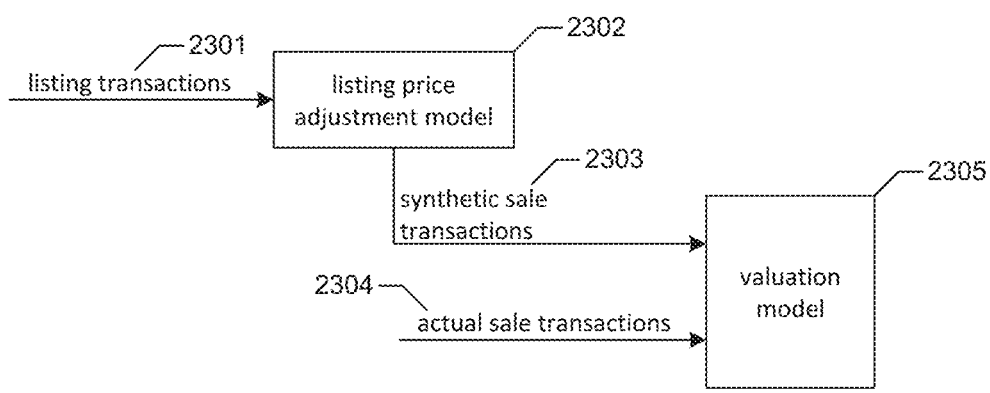
FIG. 23 is a data flow diagram showing a typical process used by the facility in some embodiments to train and/or test a home valuation model using data from both actual sale transactions and synthetic sale transactions generated by a listing price adjustment model.

FIG. 23 is a data flow diagram showing a typical process used by the facility in some embodiments to train and/or test a home valuation model using data from both actual sale transactions and synthetic sale transactions generated by a listing price adjustment model. Listing transactions 2301 are provided to a listing price adjustment model 2302, which uses the data to generate synthetic sale transactions 2303. Both synthetic sale transactions 2303 and actual sale transactions 2304 are used to train and/or test a valuation model 2305. The valuation model 2305 is then able to produce valuations for homes based in part on synthetic sale data.

Figure 24:
FIG. 24 is a display diagram showing a way in which information about an individual home including a valuation generated by the facility may be presented.

FIG. 24 is a display diagram showing a way in which information about an individual home including a valuation generated by the facility may be presented. The display 2400 includes information 2401 about the home. Despite the fact that the home has not been sold recently, the facility also displays a valuation 2402 and a confidence interval of valuation estimates 2403 for the home, enabling prospective buyers and listing agents to gauge their interest in the home, or permitting the home's owner to gauge his or her interest in listing the home for sale.

Figure 25:
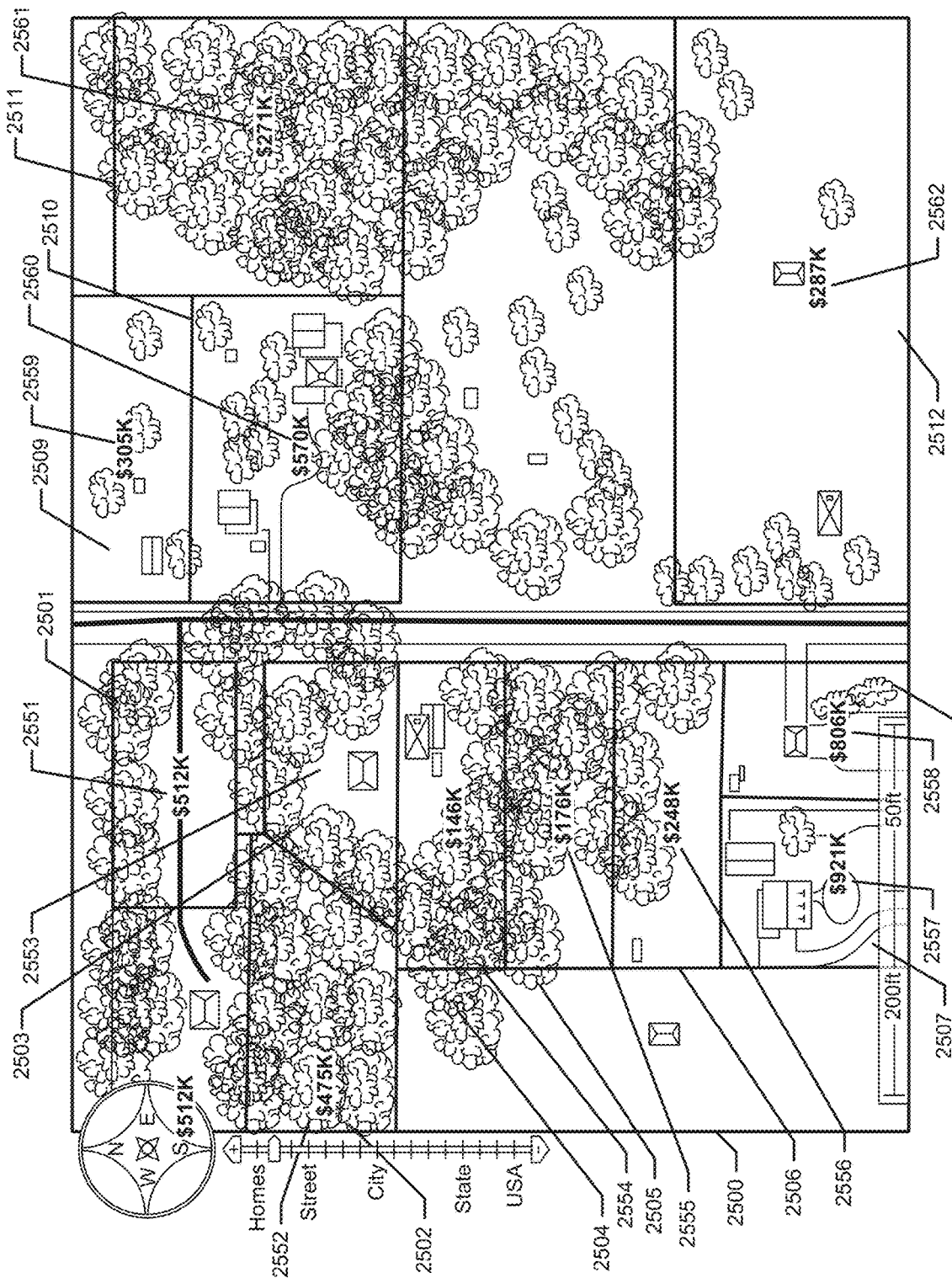
FIG. 25 is a display diagram showing a map identifying a number of homes in the same geographic area.

FIG. 25 is a display diagram showing a map identifying a number of homes in the same geographic area. The display 2500 shows homes 2501-2512. The facility also displays its valuations 2551-2562 of these homes in connection with their location on the map. Presenting the facility's valuations in this way permits home shoppers to obtain an overview of the geographic area, identify special trends within the geographic area, identify the anomalous values as good values or poor picks, etc.

In some embodiments, the valuations displayed or otherwise reported by the facility are not the "raw" valuations directly produced by the valuation model, but rather "smoothed" valuations that are generated by blending the raw valuation generated by the current iteration of the model with earlier valuations. As one example, in some embodiments, the facility generates a current smoothed valuation for a home by calculating a weighted average of a current raw valuation and a smoothed valuation of the same home from the immediately-preceding time period, where the prior smooth valuation is weighted more heavily than the current raw valuation. In some embodiments, where new iterations of the model are constructed and applied daily, the prior smoothed valuation is weighted 49 times as heavily as the current raw valuation; where a new iteration of the model is constructed and applied weekly, the prior smoothed valuation is weighted 9 times as heavily as the current raw valuation; where new iterations of the model are constructed and applied monthly, the previous smoothed valuation is weighted twice as heavily as the current raw valuation. Those skilled in the art will appreciate that a variety of other smoothing techniques may be used in order to dampen erotic movement in a particular home's reported valuation over time.

In some embodiments, the facility constructs and applies compound valuation models to one or more geographic areas. A compound valuation model includes two or more separate classification tree forests, some or all of which may be applied to the attributes of a particular home in order to value it. As one example, in some embodiments, the facility constructs a compound model including both a forest constructed as described above (referred to as a "core forest"), as well as a separate, "high-end" forest constructed from basis sales having a selling price above the 97.5 percentile selling price in the geographic area. In these embodiments, the compound model is applied as follows. First, the core forest is applied to the attributes of a home. If the valuation produced by the core forest is no larger than the 97.5 percentile selling price in the geographic area, then this valuation is used directly as the model's valuation. Otherwise, the facility also applies the high-end forest to the attributes of the home. If the valuation produced by the core forest is above the 99 percentile selling price, then the valuation produced by the high-end forest is used directly as the model's valuation. Otherwise, a weighted average of the valuations produced by the core forest and the high-end forest is used, where the weight of the core forest valuation is based upon nearness of the core model valuation to the 97.5 percentile selling price, while the weight of the high-end forest valuation is based on the nearness of the core forest valuation to the 99 percentile selling price.

Tailoring Valuation to User Input

Figure 26:
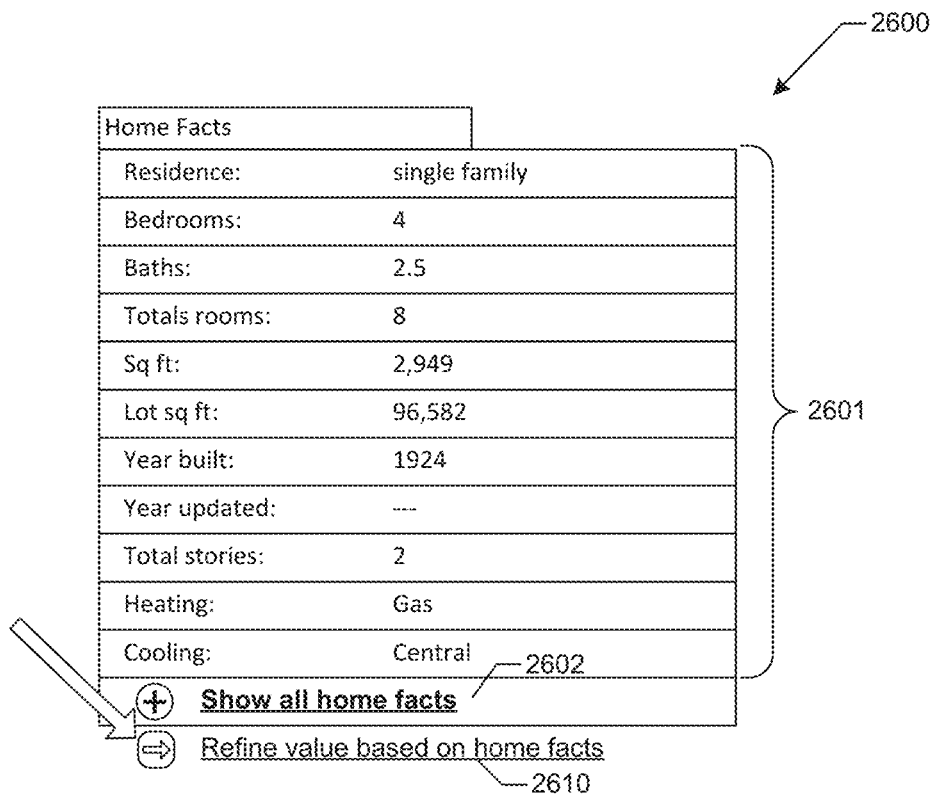
FIG. 26 is a display diagram showing a display typically presented by the facility containing the attributes of a particular home, also called "home facts."
Figure 27:
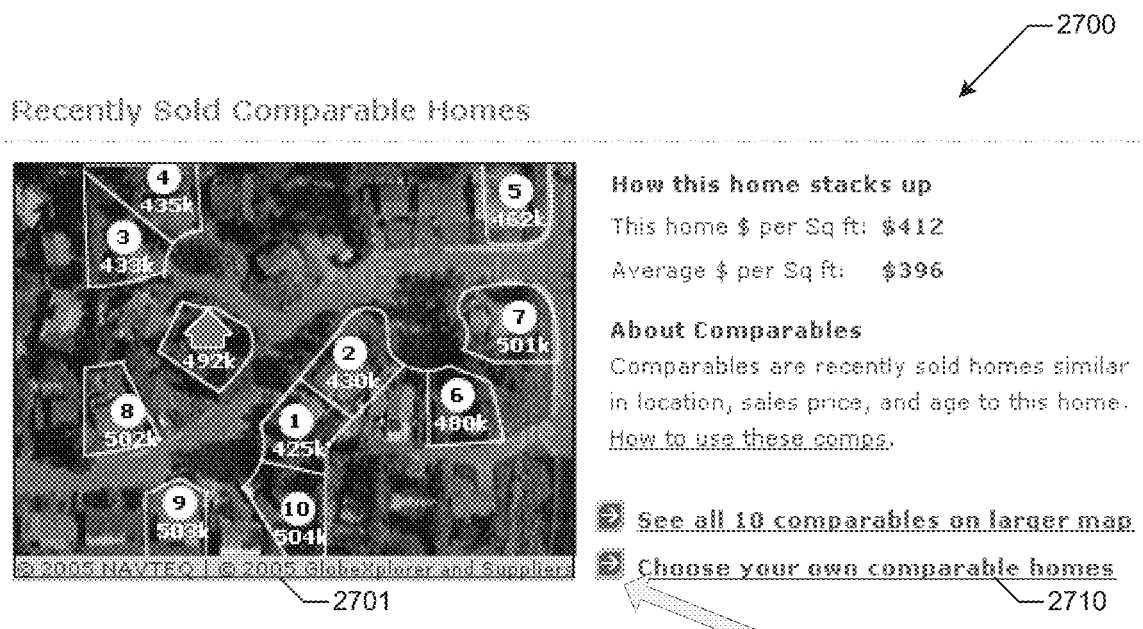
FIG. 27 is a display diagram showing a display typically presented by the facility to identify possible comparable sales on a map.

The facility typically initiates the tailoring of a valuation for a subject home to input from the subject home's user in response to expression of interest by the user in performing such tailoring. In various embodiments, the facility enables the user to express such interest in a variety of ways. As one example, the user may select link 2411 from the display of detailed information about a particular home shown in FIG. 24. FIGS. 26 and 27 show additional ways that the facility permits the user to express such interest in some embodiments. FIG. 26 is a display diagram showing a display typically presented by the facility containing the attributes of a particular home, also called "home facts," The display 2600 includes a list 2601 of attributes and their values, as well as a link 2602 to display a more extensive list. The display further includes a way 2610 that the user may traverse in order to express interest in tailoring the valuation of the home.

FIG. 27 is a display diagram showing a display typically presented by the facility to identify possible comparable sales on a map. The display 2700 includes such a map 2701 and well as a link 2710 that the user can follow in order to express interest in tailoring evaluation of this home.

Figure 28:
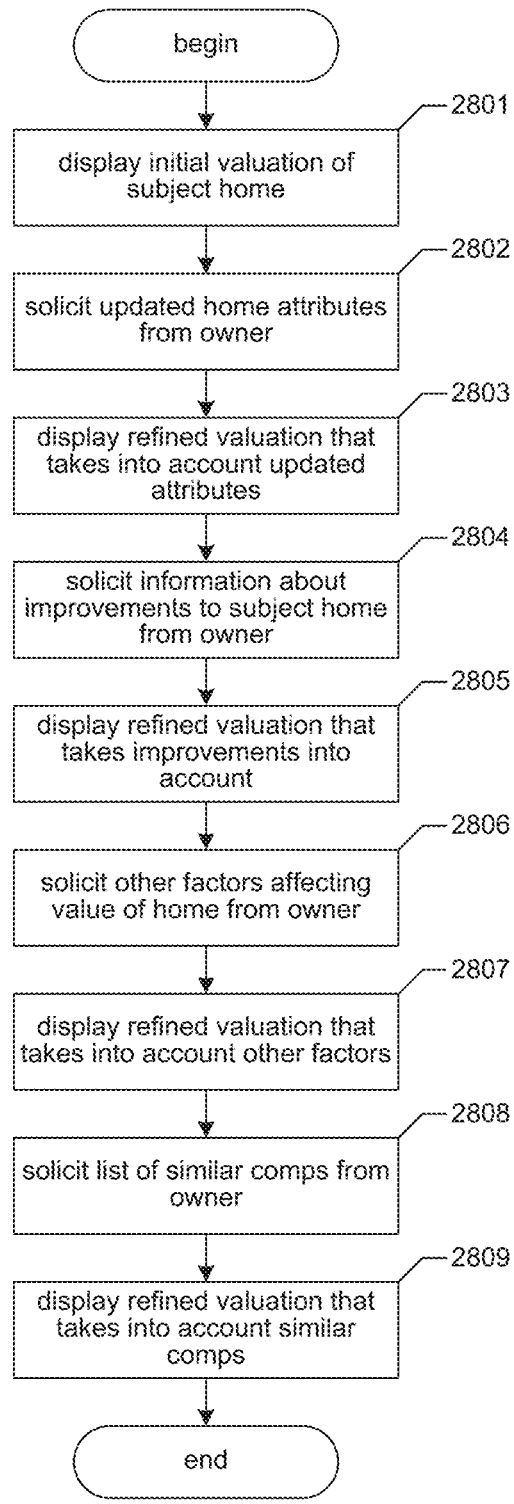
FIG. 28 is a flow diagram showing steps typically performed by the facility in order to tailor a valuation of a subject home based on information provided by the home's user.

FIG. 28 is a flow diagram showing steps typically performed by the facility in order to tailor a valuation of a subject home based on information provided by the home's user. The interactions described herein are typically performed by serving web pages to a user who is the user of the subject home, and receiving input from that user based upon the user's interaction with the web pages. These web pages may be part of a web site relating to aspects of residential or other real estate. FIGS. 30-34, discussed in greater detail below, contain sample displays presented by the facility in some embodiments in performing the steps of FIG. 28.

In step 2801, the facility displays an initial valuation of the subject home. In step 2802, the facility solicits updated home attributes from the user.

Figure 29:
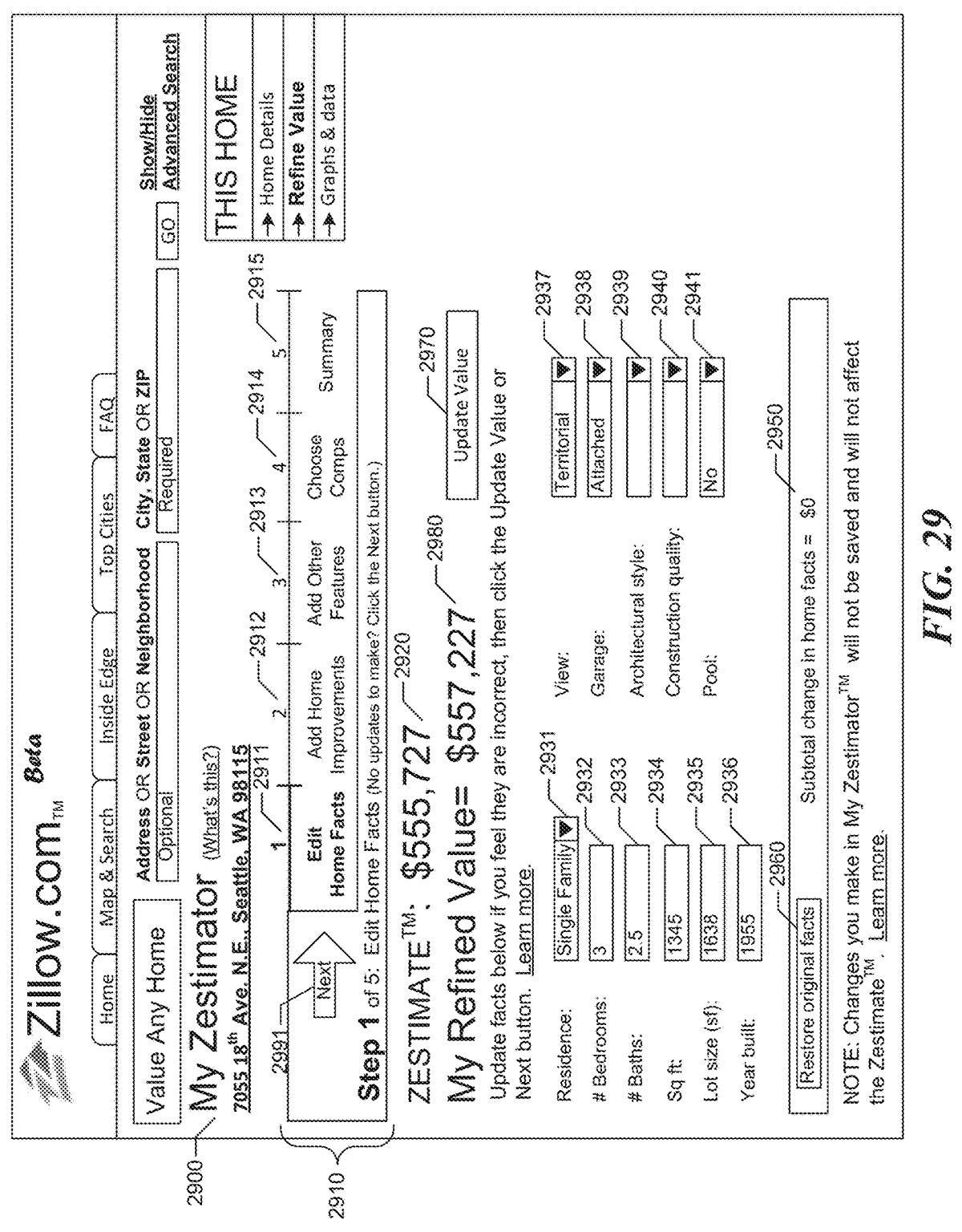

FIG. 29 is a display diagram showing a sample display typically presented by the facility to display an initial valuation of the subject home and solicit updated home attributes from the user. The display 2900 includes a navigation area 2910 which includes a progress indicator made up of step indicators 2911-2915. The display of step indicator 2911 for the first step more prominently than the other step indicators indicates that the first step is presently being performed. The display further includes an initial valuation 2920 in the amount of $550,727. In this and the display diagrams that follow, home valuations are identified as "Zestimates." The display also includes a number of controls 2931-2941, each corresponding to a different attribute or "home fact" of the subject home. In some embodiments, attribute controls are only displayed for attributes whose value has a non-zero influence on the valuations provided by the valuation model for the geographic area containing the home, or a level of influence that exceeds a threshold larger than zero. Initially, these attribute controls are populated with attribute values automatically retrieved from a data source and used to determine the subject home's initial valuation in the manner described above. The user can interact with any of these controls to change the corresponding attribute value. For example, the user may interact with control 2932 to correct the number of bedrooms from 3 to 4, or may interact with control 2937 to update the indicated territorial view to a water view that was created when a nearby building was demolished. In some embodiments, as the user interacts with these controls, the facility updates an indication 2950 of the extent to which the user's updates have altered the valuation of the home. In some embodiments, the facility determines this amount by determining a new valuation for the home by applying the existing geographically-specific valuation model for the home—in other words, the existing forest of decision trees for the home—to the updated attributes, and subtracting the original valuation from the result. For example, where the user uses control 2937 to change the value of the view attribute from territorial to none, the facility retraverses all of the trees of the forest constituting the model for the geographic region containing the home. In particular, when the facility traverses sample tree 1200 shown in FIG. 12, rather than traversing from node 1203 to node 1205 for the home as the facility initially did based upon an affirmative value of the view attribute, the facility traverses from node 1203 to node 1204 based upon the new negative value of the view attribute. Accordingly, the weighted average of the valuations for all the trees of the forest include a valuation of $206,000 from tree 1200, obtained from leaf node 1204, rather than valuation of $245,750 obtained from node 1205.

If the user makes a mistake, he or she can select a control 2960 in order to restore the original facts on which the initial valuation was based. The user can select a control 2970 in order to update an indication 2980 of the valuation of home adjusted to take into account the user's updates to the attributes. In some embodiments (not shown), the facility further includes in the display a warning that, because an updated attribute value provided by the user is not represented among the basis sales used to construct the valuation model, updated valuations based upon this updated attribute value may be inaccurate. When the user has finished updating home attributes, he or she can select a next control 2991 to move to the next step of the process, describing home improvements.

Figure 31:
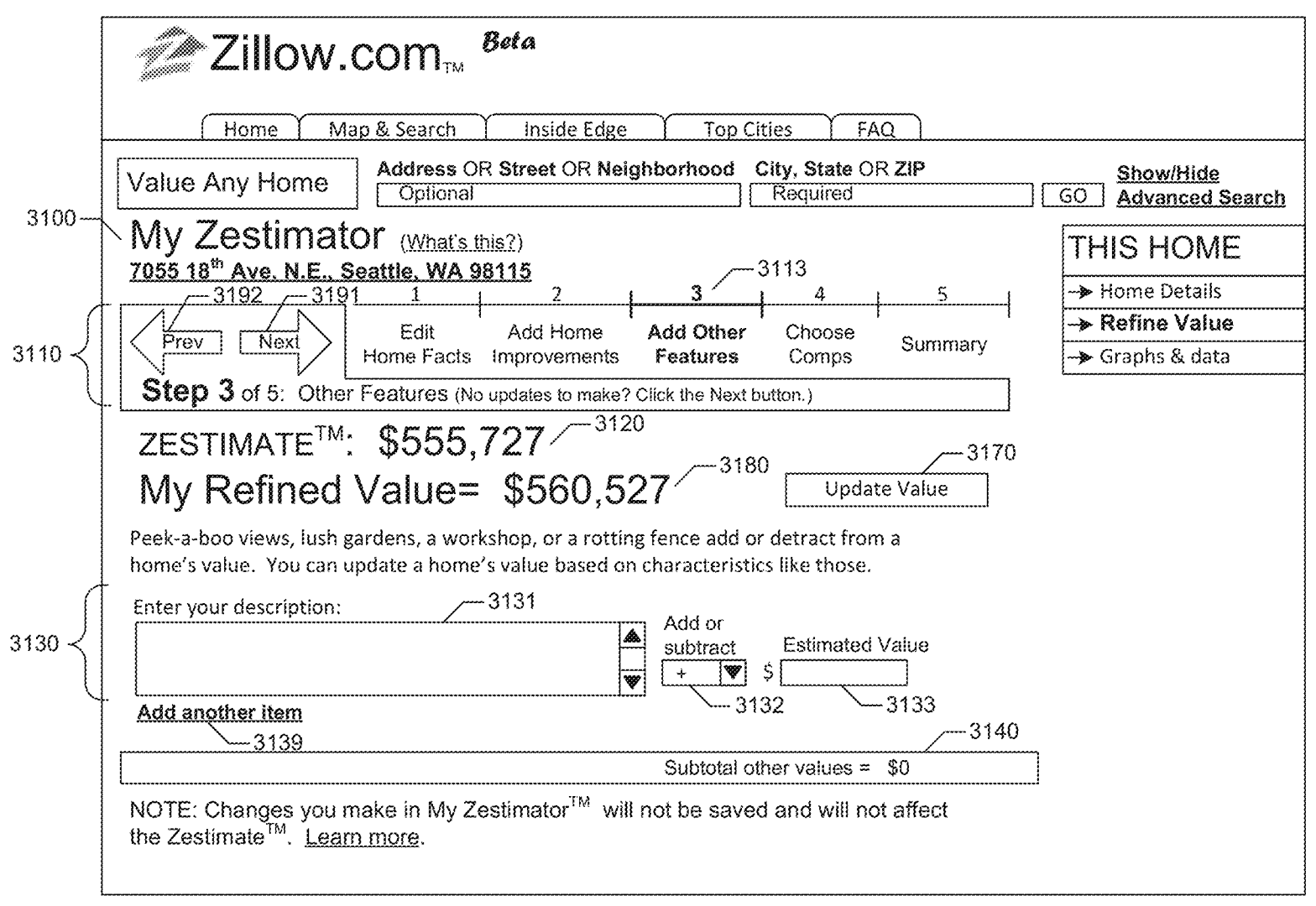

Returning to FIG. 28, in step 2803, the facility displays a refined valuation that takes into account the attributes updated by the user. In step 2804, the facility solicits information from the user about improvements to the subject home, FIG. 31 is a display diagram showing a typical display presented by the facility to permit the user to describe improvements made to the subject home. The display 3000 includes a highlighted step indication 3012 that indicates that the user is performing the second step of the process 3010. Indication 3080 reflects the addition of $1500 to the initial valuation 3020 based upon the attribute updates performed by the user in the first step of the process. The display includes a "Update Value" control 3070 that the user can use to update the valuation displayed at indication 3080. The display includes an area 3030 that the user can use to describe improvements to the subject home. These include an improvement type control 3031, an improvement timing control 3032, and an improvement cost control 3033. When the user interacts with these controls to describe an improvement, the facility typically uses the improvement type and the geographical region containing the subject home to access a table containing average recovery rates for different improvement types and regions. The facility applies the looked-up recovery rate to the improvement cost amount to obtain an estimated present value. In some embodiments, the facility further applies a depreciation schedule to the estimated present value, such as one specifying smooth depreciation from one hundred percent to twenty-five percent over the period between zero and ten years after the improvement, and a flat twenty-five percent thereafter. In some embodiments, however, the values of various improvements are incorporated directly in the valuation model—i.e., are represented in the trees of the forest—therefore may be handled in the application of the valuation model to the home, rather than computed separately. In some embodiments, the facility further monitors for the entry of home improvement in display 3000 that are redundant with attribute updates in FIG. 29, and prevents them from contributing redundantly to calculating the overall revised value for the subject home, either by preventing such an entry, or by reducing the value of such an entry to avoid double-counting. The facility then displays an indication 3034 of an estimated present value of the improvement. The user may select an edit link 3035 to override this estimate of present value. The display further includes a link 3039 that the user may follow to extend the improvement description area for describing another improvement. The display further includes an indication 3040 of the total present value of the described improvements. The display further includes a description 3050 of different improvement types made available by the facility. The user can click the next control 3091 to proceed to the next step of the process and/or click the previous control 3092 to proceed to the previous step of the process, describing other aspects of the home that affect its value.

Returning to FIG. 28, in step 2805, the facility displays a refined valuation that takes into account the improvements described by the user. In step 2806, the facility solicits information from the user about other factors affecting the value of the subject home.

FIG. 31 is a display diagram 3100 showing a sample display typically presented by the facility to enable the user to describe other aspects of the subject home that affect its value. The display 3100 includes a highlighted step indication 3113 that indicates that the user is performing the second step of the process 3110. It can be seen that indication 3180 of the refined value reflects the addition of $3300 to the valuation 3120 for improvements listed in the previous step. The display includes a "Update Value" control 3170 that the user can use to update the valuation displayed at indication 3120. The display includes a feature description area 3130 for inputting information about additional aspects. This area includes a description control 3131 for entering a description of the aspect, the control 3132 for indicating whether the aspect adds to or subtracts from the value of the home, and a control 3133 for indicating the magnitude of the impact of the aspect on the value of the home. The display further includes a link 3139 that the user may traverse to expand the aspect description area to describe another aspect. The display further includes an indication 3140 of the total amount added to or subtracted from the subject home's value by the described aspects. The user may select next control 3191 to proceed to the next step of the process, identifying comps regarded by the user as similar to the subject home. The user may select the previous control 3092 to proceed to the previous step of the process.

Returning to FIG. 28, in step 2807, the facility displays a refined valuation that takes into account the other factors described by the user. In step 2808, the facility solicits from the user a list of nearby homes that have recently sold ("comps") that are the most similar to the subject home.

Figure 32:
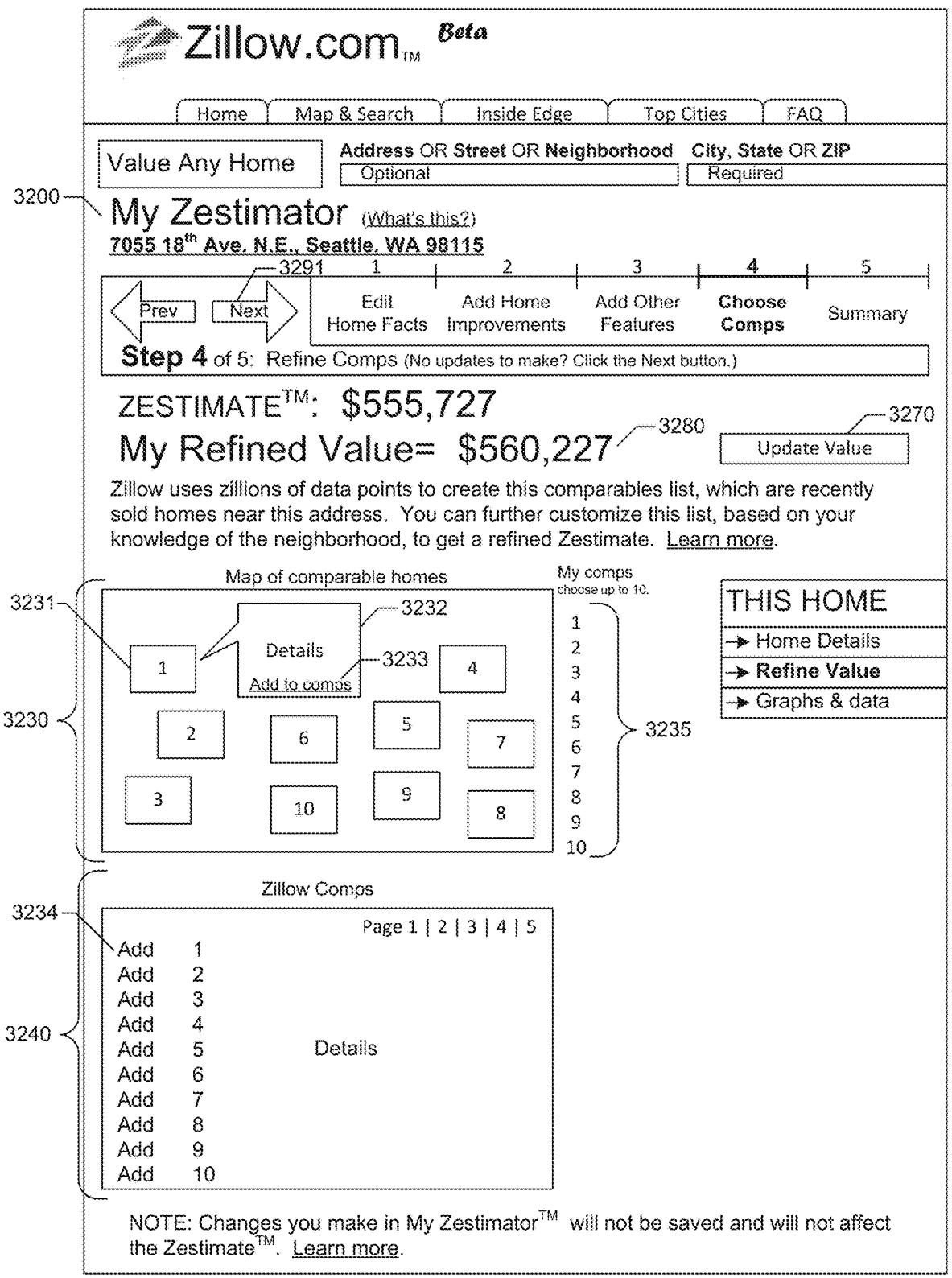
FIG. 32 is a display diagram showing a sample display presented by the facility in order to enable the user to identify comps regarded by the user as similar to the subject home.

FIG. 32 is a display diagram 3200 showing a sample display presented by the facility in order to enable the user to identify comps regarded by the user as similar to the subject home. It can be seen that the indication 3280 of refined value has been decreased by $300 to reflect a net reduction in the value corresponding to the sum of the inputted values for the aspects described in the previous step of the process. The display includes a map 3230 on which possible comps are displayed as numbers appearing in circles. For example, a possible comp 3231 appears as a circle with the number one in it. When the user hovers over and/or clicks on one of these possible comps, the facility displays a pop-up balloon including information about the possible comp. Additional information about the possible comps is also shown below in table 3240. The user can traverse link 3233 in the pop-up balloon 3232 or link 3234 in the table in order to add the first possible comp to a "My Comps" list 3235. The user populates the My Comps list in this manner, until it contains what he or she regards as up to ten comps most similar to the subject home.

After the user has populated the My Comps list, and selects either the updated value control 3270 or the next control 3291 in step 2809, the facility determines an updated valuation for the subject home based upon the population of the My Comps list. In particular, in some embodiments, the facility makes a copy of the recent sales table 800 for the geographic region that contains the subject home and was used to construct the forest for this geographic area. The facility alters the copy of the recent sales table to increase a weighting in the copy of the recent sales table of the comps in the My Comps list, causing them to be significantly more likely to be selected from the copy of the recent sales table for inclusion in tree basis tables. In some embodiments, the facility achieves this weighting by adding copies of the rows for each comp in the My Comps list to the recent sales table. In some embodiments, the facility also increases to a lesser extent the weighting in a copy of the recent sales table of the sales of homes that are near the subject home, such as having the same zip code, having the same neighborhood name, or having a calculated distance from the subject home that is below a particular distance threshold. The facility then uses this altered copy of the recent sales table to generate a new forest for the geographic region. The facility applies this forest, which is tailored to the comps included in the My Comps list, to the attributes of the home as updated in the first step of the process. In some embodiments, the result of applying the tailored forest is adjusted by averaging it with a separate valuation determined by multiplying the floor area of the subject home by an average selling price per square foot value among the sales on the My Comps list. In some embodiments, the facility determines the valuation by averaging the average selling price per square foot valuation with the original model valuation rather than the updated model valuation if the initial model valuation is between the adjusted model valuation and the average price per square foot valuation. The facility then subtracts from the resulting valuation the change in value from step one—$1500 in the example—because this amount is represented in the new valuation. To arrive at an overall valuation, the facility adds to the result the additional amounts identified in the second and third steps of the process, in the example $3300 and negative $300.

In some embodiments, the facility permits the user to populate the My Comps list with any similar nearby home, irrespective of whether it has recently been sold. The facility then emphasize the valuations of these homes, such as valuations automatically determined by the facility, in determining a refined valuation for the subject home.

Figure 33A:

FIGS. 33A-E and 34 show a sample display typically presented by the facility in order to present an overall revised value for the subject home. FIG. 33A shows the entire display 3300, while FIGS. 33B-34 show portions of the display at a greater level of magnification. The display includes an overall summary section 3330 containing an overview of the calculation of the new revised value, as well as detailed sections 3340, 3350, 3360, and 3370, each displaying additional detail about the value added or subtracted by each of the four steps of the process. FIG. 33B shows that section 3330 contains a breakdown beginning with the initial valuation 3320, and adding value increments 3331-3334 for each of the four steps of the process to arrive at the new revised value 3380. FIG. 33C (section 3340) shows that the increment 3331 for the updated attributes is the result of increasing the number of bedrooms from 3-4 (3341) and changing the view from none to water (3342). FIG. 33D (section 3350) shows that the value increment for home improvements 3332 is the result of adding a value of $300 for a new roof (3351) and $3000 for a kitchen remodel (3352). FIG. 33E (section 3360) shows that the increment for other aspects affecting the value of the subject home (3333) is arrived at by adding $700 for an orchard (3361) and subtracting $1000 because a new fence is needed (3362). FIG. 34 shows that the user's selection of comps has established an increment of $2650 (3435). Section 3470 further includes a map 3471 showing the comps selected by the user, as well as a table 3472 showing the same in a different form.

In various embodiments, the behavior of the facility described above is adapted in various ways. As one adaptation, in some embodiments, the facility uses a smoothed version of the valuation produced by the valuation model, rather than a raw version. For example, a smoothed version of this valuation may be obtained by blending the raw valuation produced using a current iteration of the model with one or more valuations produced using earlier iterations of the model. In some embodiments, such blending involves calculating a weighted average of the current raw valuation and the immediately-preceding smoothed valuation in which the smoothed valuation is weighted more heavily. For example, where the valuation model is updated daily, in some embodiments, the facility weights the preceding smoothed valuation 49 times more heavily than the current raw valuation.

As another adaptation, in some embodiments, where user input causes the facility to produce an updated valuation for a home that varies from the original valuation of the home by more than a threshold percentage, the facility displays a warning message indicating that the valuation has changed significantly, and may not be accurate.

As another adaptation, in some embodiments, the facility generates a tailored valuation using a valuation model that is constrained to use a proper subset of available home attributes, such as only the attributes whose values are available for the user to update in the first step of the process of generating the tailored valuation. In some embodiments, this involves using a separate decision tree forest valuation model that is constructed using only the subset of attributes. In some embodiments, this involves using a valuation model of another type that is constructed using only the subset of attributes, such as a linear regression model constructed by plotting each of the base of sales as a point in N+1-space, where N is the number of continuous attributes in the subset plus the sum of the unique values of categorical attributes in the subset minus the number of categorical attributes in the subset, N of the dimensions are devoted individually to the values of attributes among the subset, and the final dimension is devoted to selling price; and using curve-fitting techniques to construct a function yielding home value whose independent variables are the values of the attributes among the subset; this function is used to determine valuations of the subject home.

FIG. 35 is a table diagram showing sample contents of recent sales information used to construct a linear regression valuation model that is based on the attributes whose values are available for the user to update in the first step of the process of generating a tailored valuation. Table 3500 is made up of rows 3501-3517, each representing a home listing. It can be seen that the table 3500 includes the following columns for each sale: a sale id column 3521 containing an identifier for the sale; a square foot column 3522 containing the improved floor area of the home; a lot size column 3523 containing the area of the home's lot, in square feet; a bedrooms column 3524 containing the number of bedrooms in the home; a bathrooms column 3525 containing the number of bathrooms in the home; a floors column 3526 containing the number of stories in the home; a year column 3527 showing the year in which the house was constructed; a selling price column 3528 containing the selling price at which the home was sold; a roof type column 3529 indicating the type of material from which the home's roof is constructed; and a use code column 3530 containing an indication of the primary use of the home.

In some embodiments, the facility filters out the recent sales data used by the facility to generate a valuation formula sales whose attributes have extreme values, such as an age greater than 300 years. In some embodiments, the facility tailors the valuation formula created by the process described above to a particular home using one or more of the following techniques: more heavily weighting sales having a high selling price in valuation formulas constructed for valuing a home whose primary valuation is near the average selling price of these high-end homes; more heavily weighting recent sales that are geographically near the home to be valued, such as in the same zip code; and, where the user has selected particular recent sales as My Comps, more heavily weighting these sales in constructing the valuation formula. In some embodiments, data missing from the recent sales data used to construct the valuation function is imputed in a manner similar to that described above.

In some embodiments, the facility employs a model of a type other than the primary, decision-tree forest model, but does not use it to directly generate valuations of the subject home. Rather, it is used to generate valuations of the subject home before and after the user updates attributes of the subject home, and the percentage change in the valuation produced by the other model is applied to a valuation produced for the subject home using the original attribute values by the primary, decision-tree forest model. Similarly, in these embodiments, the facility may construct separate copies of the other model before and after the performance of the fourth, My Comps step of the process use each of the copies to value the subject home, determine the percentage change between these valuations, and apply it to a valuation produced for the subject home by the primary model before the fourth step of the process is performed.

Storing Tailored Valuation

Figure 36:
FIG. 36 is a display diagram showing a sample display typically presented by the facility in order to present a refined valuation for the subject home, together with a control for saving this refined valuation.

FIG. 36 is a display diagram showing a sample display typically presented by the facility in order to present a refined valuation for the subject home, together with a control for saving this refined valuation. The display 3600, similar to display 3400 shown in FIG. 34A, includes a save my estimate button 3601 that the user may select in order to save this estimate and the information upon which it is based. The display further includes a help control 3602 that the user may select in order to obtain more information about saving the refined valuation. When the user selects button 3601, the facility solicits additional information about how the refined valuation is to be saved.

Figure 37:
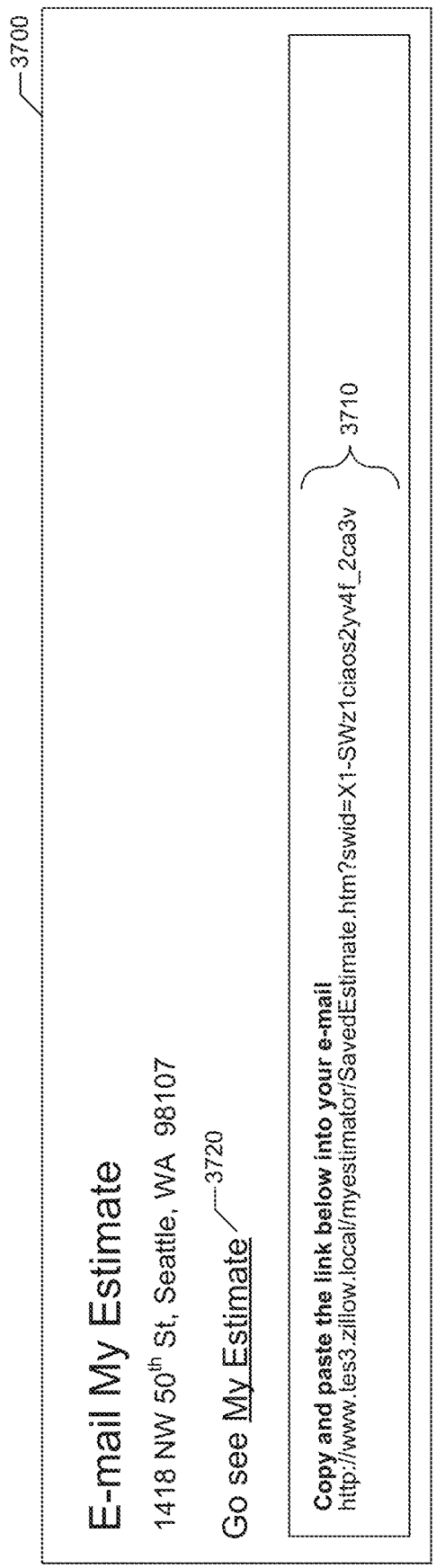
FIG. 37 is a display diagram showing a display typically presented by the facility where the user selects to save the refined valuation with the shared level of access.

FIG. 37 is a display diagram showing a display typically presented by the facility where the user selects to save the refined valuation with the shared level of access. The display 3700 includes a URL 3710 that the user may copy from the display into an email message addressed to any other people that the user wishes to be able to access the saved refined valuation. In some embodiments (not shown), the display 3700 includes a field into which the user may simply enter email addresses for these people, causing the facility to automatically send them a message containing URL 3710. The display also includes a link 3720 that the user may traverse in order to display information about the saved refined valuation, such as is shown in the Figures that follow.

FIG. 38 is a display diagram showing a display typically presented by the facility where the user selects to save the refined valuation with the private level of access. The display 3800 includes a list of "favorite homes", such as favorite homes 3810, 3820, and 3830. Each favorite home includes information identifying the favorite home, such as identifying information 3831 for favorite home 3830, as well as indications of any valuations determined for each favorite home that is accessible to the current user. Favorite home 3830 has an initial valuation 3832 based upon information publicly available about the home, as well as a refined valuation 3834 generated by the current user and saved with the private level of access. This user is the only one who can view this refined valuation, Additionally, this user can traverse links 3835 in order to update the refined valuation. For favorite home 3810, the facility displays a public refined valuation 3813 generated by the same user. Also, for favorite home 3820, the facility shows an indication 3825 that the user has not generated his or her own refined valuation for this home, and includes a link 3826 that the user may traverse in order to generate his or her own refined valuation.

FIG. 39 is a display diagram showing a display typically presented by the facility where the user selects to save the refined valuation with the public level of access. The display 3900 is accessible to any user, and in some embodiments may be accessed from a home detail page presented for the home and containing various information about the home. It contains information 3901 identifying home, and initial valuation 3902, and a refined valuation 3903 generated by the owner. The display includes comments 3905 entered by the owner as part of saving the refined Valuation the display further includes an overview breakdown 3906 of the value added or subtracted by each of the stages of the refined valuation. The display further includes a list 3907 of some or all of the home facts as modified by the owner, and an indication 3908 of the value added or subtracted as a result; a list 3909 of any home improvements identified by the owner, and an indication 3910 of the value added or subtracted as a result; and a list 3911 of any other features identified by the owner, and an indication 3912 of the value added or subjected as a result. In some embodiments (not shown), the facility includes in this display similar detail sections for the other features and comps stages of the refined valuation process. The display further includes a print control 3913 that the user may activate in order to print the estimate shown in the display, as well as a send control 3914 that the user may activate in order to email the estimate to other users. Additionally, the display contains the following additional controls: a control 3921 that the user may activate in order to rescind the publication of the owner's estimate; a control 3922 that the user may activate in order to update the owner's estimate; a control 3923 that the user may activate to delete the owner's estimate; and a control 3924 that the user may activate in order to edit the comments 3905 about the owner's estimate.

In various embodiments, where a refined valuation is saved, the facility uses different approaches to displaying it. In some embodiments, each refined valuation is displayed with exactly the same value it had at the time it was generated. In some embodiments, when a refined valuation is displayed, the facility begins with the initial valuation that existed at the time that the refined valuation was generated, but applies a refined valuation model to the information provided to generate the refined valuation that is updated based upon current information to arrive at a refined valuation is potentially different than the refined valuation originally generated. In some embodiments, when a refined valuation is displayed, the facility begins with the latest (i.e., most current) initial valuation that existed is presently available for the home, and adjusts this initial valuation by the original differential produced by the refined valuation when originally to arrive at a refined valuation is potentially different than the refined valuation originally generated. In some embodiments, when a refined valuation is displayed, the facility begins with the latest (i.e., most current) initial valuation that existed is presently available for the home, and adjusts this initial valuation by a differential determined by applying a refined valuation model to the information provided to generate the refined valuation that is updated based upon current information to arrive at a refined valuation is potentially different than the refined valuation originally generated.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system for training at least one home valuation model to estimate home values in a distinguished geographic area, the method comprising:
   generating a set of training items for the distinguished geographic area, the set of training items comprising a plurality of entries each entry corresponding to a home of a first plurality of homes located in the distinguished geographic area, each entry indicating: (1) a geographic feature-sensitive estimated value of the home to which the entry corresponds, (2) a geographic feature-insensitive estimated value of the home to which the entry corresponds, and (3) a selling price for the home to which the entry corresponds; and
   training the at least one home valuation model, using the generated set of training items, such that the at least one home valuation model is applicable to generate an estimated home value of a distinguished home based on: (1) a geographic feature-sensitive estimated value of the distinguished home, (2) a geographic feature-insensitive estimated value of the distinguished home, and (3) at least some attributes of the distinguished home, wherein the training comprises:
      randomly selecting recent sales within the distinguished geographic area, randomly selecting home attributes,
      creating a root node for the at least one home valuation model representing all of the randomly selected recent sales within the distinguished geographic area and a full range of each of the randomly selected home attributes,
      splitting the root node of the at least one home valuation model into a pair of child nodes for the root node of the at least one home valuation model, each child node representing an attribute subrange on a different side of a split point, and
      for each child node of the at least one home valuation model,
         determining whether the node of the at least one home valuation model should be split,
         in response to determining that the node of the at least one home valuation model should be split, creating a pair of child nodes for the node of the at least one home valuation model, each child node representing an attribute subrange on a different side of a split point, and
         in response to determining that the node of the at least one home valuation model should not be split, determining a mean selling price of sales represented by the node;
   using a meta-model that predicts relative weightings to be given to valuations produced by geographic feature-sensitive models, wherein the meta-model tends to predict a high weighting for valuations of homes that are very close to a significant feature and a low weighting for valuations of homes that are not close to any significant feature,
      obtaining a first weighting based on a first distance between the distinguished home and at least one geographic feature that is near the distinguished home, wherein the first distance is measured as a distance a bird flies from the distinguished home to the at least one geographic feature that is near the distinguished home, and wherein the first weighting is representative of the first distance,
      obtaining a second weighting based on a second distance between the distinguished home and the at least one geographic feature that is near the distinguished home, wherein the second distance is measured as a distance a person walks from the distinguished home to the at least one geographic feature that is near the distinguished home, wherein the second weighting is representative of the second distance, and
      obtaining a third weighting based on a third distance between the distinguished home and the at least one geographic feature that is near the distinguished home, wherein the third distance is measured as a distance a person drives from the distinguished home to the at least one geographic feature that is near the distinguished home, wherein the third weighting is representative of the third distance;
   applying the obtained first weighting to a first geographic feature-sensitive estimated value of the distinguished home estimated by a geographic feature-sensitive model;
   applying the obtained second weighting to a second geographic feature-sensitive estimated value of the distinguished home estimated by a geographic feature-sensitive model;
   applying the obtained third weighting to a third geographic feature-sensitive estimated value of the distinguished home estimated by a geographic feature-sensitive model; and
   obtaining an overall valuation for the distinguished home based on the application of the obtained first weighting to the first geographic feature-sensitive estimated value of the distinguished home, the application of the obtained second weighting to the second geographic feature-sensitive estimated value of the distinguished home, and the application of the obtained third weighting to the third geographic feature-sensitive estimated value of the distinguished home so that the overall valuation is based on the obtained first weighting, the obtained second weighting, and the obtained third weighting.

2. The method of claim 1, each entry further indicating information identifying at least one geographic feature that is near the home to which the entry corresponds, wherein the indicated information identifies a neighborhood containing the home to which the entry corresponds.

3. The method of claim 1, further comprising:
accessing a distance between the distinguished home and at least one geographic feature.

4. The method of claim 1, further comprising:
for each identified home of a second plurality of homes in the distinguished geographic area that have been listed for sale during a second period that intersects a first period during which the first plurality of homes in the distinguished geographic area were sold:
accessing a listing price for the identified home;
accessing attributes of the identified home; and
accessing information identifying at least one geographic feature that is near the identified home; and
applying a model, that estimates the value of any object home within the distinguished geographic area based on a listing price for the object home and attributes of the object home, to obtain an estimated value for the identified home,
wherein the obtained estimated value, accessed attributes, and accessed information identifying at least one geographic feature that is near the identified home collectively comprise an observation corresponding to the identified home,
and wherein a geographic feature-sensitive model is trained using the observations corresponding to the second plurality of homes in addition to observations corresponding to the first plurality of homes.

5. The method of claim 1 wherein the information identifying at least one geographic feature that is near the home identifies a selected geographic feature that has a positive impact on the value of other homes near the home.

6. The method of claim 5 wherein the selected geographic feature is a waterfront.

7. The method of claim 5 wherein the selected geographic feature is a particular block.

8. The method of claim 1 wherein the information identifying at least one geographic feature that is near the home identifies a selected geographic feature that has a negative impact on the value of other homes near the home.

9. The method of claim 8 wherein the selected geographic feature is a factory.

10. The method of claim 1, further comprising:
accessing an indication of a distance between the distinguished home and a distinguished geographic feature that is near the distinguished home; and
providing the accessed indication of the distance between the distinguished home and the distinguished geographic feature that is near the distinguished home to a geographic feature-sensitive model.

11. The method of claim 10 wherein the accessed indication of the distance between the distinguished home and the distinguished geographic feature that is near the home is a distance measured as a bird flies from the home to the identified distinguished geographic feature that is near the distinguished home.

12. The method of claim 10 wherein the accessed indication of the distance between the distinguished home and the distinguished geographic feature that is near the distinguished home is a distance measured as a person walks from the distinguished home to the distinguished geographic feature that is near the distinguished home.

13. The method of claim 10 wherein the accessed indication of the distance between the distinguished home and the distinguished geographic feature that is near the distinguished home is an amount of time it is estimated to take for a person to walk from the distinguished home to the distinguished geographic feature that is near the distinguished home.

14. The method of claim 10 wherein the accessed indication of the distance between the distinguished home and the distinguished geographic feature that is near the distinguished home is a distance measured as a car drives from the distinguished home to the distinguished geographic feature that is near the distinguished home.

15. The method of claim 10 wherein the accessed indication of the distance between the distinguished home and the distinguished geographic feature that is near the distinguished home is an amount of time it is estimated to take for a car to drive from the distinguished home to the distinguished geographic feature that is near the distinguished home.

16. The method of claim 10 wherein the accessed indication of the distance between the distinguished home and the distinguished geographic feature that is near the distinguished home is a distance measured as a trip via public transit from the distinguished home to the distinguished geographic feature that is near the distinguished home.

17. The method of claim 10 wherein the accessed indication of the distance between the distinguished home and the distinguished geographic feature that is near the distinguished home is an amount of time it is estimated to take for a person to travel via public transit from the distinguished home to the distinguished geographic feature that is near the distinguished home.

18. The method of claim 10 wherein the accessed indication of the distance between the distinguished home and the distinguished geographic feature that is near the distinguished home is a distance measured based on a number of land parcels that separate the distinguished home from the distinguished geographic feature that is near the distinguished home.

19. The method of claim 10 wherein the geographic feature-sensitive model comprises a plurality of models that are constituents of the geographic feature-sensitive model, wherein at least two of the constituent models have different modeling strategies from each other and each constituent model estimates a value for the home in based on attributes of the home and the information identifying the at least one geographic feature that is near the home, and wherein the constituent models are trained using observations corresponding to the first plurality of homes.

20. The method of claim 1, further comprising:
for each of the first plurality of homes,
accessing an indication of a level of visibility of at least one geographic feature from the home; and
providing the accessed indication of the level of visibility of the at least one geographic feature from the home to a geographic feature-sensitive model.

21. The method of claim 1, further comprising a first geographic feature-sensitive model comprising a plurality of models that are constituents of the first geographic feature-sensitive model, wherein at least two of the constituent models have different model types from each other and each constituent model estimates a value for the home based on attributes of the home and the information identifying the at least one geographic feature that is near the home, and wherein the constituent models are trained using observations corresponding to the first plurality of homes.

22. The method of claim 1, further comprising:
training a heat map model that, for each of a plurality of geographic features within the distinguished geographic area, estimates a relative value of the geographic feature with respect to its effect on the values of nearby homes, wherein, for each particular home of a plurality of homes within the distinguished geographic area, one or more relative values of geographic features for the at least one geographic feature that is near the particular home are provided as further input to the geographic feature-sensitive model.

23. The method of claim 1, wherein the at least one home valuation model is trained to select a relative weighting of the geographic feature-sensitive estimated value of the distinguished home and the geographic feature-insensitive estimated value of the distinguished home based on at least some of the attributes of the distinguished home, wherein the combination of the geographic feature-sensitive estimated value of the distinguished home and the geographic feature-insensitive estimated value of the distinguished home, according to the selected relative weighting, is a prediction of the estimated home value of the distinguished home generated by the at least one home valuation model.

24. The method of claim 1, wherein the at least one home valuation model is a random forest model.

25. The method of claim 1, wherein the first weighting is greater than a first threshold, wherein the first weighting is less than a second threshold, wherein the second weighting is greater than the first threshold, wherein the second weighting is less than the second threshold, wherein the third weighting is greater than the first threshold, and wherein the third weighting is less than the second threshold.

26. A computer-readable hardware device storing instructions that, when executed by a computing system having a processor, cause the computing system to perform a method comprising:
storing a data structure, the data structure comprising, for each of a plurality of entries:
information that identifies a home to which the entry corresponds,
information that identifies attributes of the home to which the entry corresponds,
information that identifies a sale price of the home to which the entry corresponds,
information about a geographic feature near the home to which the entry corresponds that is capable of affecting a value of the home to which the entry corresponds, and
information that indicates how a geographic location of the home to which the entry corresponds relates to a geographic location of the geographic feature,
such that entries of the data structure that identify homes in a distinguished geographic area whose values are known are usable to train a model adapted to estimate values of homes in the distinguished geographic area based in part on a relationship of their geographic locations to the geographic locations of geographic features that are capable of affecting their values;
generating a set of training items for at least one home valuation model, the set of training items comprising a plurality of entries each entry of set of training items corresponding to a home of a plurality of homes located in the distinguished geographic area, each entry comprising: (1) a geographic feature-sensitive estimated value of the home to which the entry corresponds, (2) a geographic feature-insensitive estimated value of the home to which the entry corresponds, and (3) a selling price of the home to which the entry corresponds, wherein each entry of the set of training items is generated by:
accessing the selling price for the home to which the entry corresponds,
accessing attributes of the home to which the entry corresponds, and
accessing information identifying at least one geographic feature that is near the home to which the entry corresponds;
training the at least one home valuation model, using the generated set of training items, such that the at least one home valuation model is applicable to generate an estimated home value of a distinguished home based on: (1) a geographic feature-sensitive estimated value of the distinguished home, (2) a geographic feature-insensitive estimated value of the distinguished home, and (3) at least some attributes of the distinguished home, wherein the training comprises:
randomly selecting recent sales within the distinguished geographic area,
randomly selecting home attributes,
creating a root node for the at least one home valuation model representing all of the randomly selected recent sales within the distinguished geographic area and a full range of each of the randomly selected home attributes, and
for each node of the at least one home valuation model,
determining whether the node of the at least one home valuation model should be split,
in response to determining that the node of the at least one home valuation model should be split, creating a pair of child nodes for the node of the at least one home valuation model, each child node representing an attribute subrange on a different side of a split point, and
in response to determining that the node of the at least one home valuation model should not be split,
determining a mean selling price of sales represented by the node;
obtaining a first weighting based on a first distance between the distinguished home and at least one geographic feature that is near the distinguished home, wherein the first distance is measured as a distance a bird flies from the distinguished home to the at least one geographic feature that is near the distinguished home, and wherein the first weighting is representative of the first distance;
obtaining a second weighting based on a second distance between the distinguished home and the at least one geographic feature that is near the distinguished home, wherein the second distance is measured as a distance a person walks from the distinguished home to the at least one geographic feature that is near the distinguished home, wherein the second weighting is representative of the second distance;
obtaining a third weighting based on a third distance between the distinguished home and the at least one geographic feature that is near the distinguished home, wherein the third distance is measured as a distance a person drives from the distinguished home to the at least one geographic feature that is near the distinguished home, wherein the third weighting is representative of the third distance;

applying the obtained first weighting to a first geographic feature-sensitive estimated value of the distinguished home estimated by a geographic feature-sensitive model;

applying the obtained second weighting to a second geographic feature-sensitive estimated value of the distinguished home estimated by a geographic feature-sensitive model;

applying the obtained third weighting to a third geographic feature-sensitive estimated value of the distinguished home estimated by a geographic feature-sensitive model; and obtaining an overall valuation for the distinguished home based on the application of the obtained first weighting to the first geographic feature-sensitive estimated value of the distinguished home, the application of the obtained second weighting to the second geographic feature-sensitive estimated value of the distinguished home, and the application of the obtained third weighting to the third geographic feature-sensitive estimated value of the distinguished home so that the overall valuation is based on the obtained first weighting, the obtained second weighting, and the obtained third weighting.

27. The computer-readable hardware device of claim 26 wherein the data structure further stores, for each of at least one of the plurality of entries of the data structure, the information identifying at least one geographic feature that is near the home to which the entry corresponds, wherein the information identifying at least one geographic feature that is near the home to which the entry corresponds comprises information that affects the value of the home to which the entry corresponds in a positive direction.

28. The computer-readable hardware device of claim 26 wherein the data structure further stores, for each of at least one of the plurality of entries of the data structure, the information identifying at least one geographic feature that is near the home to which the entry corresponds, wherein the information identifying at least one geographic feature that is near the home to which the entry corresponds comprises information that affects the value of the home to which the entry corresponds in a negative direction.

29. The computer-readable hardware device of claim 26 wherein, for each of at least one of the plurality of entries of the data structure, the information that indicates how a geographic location of the home to which the entry corresponds relates to a geographic location of the geographic feature indicates a distance from the home to which the entry corresponds to the geographic feature.

30. The computer-readable hardware device of claim 29 wherein each distance is measured directly between the home to which the entry corresponds and the geographic feature.

31. The computer-readable hardware device of claim 29 wherein for each of the at least one of the plurality of entries of the data structure, each distance is measured in accordance with some travel modality between the home to which the entry corresponds and the geographic feature.

32. The computer-readable hardware device of claim 26 wherein, for each of at least one of the plurality of entries of the data structure, the information that indicates how a geographic location of the home to which the entry corresponds relates to a geographic location of the geographic feature indicates a number of intervening streets between the home to which the entry corresponds and the geographic feature.

33. The computer-readable hardware device of claim 26 wherein, for each of at least one of the plurality of entries of the data structure, the information that indicates how a geographic location of the home to which the entry corresponds relates to a geographic location of the geographic feature indicates a number of intervening parcels between the home to which the entry corresponds and the geographic feature.

34. The computer-readable hardware device of claim 26, wherein training the at least one home valuation model to generate the estimated home value of the distinguished home comprises training the at least one home valuation model to select a relative weighting, for the distinguished home, between the geographic feature-sensitive estimated value of the distinguished home and the geographic feature-insensitive estimated value of the distinguished home, and wherein the estimated home value of the distinguished home is generated by applying the relative weighting in combining the geographic feature-sensitive estimated value of the distinguished home and the geographic feature-insensitive estimated value of the distinguished home.

35. A computer-readable hardware device storing instructions that, when executed by a computing system having a processor, cause the computing system to perform a method of training at least one home valuation model for estimating a value for a home in a distinguished geographic area, the method comprising:

generating a set of training items for the distinguished geographic area, the set of training items comprising a plurality of entries each entry corresponding to a home of a first plurality of homes located in the distinguished geographic area that have sold during a first period, each entry indicating: (1) a geographic feature-sensitive estimated value of the home to which the entry corresponds, (2) a geographic feature-insensitive estimated value of the home to which the entry corresponds, and (3) a selling price for the home to which the entry corresponds, wherein each entry is generated by:

accessing the selling price for the home to which the entry corresponds, accessing attributes of the home to which the entry corresponds, and accessing information identifying at least one geographic feature that is near the home to which the entry corresponds;

training the at least one home valuation model, using the generated set of training items, such that the at least one home valuation model is applicable to generate an estimated home value of a distinguished home based on: (1) a geographic feature-sensitive estimated value of the distinguished home, (2) a geographic feature-insensitive estimated value of the distinguished home, and (3) at least some attributes of the distinguished home, wherein the at least one home valuation model determines relative weights to be given to valuations produced by a geographic feature-sensitive model and a geographic feature-insensitive model, wherein the training comprises:

randomly selecting recent sales within the distinguished geographic area, randomly selecting home attributes, creating a root node for the at least one home valuation model representing all of the randomly selected recent sales within the distinguished geographic area and a full range of each of the randomly selected home attributes, and for each node of the at least one home valuation model, determining whether the node of the at least one home valuation model should be split, in response to determining that the node of the at least one home valuation model should be split, creating a pair of child nodes for the node of the at least one home valuation model, each child node representing an attribute subrange on a different side of a split point, and in response to determining that the node of the at least one home valuation model should not be split, determining a mean selling price of sales represented by the node;

obtaining a first weighting based on a first distance between the distinguished home and at least one geographic feature that is near the distinguished home, wherein the first weighting is non-zero, wherein the first distance is measured as a distance a bird flies from the distinguished home to the at least one geographic feature that is near the distinguished home, and wherein the first weighting is representative of the first distance;

obtaining a second weighting based on a second distance between the distinguished home and the at least one geographic feature that is near the distinguished home, wherein the second weighting is non-zero, wherein the second distance is measured as a distance a person walks from the distinguished home to the at least one geographic feature that is near the distinguished home, wherein the second weighting is representative of the second distance, and wherein the second weighting is different from the first weighting;

obtaining a third weighting based on a third distance between the distinguished home and the at least one geographic feature that is near the distinguished home, wherein the third weighting is non-zero, wherein the third distance is measured as a distance a person drives from the distinguished home to the at least one geographic feature that is near the distinguished home, wherein the third weighting is representative of the third distance, wherein the third weighting is different from the second weighting, and wherein the third weighting is different from the first weighting; and obtaining an overall valuation for the distinguished home by:

applying the obtained first weighting to a first geographic feature-sensitive estimated value of the distinguished home estimated by a geographic feature-sensitive model, applying the obtained second weighting to a second geographic feature-sensitive estimated value of the distinguished home estimated by a geographic feature-sensitive model, and applying the obtained third weighting to a third geographic feature-sensitive estimated value of the distinguished home estimated by a geographic feature-sensitive model so that the overall valuation for the distinguished home is based on the obtained first weighting, the obtained second weighting, and the obtained third weighting.

36. The computer-readable hardware device of claim 35 wherein one of the at least one geographic features that is near the home, is a neighborhood containing the home.

37. The computer-readable hardware device of claim 35, wherein for each entry, the information identifying a distinguished geographic feature of the at least one geographic features near the home to which the entry corresponds further comprises a number of streets intervening between the home to which the entry corresponds and the distinguished geographic feature.

38. The computer-readable hardware device of claim 35, the method further comprising:

for each identified home of a second plurality of homes in the distinguished geographic area that have been listed for sale during a second period that intersects the first period:

accessing a listing price for the identified home;

accessing attributes of the identified home; and accessing information identifying at least one geographic feature that is near the identified home; and applying a listing model, that estimates the value of any object home within the distinguished geographic area based on a listing price for the object home and attributes of the object home, by providing the listing price for the identified home and the attributes of the identified home to the listing model to obtain, from the listing model, an estimated value for the identified home, wherein the obtained estimated value, accessed attributes, and accessed information identifying at least one geographic feature that is near the identified home collectively comprise an observation corresponding to the identified home, and wherein the geographic feature-sensitive model is trained using the observations corresponding to the second plurality of homes in addition to observations corresponding to the first plurality of homes.

39. The computer-readable hardware device of claim 35 wherein the information identifying the at least one geographic feature near the home comprises information identifying a selected geographic feature that has a positive impact on values of other homes near the home.

40. The computer-readable hardware device of claim 39 wherein the selected geographic feature is a golf course.

41. The computer-readable hardware device of claim 39 wherein the selected geographic feature is a transit resource.

42. The computer-readable hardware device of claim 35 wherein the information identifying the at least one geographic that is near the home comprises information identifying a selected geographic feature that has a negative impact on values of other homes near the home.

43. The computer-readable hardware device of claim 42 wherein the selected geographic feature is a particular neighborhood.

44. The computer-readable hardware device of claim 42 wherein the selected geographic feature is a particular road or highway.

45. The computer-readable hardware device of claim 35, wherein the geographic feature-sensitive model is trained in part based on accessed indications of distances between homes and corresponding identified geographic features.

46. The computer-readable hardware device of claim 45 wherein, for at least one subject home among the first plurality of homes, the accessed indication of a distance between the subject home and the corresponding identified geographic feature is a distance measured as a bird flies from a subject home to the corresponding identified geographic feature.

47. The computer-readable hardware device of claim 45 wherein, for at least one subject home among the first plurality of homes, the accessed indication of a distance between the subject home and the corresponding identified geographic feature is a distance measured as a person walks from the subject home to the corresponding identified geographic feature.

48. The computer-readable hardware device of claim 45 wherein, for at least one subject home among the first plurality of homes, the accessed indication of a distance between the subject home and the corresponding identified geographic feature is an amount of time it is estimated to take for a person to walk from the subject home to the corresponding identified geographic feature.

49. The computer-readable hardware device of claim 45 wherein, for at least one subject home among the first plurality of homes, the accessed indication of a distance between the subject home and the corresponding identified geographic feature is a distance measured as a car drives from the subject home to the corresponding identified geographic feature.

50. The computer-readable hardware device of claim 45 wherein, for at least one subject home among the first plurality of homes, the accessed indication of a distance between the subject home and the corresponding identified geographic feature is an amount of time it is estimated to take for a car to drive from the subject home to the corresponding identified geographic feature.

51. The computer-readable hardware device of claim 45 wherein, for at least one subject home among the first plurality of homes, the accessed indication of a distance between the subject home and the corresponding identified geographic feature is a distance measured as a trip via public transit from the subject home to the corresponding identified geographic feature.

52. The computer-readable hardware device of claim 45 wherein, for at least one subject home among the first plurality of homes, the accessed indication of a distance between the subject home and the identified geographic feature is an amount of time it is estimated to take for a person to travel via public transit from the subject home to the identified geographic feature.

53. The computer-readable hardware device of claim 45 wherein, for at least one subject home among the first plurality of homes, the accessed indication of a distance between the subject home and the corresponding identified geographic feature is a distance measured based on a number of parcels that separate the subject home from the corresponding identified geographic feature.

54. The computer-readable hardware device of claim 35, wherein, for at least one entry, the information identifying at least one geographic feature that is near the home to which the at least one entry corresponds, comprises an indication of a level of visibility of the identified at least one geographic feature from the home to which the at least one entry corresponds.

55. The computer-readable hardware device of claim 35 wherein the geographic feature-sensitive model comprises a plurality of models that are constituents of the geographic feature-sensitive model, wherein at least two of the constituent models have different model types from each other and each constituent model estimates a value for any subject home in the distinguished geographic area based on attributes of the subject home and information identifying at least one geographic feature that is near the subject home, wherein the constituent models are trained using observations corresponding to the first plurality of homes, wherein at least one of the constituent models is a feature-insensitive valuation model, and wherein at least one of the constituent models is a feature-sensitive valuation model.

56. The computer-readable hardware device of claim 35 wherein the geographic feature-sensitive model comprises a plurality of models that are constituents of the geographic feature-sensitive model, wherein at least two of the constituent models have different modeling strategies from each other and each constituent model estimates a value for any subject home in the distinguished geographic area based on attributes of the subject home and information identifying at least one geographic feature that is near the subject home, wherein the constituent models are trained using observations corresponding to the first plurality of homes to train the constituent model.

57. The computer-readable hardware device of claim 35:
wherein the training of the at least one home valuation model includes training of the at least one home valuation model to select different relative weightings for different ones of the first plurality of homes in the distinguished geographic area by:
producing a relative weighting, from the at least one home valuation model, for each selected home, using the at least some of the attributes of the selected home as home valuation model input; and
computing a weighted average valuation for each selected home by applying the corresponding relative weighting to the geographic feature-sensitive estimated value of the selected home and the geographic feature-insensitive estimated value of that selected home,
wherein the weighted average valuation according to the corresponding relative weighting is a basis for adapting a state of the home valuation model.

58. The computer-readable hardware device of claim 35, the method further comprising:
training a heat map model that, for each of a plurality of geographic features within the distinguished geographic area, estimates a relative value of the geographic feature with respect to its effect on the values of nearby homes, wherein, for each particular home, one or more relative values of geographic features for the at least one geographic feature that is near the particular home are provided as further input to the geographic feature-sensitive model.

59. The computer-readable hardware device of claim 35, the method further comprising, for each of the first plurality of homes in the distinguished geographic area that have sold during the first period,
accessing a number of home parcels intervening between the home and one of the at least one identified geographic features.

60. The computer-readable hardware device of claim 35, wherein determining whether a first child node of a first node of the at least one home valuation model should be split comprises determining that the first child node of the first node of the at least one home valuation model should be split and wherein determining whether a second child node of the first node of the at least one home valuation model should be split comprises determining that the second child node of the first node of the at least one home valuation model should not be split.

61. The computer-readable hardware device of claim 35, wherein the overall valuation for the distinguished home is based on a number of streets intervening between the distinguished home and the at least one geographic feature that is near the distinguished home.

62. The computer-readable hardware device of claim 35, wherein the overall valuation for the distinguished home is based on a number of home parcels intervening between the

43 distinguished home and the at least one geographic feature that is near the distinguished home.

63. A method, performed by a computing system having a processor, the method comprising:
for each of a plurality of entries of a data structure:
storing, in the data structure, information that identifies a home to which the entry corresponds;
storing, in the data structure, information that identifies attributes of the home to which the entry corresponds;
storing, in the data structure, information that identifies a sale price of the home to which the entry corresponds;
storing, in the data structure, information about a geographic feature near the home to which the entry corresponds that is capable of affecting the value of the home to which the entry corresponds; and
storing, in the data structure, information that indicates how a geographic location of the home to which the entry corresponds relates to a geographic location of the geographic feature near the home to which the entry corresponds,
such that entries of the data structure that identify homes, in a distinguished geographic area, whose values are known are usable to train at least one home valuation model that is adapted to estimate values of homes in the distinguished geographic area based in part on a relationship of their geographic locations to the geographic locations of geographic features that are capable of affecting their values, by:
generating a set of training items for the at least one home valuation model, the set of training items comprising a plurality of entries each entry corresponding to a home of a first plurality of homes located in the distinguished geographic area, each entry of the set of training items comprising: (1) a geographic feature-sensitive estimated value of the home to which the entry of the set of training items corresponds, (2) a geographic feature-insensitive estimated value of the home to which the entry of the set of training items corresponds, and (3) a selling price of the home to which the entry of the set of training items corresponds; and
training the at least one home valuation model using the generated set of training items, such that the at least one home valuation model is applicable to generate an estimated home value of a distinguished home based on: (1) a geographic feature-sensitive estimated value of the distinguished home, (2) a geographic feature-insensitive estimated value of the distinguished home, and (3) at least some attributes of the distinguished home, wherein the training comprises:
randomly selecting recent sales within the distinguished geographic area,
randomly selecting home attributes,
creating a root node for the at least one home valuation model representing all of the randomly selected recent sales within the distinguished geographic area and a full range of each of the randomly selected home attributes, and
for each node of the at least one home valuation model,
determining whether the node of the at least one home valuation model should be split,
in response to determining that the node of the at least one home valuation model should be split, creating a pair of child nodes for the node of the at least one home valuation model, each child node representing an attribute subrange on a different side of a split point, and

44 in response to determining that the node of the at least one home valuation model should not be split,
determining a mean selling price of sales represented by the node;
obtaining a first weighting based on a first distance between the distinguished home and at least one geographic feature that is near the distinguished home, wherein the first distance is measured as a distance a bird flies from the distinguished home to the at least one geographic feature that is near the distinguished home, and wherein the first weighting is representative of the first distance;
obtaining a second weighting based on a second distance between the distinguished home and the at least one geographic feature that is near the distinguished home, wherein the second distance is measured as a distance a person walks from the home to the at least one geographic feature that is near the distinguished home, wherein the second weighting is representative of the second distance;
obtaining a third weighting based on a third distance between the distinguished home and the at least one geographic feature that is near the distinguished home, wherein the third distance is measured as a distance a person drives from the distinguished home to the at least one geographic feature that is near the distinguished home, wherein the third weighting is representative of the third distance; and
obtaining an overall valuation for the distinguished home by:
applying the obtained first weighting to a first geographic feature-sensitive estimated value of the distinguished home estimated by a geographic feature-sensitive model,
applying the obtained second weighting to a second geographic feature-sensitive estimated value of the distinguished home estimated by a geographic feature-sensitive model, and
applying the obtained third weighting to a third geographic feature-sensitive estimated value of the distinguished home estimated by a geographic feature-sensitive model
so that the overall valuation for the distinguished home is based on the obtained first weighting, the obtained second weighting, and the obtained third weighting.

64. The method of claim 63 wherein each entry of the data structure further comprises information about a geographic feature near the home that affects the value of the home in a positive direction.

65. A system for training at least one home valuation model for estimating a value for a home in a distinguished geographic area, the system comprising:
at least one processor; and
at least one memory, coupled to the at least one processor and storing instructions for:
generating a set of training items for the distinguished geographic area, the set of training items comprising a plurality of entries each entry corresponding to a home of a first plurality of homes located in the distinguished geographic area, each entry indicating: (1) a geographic feature-sensitive estimated value of the home, (2) a geographic feature-insensitive estimated value of the home, and (3) a selling price for the home, wherein each entry is generated by:
accessing the selling price for the home to which the entry corresponds, accessing attributes of the home to which the entry corresponds, accessing information identifying at least one geographic feature that is near the home to which the entry corresponds, training the at least one home valuation model, using the generated set of training items, such that the at least one home valuation model is applicable to generate an estimated home value of a distinguished home based on: (1) a geographic feature-sensitive estimated value of the distinguished home, (2) a geographic feature-insensitive estimated value of the distinguished home, and (3) at least some attributes of the distinguished home, wherein the training comprises:

randomly selecting recent sales within the distinguished geographic area, randomly selecting home attributes, creating a root node for the at least one home valuation model representing all of the randomly selected recent sales within the distinguished geographic area and a full range of each of the randomly selected home attributes, and for each node of the at least one home valuation model, determining whether the node of the at least one home valuation model should be split, in response to determining that the node of the at least one home valuation model should be split, creating a pair of child nodes for the node of the at least one home valuation model, each child node representing an attribute subrange on a different side of a split point, and in response to determining that the node of the at least one home valuation model should not be split, determining a mean selling price of sales represented by the node, obtaining a first weighting based on a first distance between the distinguished home and a first geographic feature that is near the distinguished home, wherein the first distance is measured as a distance a bird flies from the distinguished home to the first geographic feature that is near the distinguished home, and wherein the first weighting is representative of the first distance, obtaining a second weighting based on a second distance between the distinguished home and the first geographic feature that is near the distinguished home, wherein the second distance is measured as a distance a person walks from the home to the first geographic feature that is near the distinguished home, wherein the second weighting is representative of the second distance, and obtaining a third weighting based on a third distance between the distinguished home and the first geographic feature that is near the distinguished home, wherein the third distance is measured as a distance a person drives from the distinguished home to the first geographic feature that is near the distinguished home, wherein the third weighting is representative of the third distance, and obtaining an overall valuation for the distinguished home by:

applying the obtained first weighting to a first geographic feature-sensitive estimated value of the distinguished home estimated by a geographic feature-sensitive model, applying the obtained second weighting to a second geographic feature-sensitive estimated value of the distinguished home estimated by a geographic feature-sensitive model, and applying the obtained third weighting to a third geographic feature-sensitive estimated value of the distinguished home estimated by a geographic feature-sensitive model so that the overall valuation for the distinguished home is based on the obtained first weighting, the obtained second weighting, and the obtained third weighting.

66. The system of claim 65, wherein training the at least one home valuation model comprises training the at least one home valuation model to generate the estimated home value of a distinguished home by training the at least one home valuation model to select a relative weighting, for the distinguished home, between the geographic feature-sensitive estimated value of the distinguished home and the geographic feature-insensitive estimated value of the distinguished home; and wherein the estimated home value of a distinguished home is generated by applying the relative weighting when combining the geographic feature-sensitive estimated value of the distinguished home and the geographic feature-insensitive estimated value of the distinguished home.

* * * * *

UNITED STATES PATENT AND TRADEMARK OFFICE
CERTIFICATE OF CORRECTION

Page 1 of 3

PATENT NO.         : 10,984,489 B1
APPLICATION NO.    : 14/325094
DATED              : April 20, 2021
INVENTOR(S)        : Bruce et al.

It is certified that error appears in the above-identified patent and that said Letters Patent is hereby corrected as shown below:

On the Title Page

Item (56), on the Page 3, in Column 2, under "Other Publications", Line 58, delete "http://w w w .csw online.com" and insert -- http://www.cswonline.com --, therefor.

Item (56), on the Page 4, in Column 1, under "Other Publications", Line 16, delete "http://w w w .csw online.com" and insert -- http://www.cswonline.com --, therefor.

Item (56), on the Page 4, in Column 2, under "Other Publications", Line 68, delete "pags." and insert -- pages. --, therefor.

Item (56), on the Page 5, in Column 1, under "Other Publications", Line 14, delete "Issue7," and insert -- Issue 7, --, therefor.

Item (56), on the Page 5, in Column 2, under "Other Publications", Line 66, delete "Microstraqtegy," and insert -- Microstrategy, --, therefor.

Item (56), on the Page 6, in Column 2, under "Other Publications", Line 57, delete "Apraisal" and insert -- Appraisal --, therefor.

Item (56), on the Page 8, in Column 1, under "Other Publications", Line 15, delete "http://www.reiscom/" and insert -- http://www.reis.com/ --, therefor.

Item (56), on the Page 9, in Column 2, under "Other Publications", Line 22, delete "Archivved" and insert -- Archived --, therefor.

Item (56), on the Page 11, in Column 1, under "Other Publications", Line 31, delete "Utrecth" and insert -- Utrecht --, therefor.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*

Item (56), on the Page 11, in Column 2, under "Other Publications", Line 50, delete "visibiliyt" and insert -- visibility --, therefor.

In the Drawings

On sheet 21 of 43, in Figure 19, Line 10, delete "Leadsville" and insert -- Leadville --, therefor.

On sheet 21 of 43, in Figure 19, Line 11, delete "Williamburg," and insert -- Williamsburg, --, therefor.

On sheet 21 of 43, in Figure 19, Line 15, delete "Williamburg," and insert -- Williamsburg, --, therefor.

On sheet 26 of 43, in Figure 22, Line 11, delete "Partison" and insert -- Pattison --, therefor.

On sheet 26 of 43, in Figure 22, Line 18, delete "Movington" and insert -- Covington --, therefor.

On sheet 33 of 43, in Figure 30, reference numeral 3050, Line 9, delete "Eneergy" and insert -- Energy --, therefor.

In the Specification

In Column 1, Line 41, delete "houses," and insert -- houses. --, therefor.

In Column 2, Line 17, delete "area," and insert -- area. --, therefor.

In Column 2, Line 31, delete "tree," and insert -- tree. --, therefor.

In Column 5, Line 38, delete "the a" and insert -- the --, therefor.

In Column 5, Line 40, delete "the a" and insert -- the --, therefor.

In Column 5, Line 54, delete "feature sensitive" and insert -- feature-sensitive --, therefor.

In Column 6, Line 23, delete "systems;" and insert -- systems, --, therefor.

In Column 6, Line 35, delete "103;" and insert -- 103, --, therefor.

In Column 6, Line 42, delete "hardware;" and insert -- hardware, --, therefor.

In Column 8, Line 1, after "from" insert -- en.wikipedia.org, --.

In Column 9, Line 32, delete "conclude," and insert -- conclude. --, therefor.

In Column 9, Line 50, delete "rooms≤4,"" and insert -- rooms≤4." --, therefor.

CERTIFICATE OF CORRECTION (continued)

In Column 11, Line 5, delete "cran.r-project.org/" and insert -- cran.r-project.org --, therefor.

In Column 11, Line 44, delete "809;" and insert -- 809, --, therefor.

In Column 12, Line 1, delete "902;" and insert -- 902, --, therefor.

In Column 15, Line 11, delete "1101" and insert -- 1101, --, therefor.

In Column 16, Line 49, delete "1302-1305;" and insert -- 1302-1305, --, therefor.

In Column 18, Line 26, delete "tree," and insert -- tree. --, therefor.

In Column 18, Line 44, delete "1633;" and insert -- 1633, --, therefor.

In Column 18, Line 53, delete "0.1829," and insert -- 0.1829. --, therefor.

In Column 20, Line 8, delete "driveway;" and insert -- driveway, --, therefor.

In Column 20, Line 11, delete "dimensions;" and insert -- dimensions, --, therefor.

In Column 20, Line 11, delete "stories;" and insert -- stories, --, therefor.

In Column 20, Line 12, delete "latitude;" and insert -- latitude, --, therefor.

In Column 20, Line 13, delete "storage;" and insert -- storage, --, therefor.

In Column 22, Line 14, delete "price," and insert -- price. --, therefor.

In Column 24, Line 6, delete "facts,"" and insert -- facts." --, therefor.

In Column 25, Line 32, delete "home," and insert -- home. --, therefor.

In Column 27, Line 8, delete "3291" and insert -- 3291, --, therefor.

In Column 30, Line 19, delete "valuation," and insert -- valuation. --, therefor.

In the Claims

In Column 40, Line 45, in Claim 42, after "geographic" insert -- feature --.